(12) United States Patent
Lee et al.

(10) Patent No.: US 12,541,289 B2
(45) Date of Patent: Feb. 3, 2026

(54) ELECTRONIC DEVICE DISPLAYING IMAGE AND METHOD FOR OPERATING THE SAME

(71) Applicant: Samsung Electronics Co., Ltd., Suwon-si (KR)

(72) Inventors: Jihyun Lee, Suwon-si (KR); Minkyung Kim, Suwon-si (KR); Jungmin Lee, Suwon-si (KR); Jongwoo Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 18/425,598

(22) Filed: Jan. 29, 2024

(65) Prior Publication Data

US 2024/0256106 A1    Aug. 1, 2024

Related U.S. Application Data

(63) Continuation of application No. PCT/KR2023/014080, filed on Sep. 18, 2023.

(30) Foreign Application Priority Data

Jan. 30, 2023  (KR) .................. 10-2023-0011410
Apr. 24, 2023  (KR) .................. 10-2023-0053323

(51) Int. Cl.
  *G06F 3/04842*  (2022.01)
  *G06F 3/04886*  (2022.01)
  *G06V 40/16*    (2022.01)

(52) U.S. Cl.
  CPC ...... *G06F 3/04842* (2013.01); *G06F 3/04886* (2013.01); *G06V 40/165* (2022.01); *G06F 2203/04803* (2013.01)

(58) Field of Classification Search
  CPC ........ G06V 40/165; G06F 2203/04803; G06F 3/04842; G06F 3/04886; G06F 3/04845; G06F 3/04883
  See application file for complete search history.

(56) References Cited

U.S. PATENT DOCUMENTS

2007/0242149 A1   10/2007  Zhang
2011/0164828 A1    7/2011  Iwata
(Continued)

FOREIGN PATENT DOCUMENTS

CN    108989674 A  * 12/2018  ............. H04N 23/80
CN    110896451 A  *  3/2020  ........... H04N 23/611
(Continued)

OTHER PUBLICATIONS

International Search Report with Written Opinion and English translation dated Dec. 21, 2023; International Appln. No. PCT/KR2023/014080.
(Continued)

*Primary Examiner* — Ricardo Osorio
(74) *Attorney, Agent, or Firm* — Jefferson IP Law, LLP

(57) ABSTRACT

An electronic device is provided that includes a display, a processor, and memory storing instructions. The instructions, when executed by the processor, may cause the electronic device to display a first image in a first image area of an execution screen of a first application on the display. The instructions, when executed by the processor, may cause the electronic device to identify a target region in the first image. The target region includes a target object in the first image. The instructions, when executed by the processor, may cause the electronic device to identify a first user input while the first image is displayed. The instructions, when executed by the processor, may cause the electronic device to change, based on the first user input, an image area for displaying an image, from the first image area in which the
(Continued)

first image is displayed to a second image area which is smaller than the first image area. The instructions, when executed by the processor, may cause the electronic device to, in response to the image area changing from the first image area to the second image area, control display of the first image in the second image area based on a position of the target region in the first image.

16 Claims, 33 Drawing Sheets

(56) References Cited

U.S. PATENT DOCUMENTS

| | | | |
|---|---|---|---|
| 2011/0170787 A1* | 7/2011 | Gum | H04W 4/029 |
| | | | 715/764 |
| 2014/0185957 A1 | 7/2014 | Kim | |
| 2014/0292796 A1* | 10/2014 | Iwata | G06T 5/40 |
| | | | 345/589 |
| 2015/0356058 A1 | 12/2015 | Jwa et al. | |
| 2018/0241961 A1 | 8/2018 | Choi et al. | |
| 2019/0012129 A1 | 1/2019 | Han et al. | |
| 2019/0370546 A1 | 12/2019 | Agarwal et al. | |
| 2021/0217133 A1 | 7/2021 | Jeong et al. | |
| 2023/0074701 A1 | 3/2023 | Kim et al. | |

FOREIGN PATENT DOCUMENTS

| | | | | |
|---|---|---|---|---|
| CN | 114168250 A | | 3/2022 | |
| CN | 115291772 A | | 11/2022 | |
| JP | 5031877 B2 | | 9/2012 | |
| KR | 10-2007-0102404 A | | 10/2007 | |
| KR | 20120024299 A | * | 3/2012 | ........... G06F 3/0412 |
| KR | 10-2014-0088670 A | | 7/2014 | |
| KR | 10-2015-0140012 A | | 12/2015 | |
| KR | 10-2017-0011541 A | | 2/2017 | |
| KR | 101796607 B1 | * | 11/2017 | ............. G06Q 20/16 |
| KR | 10-2019-0006221 A | | 1/2019 | |
| KR | 10-2022-0048410 A | | 4/2022 | |
| WO | WO-2021045552 A1 | * | 3/2021 | ............. G06V 10/75 |
| WO | WO-2021098572 A1 | * | 5/2021 | |

OTHER PUBLICATIONS

Apple; Identify objects in photos with visual browsing on iPhone; iOS 16; Jan. 2023.

* cited by examiner

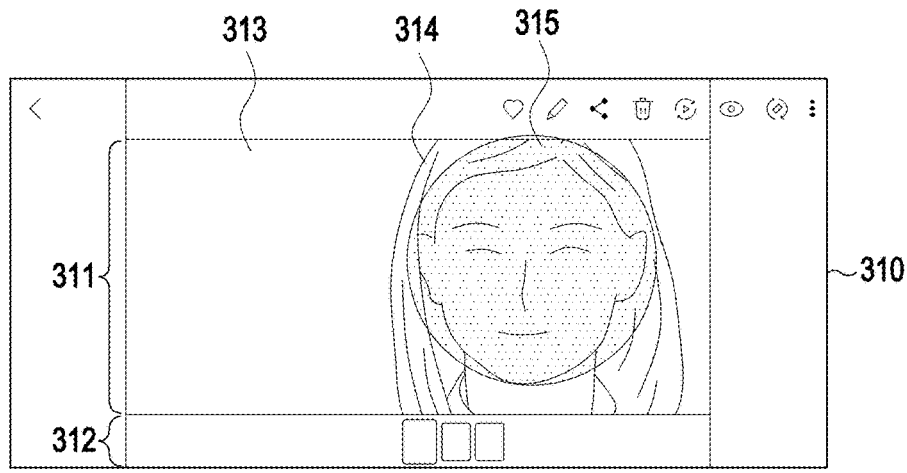
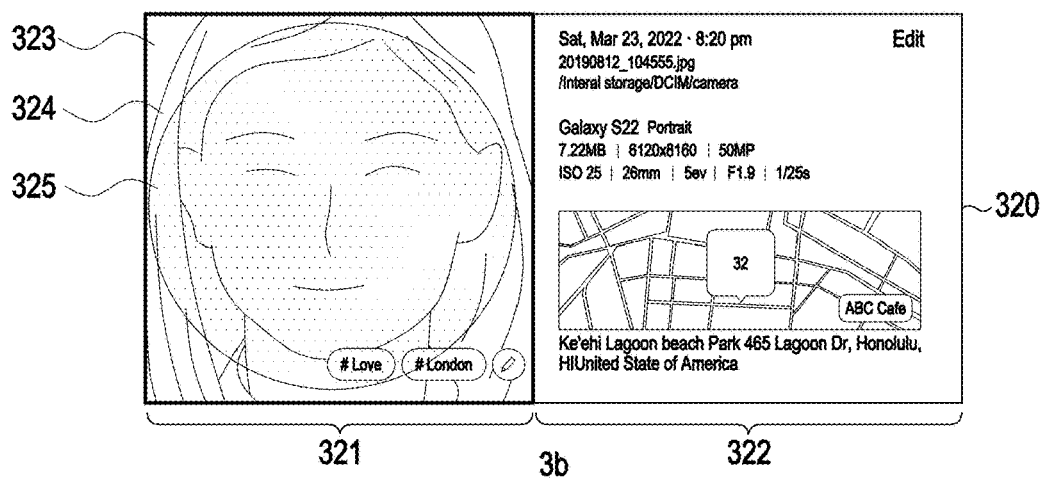
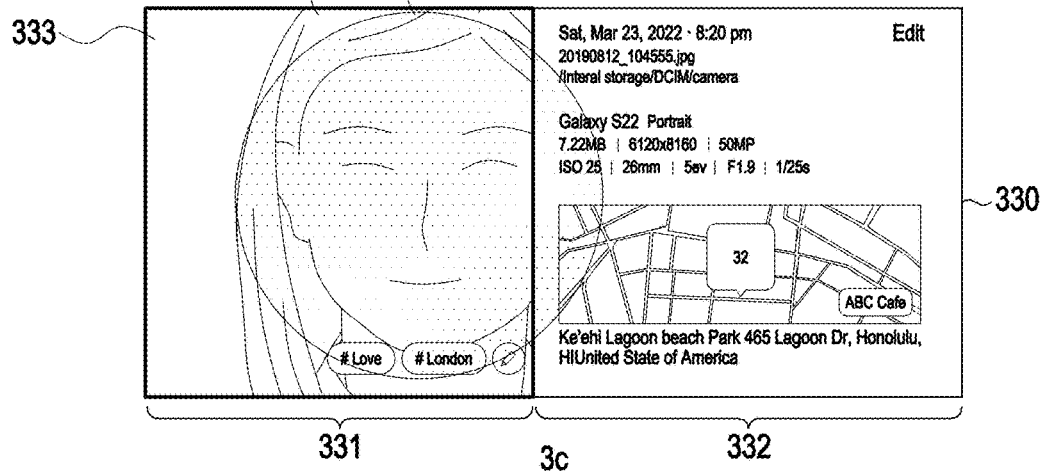
FIG. 3

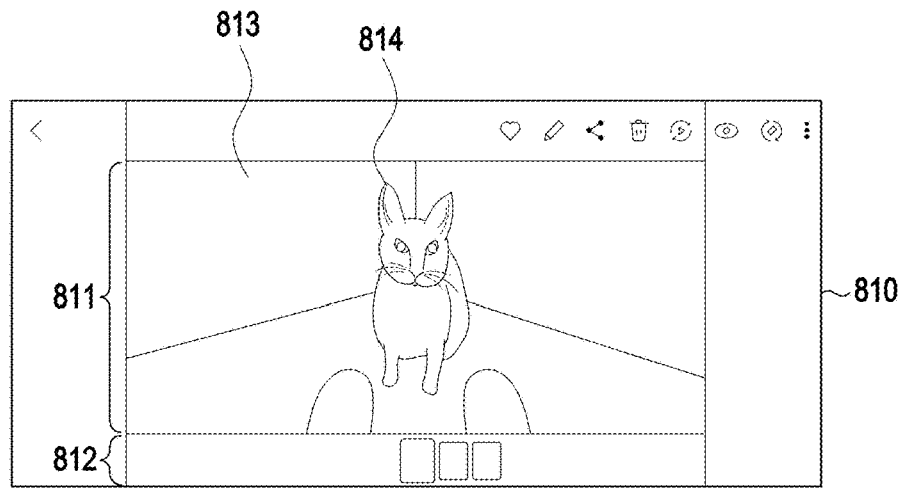
8a
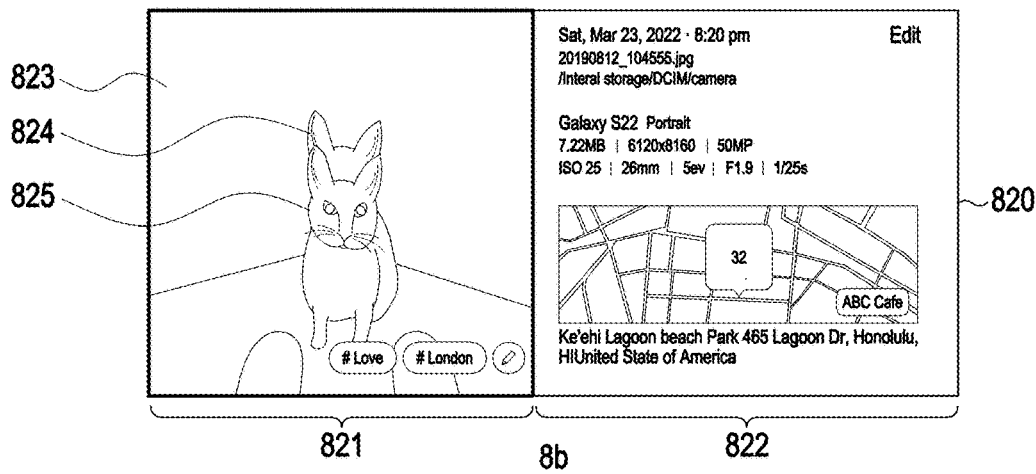
8b
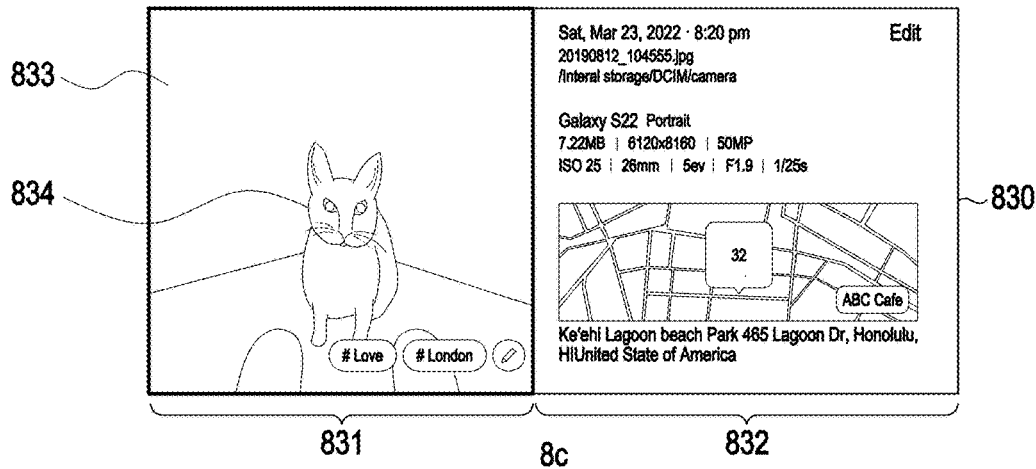
8c
FIG. 8

ELECTRONIC DEVICE DISPLAYING IMAGE AND METHOD FOR OPERATING THE SAME

CROSS-REFERENCE TO RELATED APPLICATION(S)

This application is a continuation application, claiming priority under § 365(c), of an International application No. PCT/KR2023/014080, filed on Sep. 18, 2023, which is based on and claims the benefit of a Korean patent application number 10-2023-0011410, filed on Jan. 30, 2023, in the Korean Intellectual Property Office, and of a Korean patent application number 10-2023-0053323, filed on Apr. 24, 2023, in the Korean Intellectual Property Office, the disclosure of each of which is incorporated by reference herein in its entirety.

TECHNICAL FIELD

The disclosure relates to an electronic device displaying an image and a method for operating the same.

BACKGROUND ART

When an electronic device such as a smartphone or a tablet personal computer (PC) is used, an image may be displayed through an application (e.g., a gallery application). The electronic device may display the whole or part of the image on the screen depending on the size of an image area of the screen of the application.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide an electronic device displaying an image and a method for operating the same.

Additional aspects will be set forth in part in the description which follows and, in part, will be apparent from the description, or may be learned by practice of the presented embodiments.

In accordance with an aspect of the disclosure, an electronic device is provided. The electronic device includes a display, a processor, and memory storing instructions. The instructions, when executed by the processor, may cause the electronic device to display a first image in a first image area of an execution screen of a first application on the display. The instructions, when executed by the processor, may cause the electronic device to identify a target region in the first image. The target region includes a target object in the first image. The instructions, when executed by the processor, may cause the electronic device to identify a first user input while the first image is displayed. The instructions, when executed by the processor, may cause the electronic device to change, based on the first user input, an image area for displaying an image, from the first image area in which the first image is displayed to a second image area which is smaller than the first image area. The instructions, when executed by the processor, may cause the electronic device to, in response to the image area changing from the first image area to the second image area, control display of the first image in the second image area based on a position of the target region in the first image.

In accordance with another aspect of the disclosure, a method for operating an electronic device is provided. The method includes displaying a first image in a first image area of an execution screen of a first application on a display of the electronic device. The method may include identifying a target region in the first image. The target region includes a target object in the first image. The method may include identifying a first user input while the first image is displayed in the first image area. The method may include changing, based on the first user input, an image area for displaying an image, from the first image area in which the first image is displayed to a second image area which is smaller than the first image area. The method may include, in response to the image area changing from the first image area to the second image area, controlling display of the first image in the second image area based on a position of the target region in the first image.

In accordance with another aspect of the disclosure, a non-transitory computer-readable recording medium storing instructions configured to perform at least one operation by a processor of an electronic device is provided. The at least one operation includes displaying a first image in a first image area of an execution screen of a first application on a display of the electronic device. The method may include identifying a target region in the first image. The target region includes a target object in the first image. The method may include identifying a first user input while the first image is displayed in the first image area. The method may include changing, based on the first user input, an image area for displaying an image, from the first image area in which the first image is displayed to a second image area which is smaller than the first image area. The method may include, in response to the image area changing from the first image area to the second image area, controlling display of the first image in the second image area based on a position of the target region in the first image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 3 is a view illustrating operations of an electronic device according to an embodiment of the disclosure;

FIG. 8 is a view illustrating operations of an electronic device according to an embodiment of the disclosure;

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
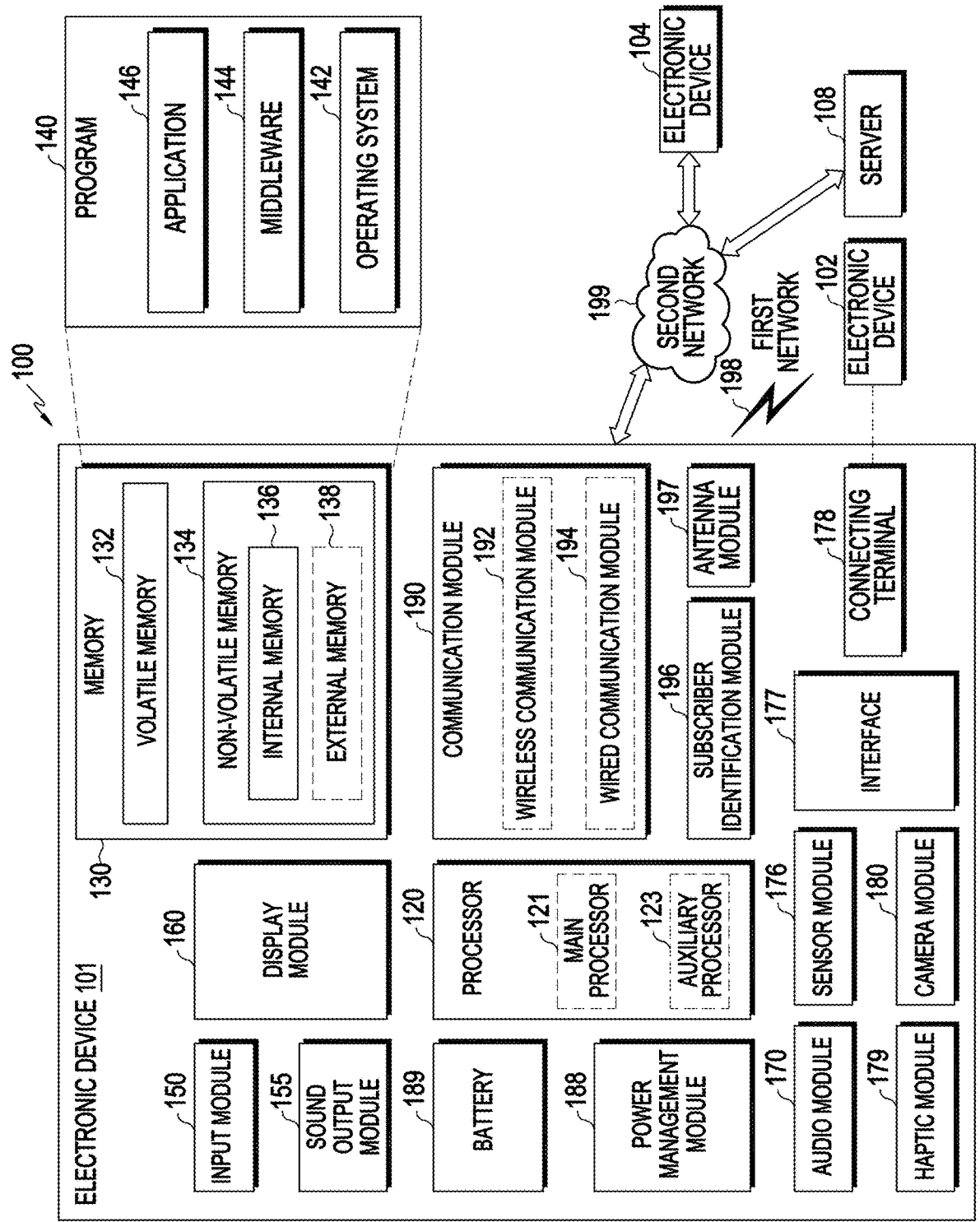
FIG. 1 is a view illustrating an electronic device in a network environment according to an embodiment of the disclosure.

FIG. 1 is a view illustrating an electronic device in a network environment according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye., a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include at least one of the volatile memory 132 or the non-volatile memory 134. The non-volatile memory 134 may include at least one of internal memory 136 or external memory 138.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
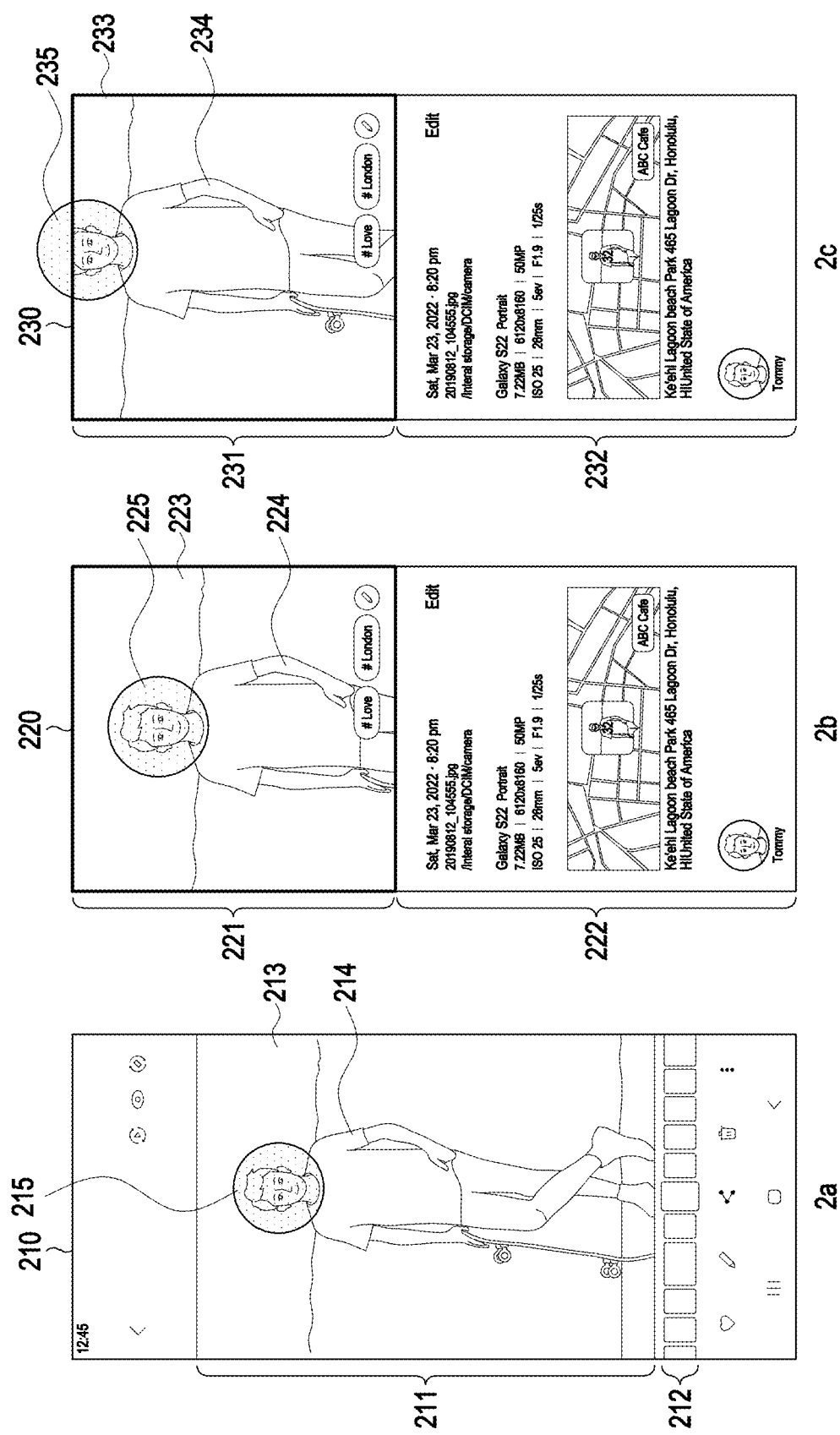
FIG. 2 is a view illustrating operations of an electronic device according to an embodiment of the disclosure.

FIG. 2 is a view illustrating operations of an electronic device according to an embodiment of the disclosure.

The operation of the electronic device 101 according to an embodiment may be controlled by a processor 120 of the electronic device 101. Performing a specific operation by the electronic device 101 may be controlling the electronic device 101 or a component included in the electronic device 101 by the processor 120 of the electronic device 101. The electronic device 101 may include one or more processors 120. Hereinafter, even when a plurality of processors 120 are implemented, the operation is described as an "operation of the electronic device 101" or "operation of the processor 120" for convenience of description.

Referring to FIG. 2, according to an embodiment, the electronic device 101 (e.g., the processor 120) may control the display module 160 of the electronic device 101 to display a first screen 210, a second screen 220, or a third screen 230. Although the reference denotations for the electronic device 101 and the display module 160 are not shown in FIGS. 2 to 35, 36A, and 36B, it will be appreciated by one of ordinary skill in the art that the screens (e.g., the first screen 210, second screen 220, and third screen 230 of FIG. 2 and the screens disclosed in FIGS. 3 to 35, 36A, and 36B) disclosed in FIGS. 2 to 35, 36A, and 36B are displayed on the display module 160 of the electronic device 101.

Referring to FIG. 2, the electronic device 101 according to an embodiment may display a first screen 210, a second screen 220, or a third screen 230, which are execution screens of an application (e.g., a gallery application) corresponding to parts 2a, 2b, and 2c of FIG. 2. The first screen 210, the second screen 220, or the third screen 230 may be an expression for indicating that the configuration of the execution screen of the application is changed. For example, when the display position of the image area is changed on the execution screen of the application while the application is running, it may be expressed that the image area is changed on the execution screen of the application or that the execution screen of the application is changed. The gallery application may be an application for displaying an image. If it is an application for displaying an image, the type and implementation method of the application are not limited. For example, the electronic device 101 may display an image through an application (e.g., an Internet application) other than the gallery application, and in this case, the type of the application may be irrelevant to the operation of the disclosure. For example, the electronic device 101 may implement an embodiment of the disclosure through an Internet application.

According to an embodiment, the electronic device 101 may display the second screen 220 or the third screen 230 after displaying the first screen 210. After displaying the first screen 210, the electronic device 101 may display the second screen 220 according to a user input. After displaying the first screen 210, the electronic device 101 may display the third screen 230 according to a user input. The whole of the image 213 may be displayed on the first screen 210. A portion of the image 223 (e.g., the image 213 displayed on the first screen 210) may be displayed on the second screen 220. Another portion of the image 233 (e.g., the image 213 displayed on the first screen 210) may be displayed on the third screen 230.

According to an embodiment, the first screen 210 may include a first image area 211. The "image area" may be an area in which an image is displayed. The electronic device 101 may display the entire area of the image 213 in the first image area 211 of the first screen 210. The first screen 210 may include a thumbnail area 212. The thumbnail area may be an area in which at least one thumbnail corresponding to at least one image is displayed. The electronic device 101 may display at least one thumbnail corresponding to at least one image in the thumbnail area 212 of the first screen 210. Among the at least one thumbnail displayed in the thumbnail area 212, a first thumbnail may be a thumbnail corresponding to the image 213 displayed in the first image area 211. The electronic device 101 may display, in the first image area 211, an image corresponding to a second thumbnail selected according to a user input of selecting the second thumbnail from among at least one thumbnail displayed in the thumbnail area 212.

According to an embodiment, the electronic device 101 may identify a target object included in the image. For example, the image 213 displayed on the first screen 210 may include a target object 214. According to an embodiment, the electronic device 101 may identify a target object included in an image (e.g., the image 213) using an artificial intelligence model or a specified algorithm. The method in which the electronic device 101 identifies the target object is not limited. The "target object" may be an object that is a target of a specific operation of the electronic device 101 among objects included in the image. According to an embodiment, the target object may be a separable object and may be an object subject to a specific operation of the electronic device 101. The "separable object" may be an object that may be separated from the original image or copied from the original image and managed as a separate object. According to an embodiment, the target object may be an object that is not separable but is a target for a specific operation of the electronic device 101. In the following embodiments, except for an embodiment in which the target object should be a separable object, in the remaining embodiments, whether the target object is a separable object or not may not affect whether the corresponding embodiment operates. The type of the target object may include, e.g., a person (or face), a pet, a document (or text), food, or other objects (e.g., tourist attractions, artworks), but the type of the target object is not limited. According to an embodiment, the electronic device 101 may move the target object included in the image separately from the original image while moving the image on the screen (e.g., while scrolling the image area), or may use only the target object among the objects included in the image as the source image of another application. Referring to FIG. 2, the electronic device 101 may identify the target object 214 (e.g., a person) included in the image 213. According to an embodiment, the electronic device 101 may identify the target object among at least one object included in the image. The electronic device 101 may identify one target object among at least one object included in the image. The electronic device 101 may identify a plurality of target objects among the plurality of objects included in the image.

According to an embodiment, the electronic device 101 may identify a target region corresponding to the target object. For example, the electronic device 101 may identify the target region 215 corresponding to the target object 214 included in the image 213 displayed on the first screen 210. According to an embodiment, the electronic device 101 identify a target region (e.g., target region 215) corresponding to a target object (e.g., target object 214) included in an image (e.g., image 213) using an artificial intelligence model or a specified algorithm. The method in which the electronic device 101 identifies the target region is not limited. The "target region" may be an area corresponding to the target object. The target region may be the entire area of the target object or a partial area of the target object. For example, when the target object is a person, the entire area corresponding to the person may be the target region, or the area corresponding to the face of the person may be the target region. A different target region may be set for the same target object according to the setting, and the criteria for setting the target region are not limited. According to an embodiment, the operation of identifying the target region corresponding to the target object may be omitted. The electronic device 101 may regard the target object (e.g., the entire area corresponding to the target object) as the target region. For example, the electronic device 101 may identify the entire area of the target object as the target region, and in this case, it may be understood that the operation of identifying the target region is omitted.

According to an embodiment, when there are a plurality of target objects, the electronic device 101 may identify a plurality of target regions respectively corresponding to the plurality of target objects. When there are a plurality of target objects, the electronic device 101 may identify one group area including at least two target objects among the plurality of target objects as the target region. When there are a plurality of target objects, the electronic device 101 may identify each of a plurality of group areas including at least two target objects as a target region. Even when there are a plurality of target objects, the electronic device 101 may identify only an area corresponding to one target object among the plurality of target objects as the target region according to an embodiment described below.

Referring to FIG. 2, according to an embodiment, the electronic device 101 may identify a target object 214 (e.g., a person) included in the image 213 displayed on the first screen 210. The electronic device 101 may identify a target region 215 (e.g., an area corresponding to a face) corresponding to the target object 214 (e.g., a person) in the image 213 displayed on the first screen 210.

According to an embodiment, the electronic device 101 may display the second screen 220 or the third screen 230 after displaying the first screen 210. The electronic device 101 may display the first screen 210, and may display the second screen 220 or the third screen 230 according to a user input (e.g., a swipe input). For example, the electronic device 101 may display the first screen 210, and may display the third screen 230 where the stop area of an image (e.g., 213) is displayed according to settings, based on a user input (e.g., a swipe input). For example, the electronic device 101 may display the first screen 210 and, based on a user input (e.g., a swipe input), may display a screen where a lower area of the image is displayed according to settings. For example, the electronic device 101 may display the first screen 210 and, based on a user input (e.g., a swipe input), may display the second screen 220 such that a target region 215 (e.g., an area corresponding to a face) corresponding to the target object 214 (e.g., a person) is displayed close to a central portion of the image area 221 according to settings. Embodiments of the disclosure are described in detail with reference to the accompanying drawings.

According to an embodiment, the second screen 220 may include an image area 221 and a description area 222. The description area may be understood as an area other than the image area. For example, in the "description area", information related to the image displayed in the image area may be displayed. There is no limit to the type of "information related to the image." For example, the information related to the image may include the date and time when the image is generated or corrected, the title of the image, the specification of the image, the place where the image is obtained, and/or information (e.g., the name of the person) about the object included in the image. For example, in the description area, information other than the information related to the image displayed in the image area may be displayed, and the type of information displayed in the description area is not limited. After displaying the first screen 210, the electronic device 101 may display the second screen 220 according to a user input. The electronic device 101 may display a partial area (e.g., a designated image) of the image 223 (e.g., the image 213 displayed on the first screen 210) in the image area 221 of the second screen 220. The "designated image" of the image may be a whole of the image or a portion image of the entire area of the image displayed in the image area. The designated image may be an image including a region selected for displaying on a screen from a plurality of regions in the image that include the target region. Among the plurality of regions comprising at least a portion of the image, there may be regions that include all of the target region and regions that do not include the target region or include only a portion of the target region. The designated image may be an image including a region selected from the plurality of regions comprising the target region. For example, the electronic device 101 may identify a first region including the target region and a second region including the target region, and select (or identify) an image including the first region as the designated image based on a first distance from a center of the first region to a center of the target region being less than a second distance from a center of the second region to a center of the target region. The remaining area of the entire area of the image other than the designated image may not be displayed on the screen. The designated image of the image may include a target region (e.g., the entire area of the target region). The designated image of the image may include the target object (e.g., the entire target object or a portion of the target object). In part 2b of FIG. 2, the image area 221 of the second screen 220 may include the entire area of the target region 225 (e.g., the target region 215 of the first screen 210) of the image 223. For example, the electronic device 101 may control the display module 160 such that the entire area of the target region 225 of the image 223 is included in the image area 221 of the second screen 220. The electronic device 101 may control the display module 160 such that a portion of the target object 224 (e.g., the target object 214 on the first screen 210) of the image 223 is included in the image area 221 of the second screen 220. The electronic device 101 may control the display module 160 to display information related to the displayed image 223 in the description area 222 of the second screen 220.

For example, the third screen 230 may include an image area 231 and a description area 232. After displaying the first screen 210, the electronic device 101 may display the third screen 230 according to a user input. The electronic device 101 may display a partial area of the image 233 (e.g., the image 213 displayed on the first screen 210) in the image area 231 of the third screen 230. When a partial area of the image is displayed, the displayed partial area may include a target region (e.g., the entire area or partial area of the target region). When a partial area of the image is displayed, the displayed partial area may include a target object (e.g., the whole of the target object or a portion of the target object). In part 2c FIG. 2, the image area 231 of the third screen 230 may include a partial area of the target region 235 (e.g., the target region 215 of the first screen 210) of the image 233. For example, the electronic device 101 may control the display module 160 such that a partial area of the target region 235 of the image 233 is included in the image area 231 of the third screen 230. The electronic device 101 may control the display module 160 such that a portion of the target object 234 (e.g., the target object 214 on the first screen 210) of the image 233 is included in the image area 231 of the third screen 230. The electronic device 101 may control the display module 160 to display information related to the displayed image 233 in the description area 232 of the third screen 230.

FIG. 3 is a view illustrating operations of an electronic device according to an embodiment of the disclosure.

The embodiment of FIG. 3 may be understood similarly to the embodiment of FIG. 2. For example, FIG. 2 may be an embodiment when the electronic device 101 displays a screen in a vertical direction, and FIG. 3 may be an embodiment when the electronic device 101 displays a screen in a horizontal direction.

Referring to FIG. 3, according to an embodiment, the electronic device 101 (e.g., the processor 120) may control the display module 160 of the electronic device 101 to display a first screen 310, a second screen 320, or a third screen 330 corresponding to parts 3a, 3b, and 3c of FIG. 3.

According to an embodiment, the electronic device 101 may display the second screen 320 or the third screen 330 after displaying the first screen 310. After displaying the first screen 310, the electronic device 101 may display the second screen 320 according to a user input. After displaying the first screen 310, the electronic device 101 may display the third screen 330 according to a user input. The entire area of the image 313 may be displayed on the first screen 310. A partial area of the image 323 (e.g., the image 313 displayed on the first screen 310) may be displayed on the second screen 320. A partial area of the image 333 (e.g., the image 313 displayed on the first screen 310) may be displayed on the third screen 330.

According to an embodiment, the first screen 310 may include a first image area 311. The electronic device 101 may display the entire area of the image 313 in the first image area 311 of the first screen 310. The first screen 310 may include a thumbnail area 312. The electronic device 101 may display a thumbnail of at least one image in the thumbnail area 312 of the first screen 310.

Referring to FIG. 3, according to an embodiment, the electronic device 101 may identify a target object 314 (e.g., a person) included in the image 313 displayed on the first screen 310. The electronic device 101 may identify a target region 315 (e.g., an area corresponding to a face) corresponding to the target object 314 (e.g., a person) in the image 313 displayed on the first screen 310.

According to an embodiment, the electronic device 101 may display the second screen 320 or the third screen 330 after displaying the first screen 310.

For example, the second screen 320 may include an image area 321 and a description area 322. After displaying the first screen 310, the electronic device 101 may display the second screen 320 according to a user input. The electronic device 101 may display a partial area (e.g., a designated image) of the image 323 (e.g., the image 313 displayed on the first screen 310) in the image area 321 of the second screen 320. In part 3b of FIG. 3, the image area 321 of the second screen 320 may include the entire area of the target region 325 (e.g., the target region 315 of the first screen 310) of the image 323. For example, the electronic device 101 may control the display module 160 such that the entire area of the target region 325 of the image 323 is included in the image area 321 of the second screen 320. The electronic device 101 may control the display module 160 such that a portion of the target object 324 (e.g., the target object 314 on the first screen 310) of the image 323 is included in the image area 321 of the second screen 320. The electronic device 101 may control the display module 160 to display information related to the displayed image 323 in the description area 322 of the second screen 320.

For example, the third screen 330 may include an image area 331 and a description area 332. After displaying the first screen 310, the electronic device 101 may display the third screen 330 according to a user input. The electronic device 101 may display a partial area of the image 333 (e.g., the image 313 displayed on the first screen 310) in the image area 331 of the third screen 330. In part 3c of FIG. 3, the image area 331 of the third screen 330 may include a partial area of the target region 335 (e.g., the target region 315 of the first screen 310) of the image 333. For example, the electronic device 101 may control the display module 160 such that a partial area of the target region 335 of the image 333 is included in the image area 331 of the third screen 330. The electronic device 101 may control the display module 160 such that a portion of the target object 334 (e.g., the target object 314 on the first screen 310) of the image 333 is included in the image area 331 of the third screen 330. The electronic device 101 may control the display module 160 to display information related to the displayed image 333 in the description area 332 of the third screen 330.

Figure 4:
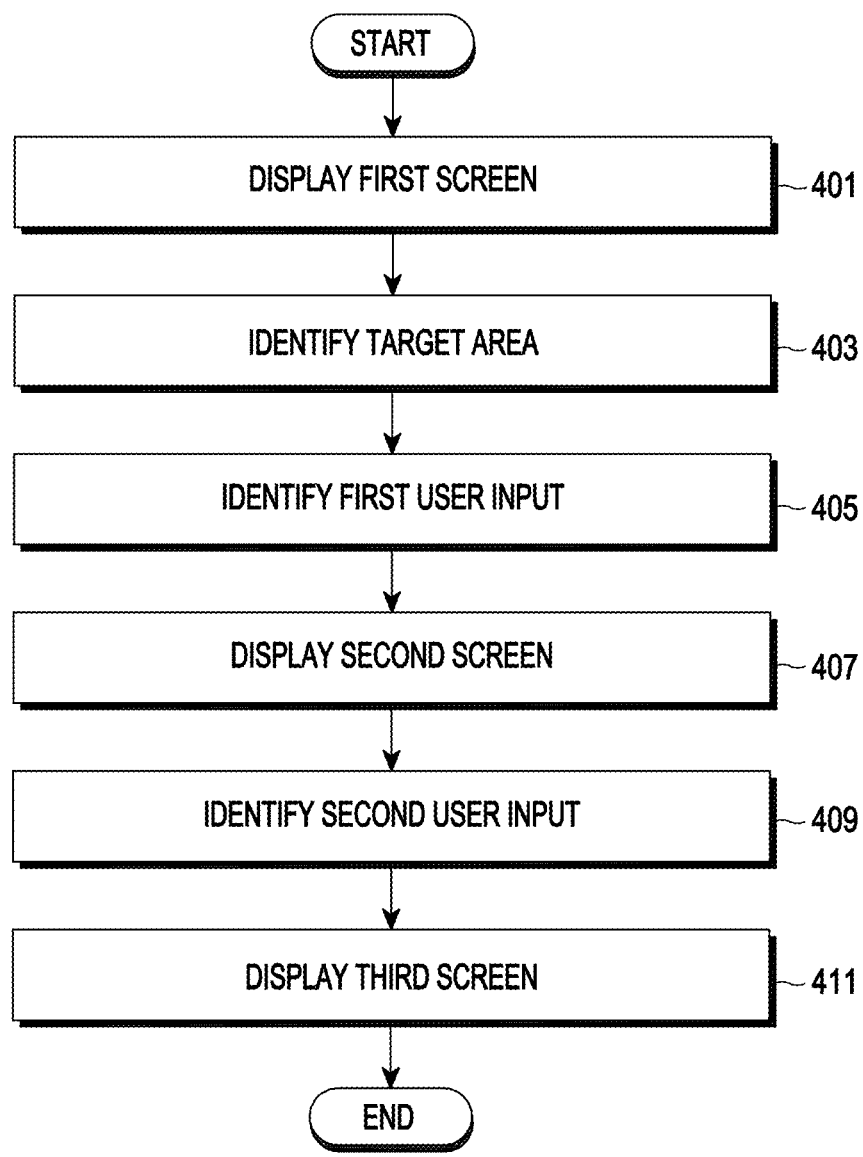
FIG. 4 is a flowchart illustrating an operation method of an electronic device according to an embodiment of the disclosure.
Figure 5:
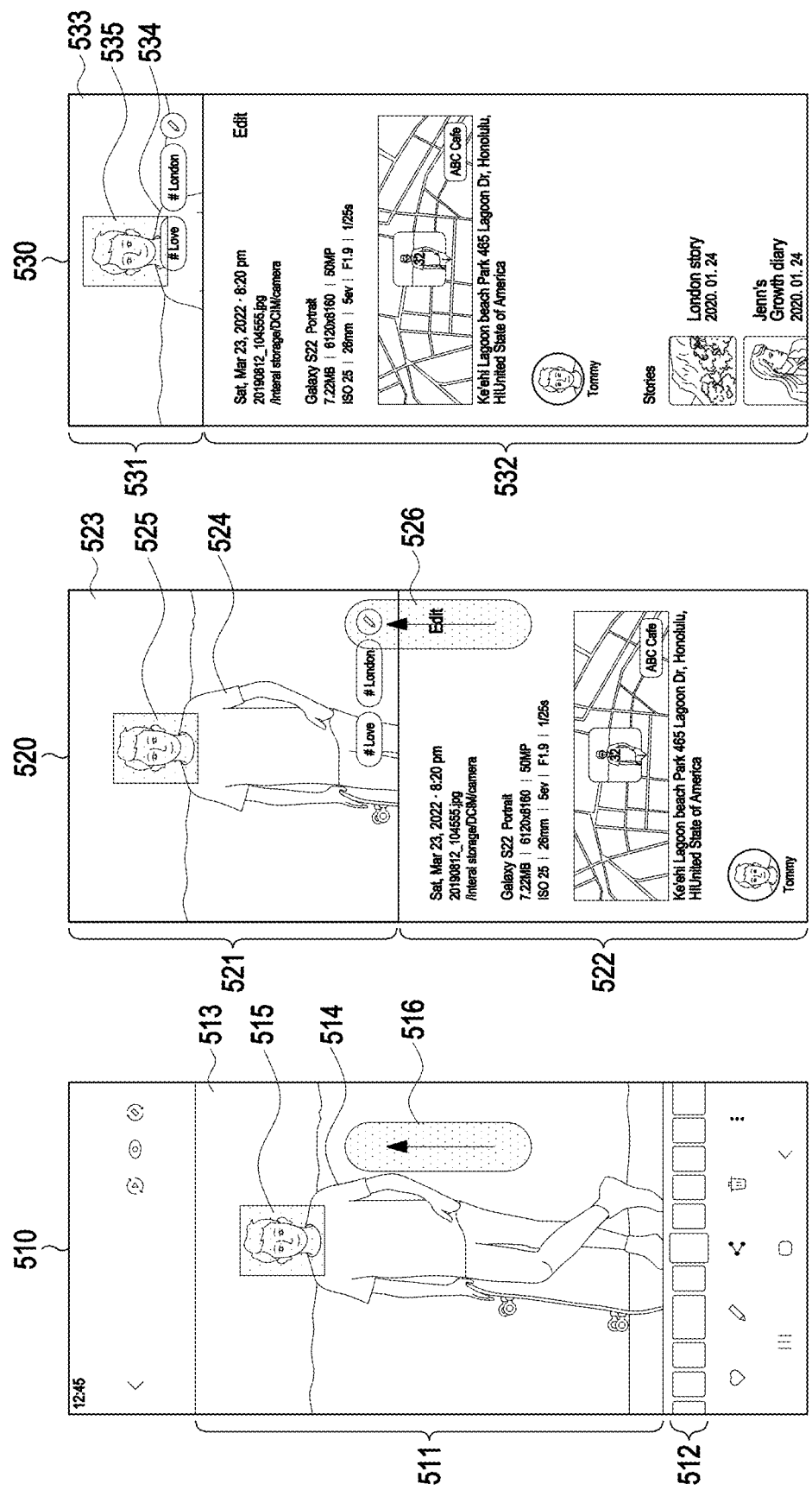
FIG. 5 is a view illustrating operations of an electronic device according to an embodiment of the disclosure.

FIG. 4 is a flowchart illustrating an operation method of an electronic device according to an embodiment of the disclosure. FIG. 4 may be described with reference to the previously described drawings and FIG. 5. FIG. 5 is a view illustrating operations of an electronic device according to an embodiment of the disclosure.

At least some of the operations of FIG. 4 may be omitted. The operation order of the operations of FIG. 4 may be changed. Operations other than the operations of FIG. 4 may be performed before, during, or after the operations of FIG. 4.

Referring to FIG. 4, in operation 401, according to an embodiment, the electronic device 101 (e.g., the processor 120) may display a first screen (e.g., 510 of FIG. 5). Referring to part 5a of FIG. 5, the electronic device 101 may display an image 513 (e.g., the entire area or a partial area of the image 513) in the first image area 511 of the first screen 510. The electronic device 101 may display a thumbnail of at least one image in the thumbnail area 512 of the first screen 510.

In operation 403, according to an embodiment, the electronic device 101 (e.g., the processor 120) may identify the target region (e.g., 515 of FIG. 5) of the image (e.g., 513 of FIG. 5) displayed on the first screen (e.g., 510 of FIG. 5). Referring to part 5a of FIG. 5, the electronic device 101 may identify the target object 514 (e.g., a person) included in the image 513. The electronic device 101 may identify a target region 515 (e.g., an area corresponding to a face) corresponding to the target object 514 (e.g., a person). Operation 403 may be performed after operation 401 is performed or may be performed before operation 401 is performed.

In operation 405, according to an embodiment, the electronic device 101 (e.g., the processor 120) may identify a first user input (e.g., 516 of FIG. 5) in a state in which the first screen (e.g., 510 of FIG. 5) is displayed. Referring to part 5a of FIG. 5, the first user input 516 may be a swipe input on the first screen 510, but this is merely an example, and the type of the user input is not limited thereto, and the user input may include, e.g., a touch or push on a software button, a touch or push on a hardware button, a touch on the screen, or a drag input.

In operation 407, according to an embodiment, the electronic device 101 (e.g., the processor 120) may display a second screen (e.g., 520 of FIG. 5) according to the first user input (e.g., 516 of FIG. 5). Referring to part 5b of FIG. 5, the electronic device 101 may display a partial area (e.g., a first designated image) of the image 523 (e.g., the image 513 displayed on the first screen 510) in the second image area 521 of the second screen 520. The size and/or display position of the second image area 521 may be different from the size and/or display position of the first image area 511. For example, the size (e.g., vertical height) of the second image area 521 may be smaller than the size (e.g., vertical height) of the first image area 511. For example, the display position of the second image area 521 may be a position moved upward of the electronic device 101 from the display position of the first image area 511. As the size and/or display position of the second image area 521 is different from the size and/or display position of the first image area 511, only a partial area of the image 513 displayed in the first image area 511 may be displayed in the second image area 521. As only a partial area of the image 513 displayed in the first image area 511 is displayed in the second image area 521, it is necessary to control the electronic device 101 such that a main object (e.g., the target object 514 and/or the target region 515) included in the image 513 is displayed in the second image area 521. For example, it is necessary to adjust the size and display position of the image 523 displayed in the second image area 521 according to the size and/or display position of the main object (e.g., the target object 514 and/or the target region 515) included in the image 513. According to an embodiment, the electronic device 101 may adjust the size and display position of the image 523 displayed in the second image area 521 such that the main object (e.g., the target object 514 and/or the target region 515) included in the image 513 displayed in the first image area 511 is displayed in the second image area 521. According to an embodiment, the electronic device 101 may determine the position of the first designated image including the target regions 515 and 525 in the images 513 and 523, based on the positions of the target regions 515 and 525 included in the images 513 and 523. For example, in order to determine the position of the first designated image including the target regions 515 and 525 in the images 513 and 523, the electronic device 101 may determine the position of the first designated image such that the target region 525 is displayed close to the center of the second image area 521. For example, in order to determine the position of the first designated image including the target regions 515 and 525 in the images 513 and 523, the electronic device 101 may determine the position of the first designated image to include the target regions 515 and 525, based on identifying that at least a partial area of the target regions 515 and 525 is not displayed in the second image area 521 as the first screen 510 is switched to the second screen 520. The first designated image of the image 523 displayed on the second screen 520 may include the entire area of the target region 525 (e.g., the target region 515 on the first screen 510) of the image 523. The size of the target region 525 displayed on the second screen 520 may be the same as or different from the size of the target region 515 displayed on the first screen 510. The size of the second image area 521, the size of the first designated image of the image 523 displayed in the second image area 521, and the size of the target region 525 are described in more detail with reference to FIGS. 19 to 27. The first designated image of the image 523 displayed on the second screen 520 may include a partial area of the target object 524 (e.g., the target object 514 on the first screen 510) included in the image 523. The electronic device 101 may determine a position where the target region 525 is displayed on the second screen 520, which is described in more detail with reference to FIGS. 19, 20, and 21. For example, the electronic device 101 may control the display module 160 such that the target region 525 is displayed close to the central portion of the second image area 521 of the second screen 520. When the target region is displayed close to the center portion of the image area, the center of the target region may be displayed close to the center portion of the image area. What is "displayed close to the center portion" (e.g., center framing) is described below. The electronic device 101 may display information related to the image 523 displayed in the second image area 521 in the first description area 522 of the second screen 520. The electronic device 101 may select (or identify) a designated image in the image to ensure that the target region 525 is displayed proximate to a central portion of the image region. For example, the electronic device 101 may identify a first region including the target region 525 and a second region including the target region 525, and select (or identify) the first region as the designated imagebased on a first distance from a center of the first region to a center of the target region 525 being less than a second distance from a center of the second region to a center of the target region 525.

Operations 409 and 411 below may be performed or omitted.

In operation 409, according to an embodiment, the electronic device 101 (e.g., the processor 120) may identify a second user input (e.g., 526 of FIG. 5) in a state in which the second screen (e.g., 520 of FIG. 5) is displayed. Referring to part 5b of FIG. 5, the second user input 526 may be a swipe input on the second screen 520, but this is exemplary, and the type of the user input is not limited.

In operation 411, according to an embodiment, the electronic device 101 (e.g., the processor 120) may display a third screen (e.g., 530 of FIG. 5) according to the second user input (e.g., 526 of FIG. 5). Referring to part 5c of FIG. 5, the electronic device 101 may display a partial area (e.g., a second designated image) of the image 533 (e.g., the image 513 displayed on the first screen 510) in the third image area 531 of the third screen 530. The second designated image of the image 533 displayed on the third screen 530 may include the entire area of the target region 535 (e.g., the target region 515 on the first screen 510) of the image 533. The size of the target region 535 displayed on the third screen 530 may be the same as or different from the size of the target region 515 displayed on the first screen 510. The size of the target region 535 displayed on the third screen 530 may be the same as or different from the size of the target region 525 displayed on the second screen 520. The size of the third image area 531, the size of the second designated image of the image 533 displayed in the third image area 531, and the size of the target region 535 are described in more detail with reference to FIGS. 19 to 27. The second designated image of the image 533 displayed on the third screen 530 may include a partial area of the target object 534 (e.g., the target object 514 on the first screen 510) included in the image 533. The electronic device 101 may determine a position where the target region 535 is displayed on the third screen 530, which is described in more detail with reference to FIGS. 19, 20, and 21. For example, the electronic device 101 may control the display module 160 such that the target region 535 is displayed close to the central portion of the third image area 531 of the third screen 530. The electronic device 101 may display information related to the image 533 displayed in the third image area 531 in the second description area 532 of the third screen 530. According to an embodiment, the size (e.g., height and/or width) of the third image area 531 may be smaller than the size (e.g., height and/or width) of the second image area 521.

Figure 6:
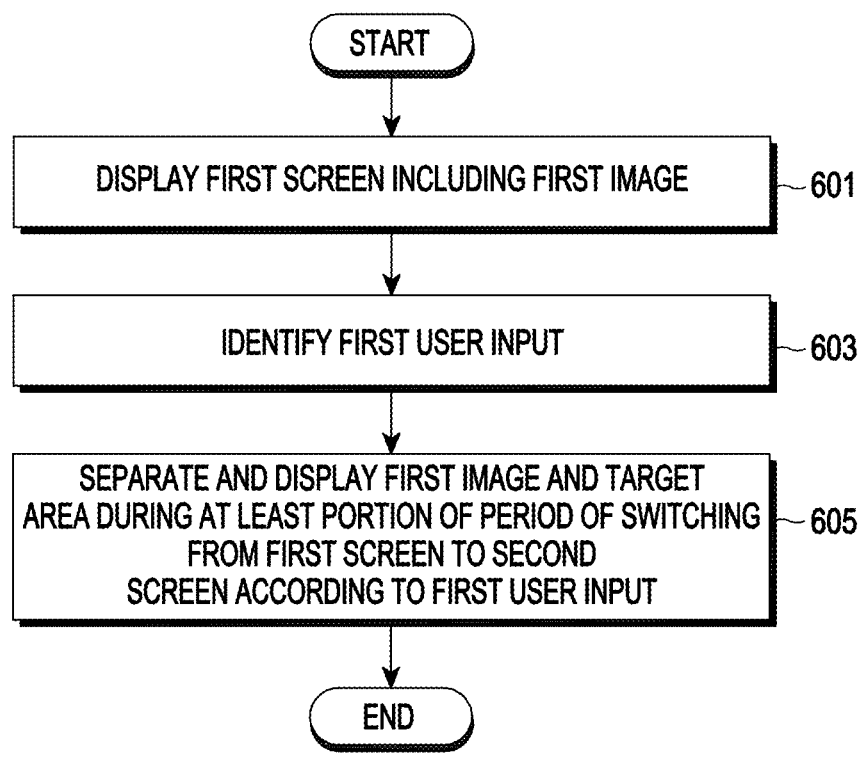
FIG. 6 is a flowchart illustrating an operation method of an electronic device according to an embodiment of the disclosure.
Figure 7:
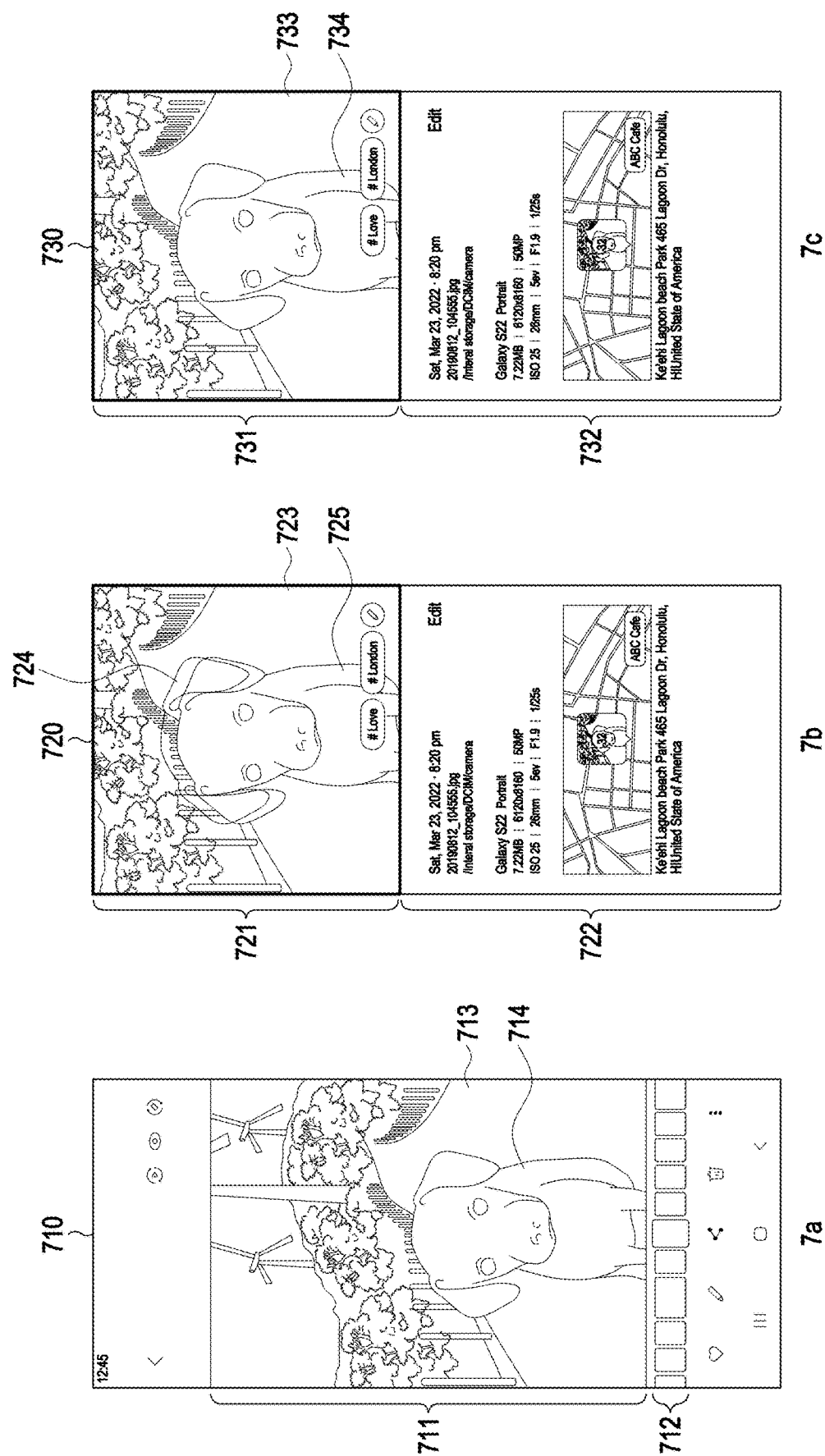
FIG. 7 is a view illustrating operations of an electronic device according to an embodiment of the disclosure.

FIG. 6 is a flowchart illustrating an operation method of an electronic device according to an embodiment of the disclosure. FIG. 6 may be described with reference to the previously described drawings and FIGS. 7 and 8. FIG. 7 is a view illustrating operations of an electronic device according to an embodiment of the disclosure. FIG. 8 is a view illustrating operations of an electronic device according to an embodiment of the disclosure.

At least some of the operations of FIG. 6 may be omitted. The operation order of the operations of FIG. 6 may be changed. Operations other than the operations of FIG. 6 may be performed before, during, or after the operations of FIG. 6. The operations of FIG. 6 may be performed organically with the operations of FIG. 4.

Referring to FIG. 6, in operation 601, according to an embodiment, the electronic device 101 (e.g., the processor 120) may display a first screen (e.g., 710 of FIG. 7) including an image (e.g., 713 of FIG. 7) (e.g., the first image). Referring to part 7a of FIG. 7, the electronic device 101 may control the display module 160 to display the entire area of the image 713 in the first image area 711 of the first screen 710. The image 713 of the first screen 710 may include a target object 714 (e.g., a pet). Referring to FIG. 7, it is assumed that the entire area of the target object 714 is the target region 714, and it may be understood similarly even when a partial area of the target object 714 is the target region 714. For example, the electronic device 101 may identify the target object 714 (or the target region 714 corresponding to the target object 714) included in the image 713 of the first screen 710. The first screen 710 may include a thumbnail area 712. The thumbnail area may be an area in which at least one thumbnail corresponding to at least one image is displayed. The electronic device 101 may display at least one thumbnail corresponding to at least one image in the thumbnail area 712 of the first screen 710. Among the at least one thumbnail displayed in the thumbnail area 712, a first thumbnail may be a thumbnail corresponding to the image 713 displayed in the first image area 711. The electronic device 101 may display, in the first image area 711, an image corresponding to a second thumbnail selected according to a user input of selecting the second thumbnail from among at least one thumbnail displayed in the thumbnail area 712.

In operation 603, according to an embodiment, the electronic device 101 (e.g., the processor 120) may identify a first user input (e.g., a swipe input such as FIG. 5) in a state in which the first screen (e.g., 710 of FIG. 7) is displayed. As described above, the type of user input is not limited.

In operation 605, according to an embodiment, the electronic device 101 (e.g., the processor 120) may separate and display an image (e.g., 723 of part 7b FIG. 7) and a target region (e.g., 725 of part 7b FIG. 7) during at least a portion of a period during which the first screen (e.g., 710 of FIG. 7) is switched to the second screen (e.g., 730 of FIG. 7) according to a first user input (e.g., a user input made while the first screen (e.g., 710 of FIG. 7) is displayed). For example, referring to FIG. 7, the electronic device 101 may switch the screen from the first screen 710 to the second screen 730 according to the first user input (e.g., a user input made while the first screen 710 is displayed). In this case, before finally displaying the second screen 730, the electronic device 101 may separate and display the image 723 and the target region 725. As the image 723 and the target region 725 are separated and displayed, a portion of the target region 724 included in the image 723 and a portion of the separated target region 725 may be displayed to overlap each other. For example, the electronic device 101 may display an image 723 (e.g., the image 713 of the first screen 710) moving from the first image area 711 to the second image area 731 during at least a portion of the period of switching from the first screen 710 to the second screen 730 and, at this time, may control the display module 160 such that the moving speed of the image 723 (e.g., the image 713 of the first screen 710) and the moving speed of the target region 725 (e.g., the target region 714 of the first screen 710) are displayed as differing from each other. Referring to part 7c of FIG. 7, the relative position of the target region 734 in the image 733 displayed on the second screen 730 may be the same as the relative position of the target region 714 in the image 713 displayed on the first screen 710. Part 7c of FIG. 7 may include description area 732.

The embodiment of FIG. 8 may be understood similarly to the embodiment of FIG. 7. For example, FIG. 7 may be an embodiment when the electronic device 101 displays a screen in a vertical direction, and FIG. 8 may be an embodiment when the electronic device 101 displays a screen in a horizontal direction.

Referring to part 8a of FIG. 8, according to an embodiment, the electronic device 101 (e.g., the processor 120) may display a first screen 810 including an image 813 (e.g., a first image). The electronic device 101 may display the entire area of the image 813 in the first image area 811 of the first screen 810. The image 813 displayed on the first screen 810 may include a target object (or target region) 814. The first screen 810 may include a thumbnail area 812. The thumbnail area may be an area in which at least one thumbnail corresponding to at least one image is displayed. The electronic device 101 may display at least one thumbnail corresponding to at least one image in the thumbnail area 812 of the first screen 810. Among the at least one thumbnail displayed in the thumbnail area 812, a first thumbnail may be a thumbnail corresponding to the image 813 displayed in the first image area 811. The electronic device 101 may display, in the first image area 811, an image corresponding to a second thumbnail selected according to a user input of selecting the second thumbnail from among at least one thumbnail displayed in the thumbnail area 812. The electronic device 101 may identify a target object (or target region) 814 included in the image 813. The electronic device 101 may identify a user input in a state in which the first screen 810 is displayed. The electronic device 101 may switch the screen from the first screen 810 to the second screen 830 in part 8c of FIG. 8 according to a user input. In this case, before finally displaying the second screen 830, the electronic device 101 may separate and display the image 823 and the target region 825 in the second image area 821 as shown in screen 820 in part 8b of FIG. 8. The screen 820 may include a description area 822. The screen 830 may include a description area 832. As the image 823 and the target region 825 are separated and displayed, the target region 824 included in the image 823 and a portion of the separated target region 825 may be displayed to overlap each other. For example, the electronic device 101 may display an image 823 (e.g., the image 813 of the first screen 810) moving from the first image area 811 to the second image area 831 during at least a portion of the period of switching from the first screen 810 to the second screen 830 and, at this time, may control the display module 160 such that the moving speed of the image 823 (e.g., the image 813 of the first screen 810) and the moving speed of the target region 825 (e.g., the target region 814 of the first screen 810) are displayed as differing from each other. Referring to part 8c of FIG. 8, the relative position of the target region 834 in the image 833 displayed on the second screen 830 may be the same as the relative position of the target region 814 in the image 813 displayed on the first screen 810.

Figure 9:
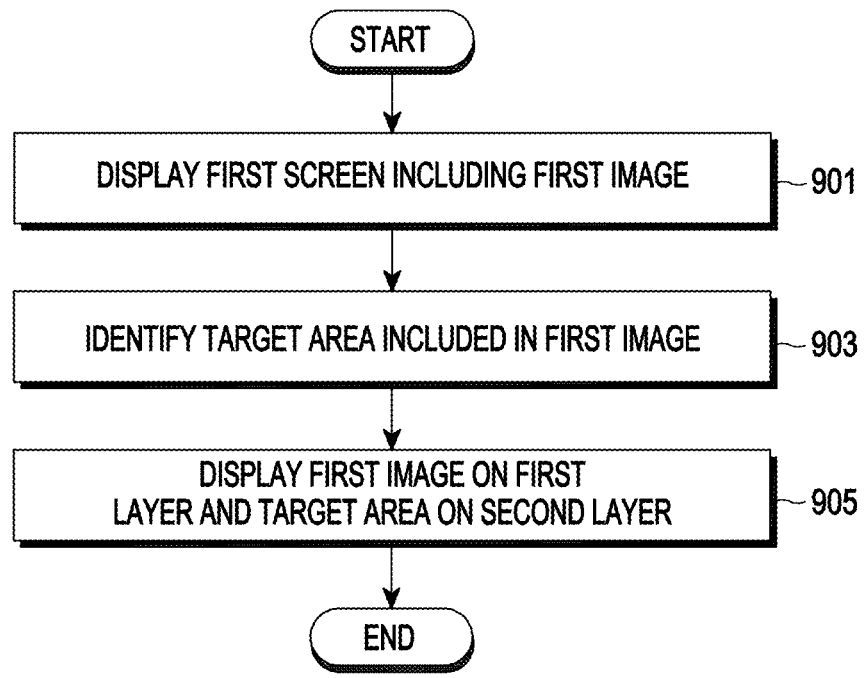
FIG. 9 is a flowchart illustrating an operation method of an electronic device according to an embodiment of the disclosure.
Figure 10:
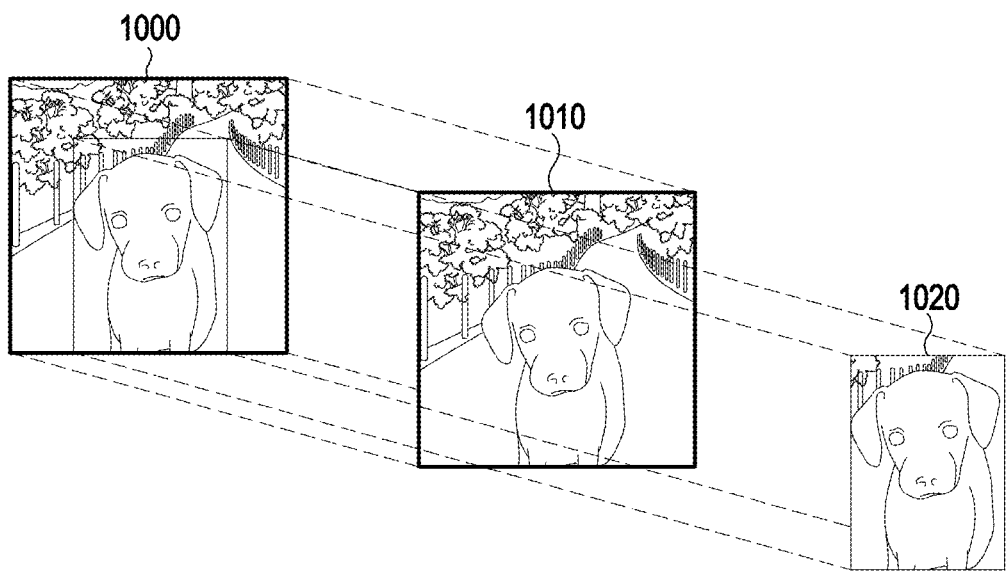
FIG. 10 is a view illustrating operations of an electronic device according to an embodiment of the disclosure.

FIG. 9 is a flowchart illustrating an operation method of an electronic device according to an embodiment of the disclosure. FIG. 9 may be described with reference to the previously described drawings and FIG. 10. FIG. 10 is a view illustrating operations of an electronic device according to an embodiment of the disclosure.

At least some of the operations of FIG. 9 may be omitted. The operation order of the operations of FIG. 9 may be changed. Operations other than the operations of FIG. 9 may be performed before, during, or after the operations of FIG. 9. The operations of FIG. 9 may be performed organically with the operations of FIG. 4 and/or FIG. 6.

Referring to FIG. 9, in operation 901, according to an embodiment, the electronic device 101 (e.g., the processor 120) may display a first screen including a first image (e.g., 1000 of FIG. 10).

In operation 903, according to an embodiment, the electronic device 101 (e.g., the processor 120) may identify a target region (e.g., an area corresponding to a pet in the first image 1000 of FIG. 10) included in the first image (e.g., 1000 of FIG. 10).

In operation 905, according to an embodiment, the electronic device 101 (e.g., the processor 120) may control the display module 160 to display a first image (e.g., 1010 of FIG. 10) on a first layer and to display a target region (e.g., 1020 of FIG. 10) on a second layer. For example, in part 7a FIG. 7, the first screen 710 may be a screen displayed together in a state in which the first layer corresponding to the image 713 and the second layer corresponding to the target region 714 are stopped. For example, in part 7b FIG. 7, the screen 720 is a screen displayed while the first layer corresponding to the image 723 and the second layer corresponding to the target region 725 move, and the moving speed of the first layer and the moving speed of the second layer may be different. The screen 720 may include an image area 721 and a description area 722.

Figure 11:
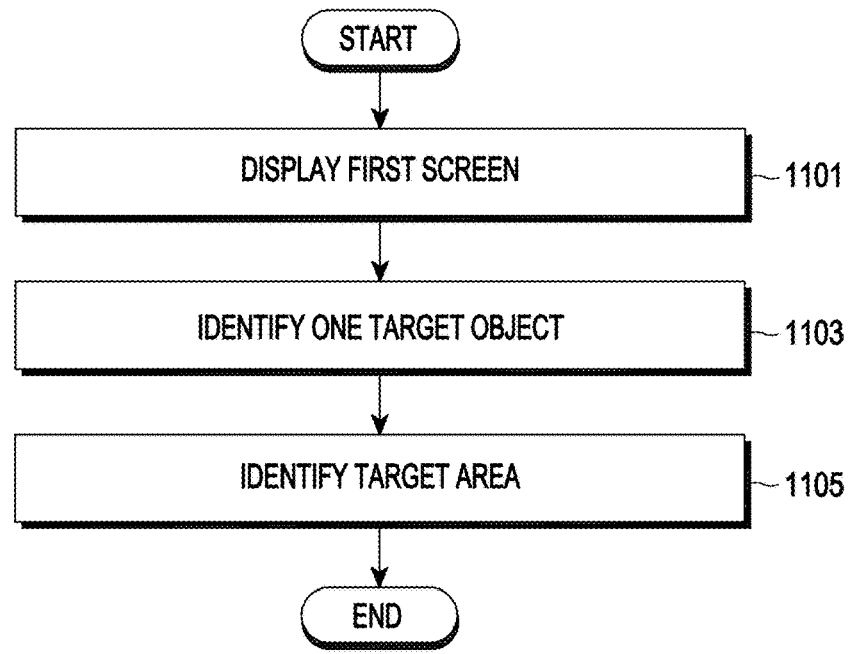
FIG. 11 is a flowchart illustrating an operation method of an electronic device according to an embodiment of the disclosure.
Figure 12:
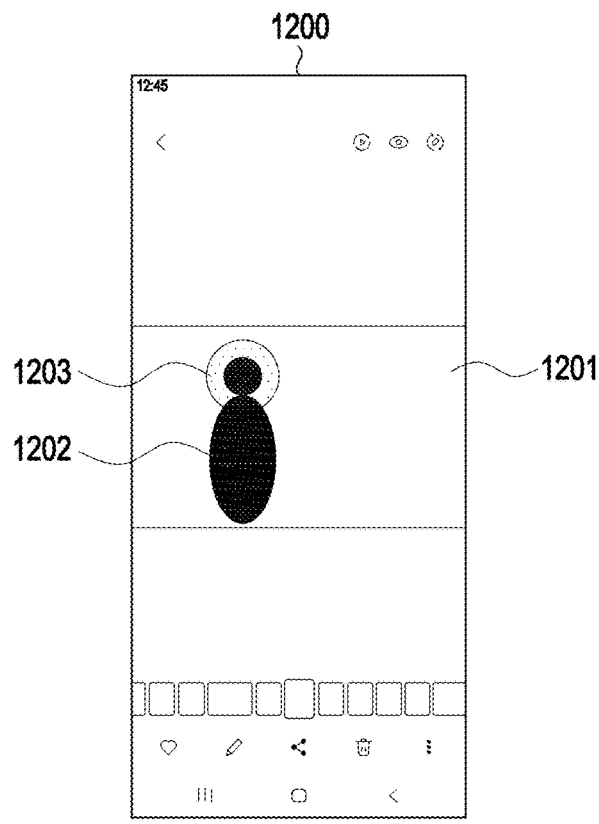
FIG. 12 is a view illustrating operations of an electronic device according to an embodiment of the disclosure.

FIG. 11 is a flowchart illustrating an operation method of an electronic device according to an embodiment of the disclosure. FIG. 11 may be described with reference to the previously described drawings and FIG. 12. FIG. 12 is a view illustrating operations of an electronic device according to an embodiment of the disclosure.

At least some of the operations of FIG. 11 may be omitted. The operation order of the operations of FIG. 11 may be changed. Operations other than the operations of FIG. 11 may be performed before, during, or after the operations of FIG. 11. The operations of FIG. 11 may be performed organically with the operations of FIGS. 4, 6 and/or 9.

Referring to FIG. 11, in operation 1101, according to an embodiment, the electronic device 101 (e.g., the processor 120) may display a first screen (e.g., 1200 of FIG. 12).

In operation 1103, according to an embodiment, the electronic device 101 (e.g., the processor 120) may identify one target object (e.g., 1202 of FIG. 12) included in the image (e.g., 1201 of FIG. 12) displayed on the first screen (e.g., 1200 of FIG. 12).

In operation 1105, according to an embodiment, the electronic device 101 (e.g., the processor 120) may identify a target region (e.g., 1203 of FIG. 12) (e.g., one target region) corresponding to one target object (e.g., 1202 of FIG. 12) included in the image (e.g., 1201 of FIG. 12).

Figure 13:
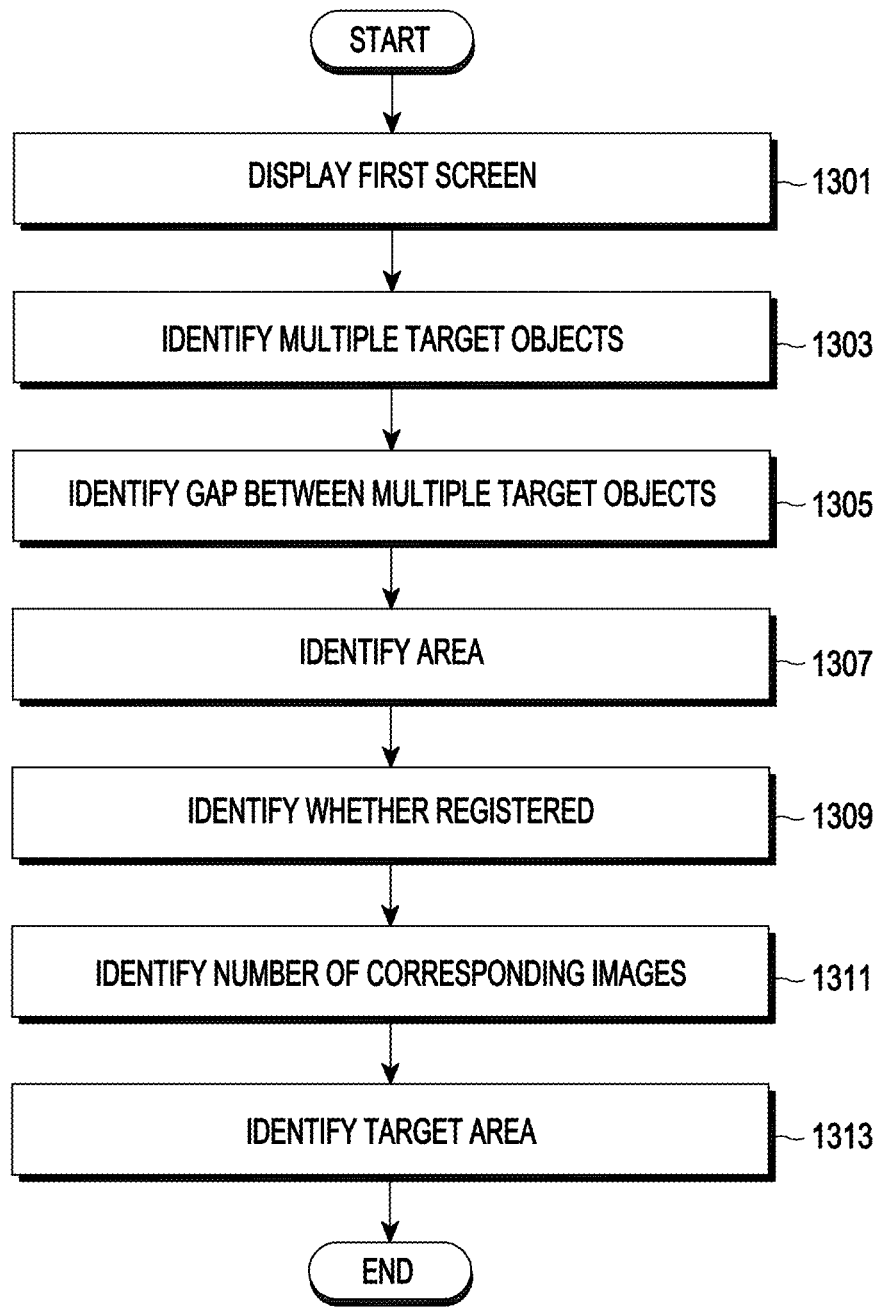
FIG. 13 is a flowchart illustrating an operation method of an electronic device according to an embodiment of the disclosure.
Figure 14:
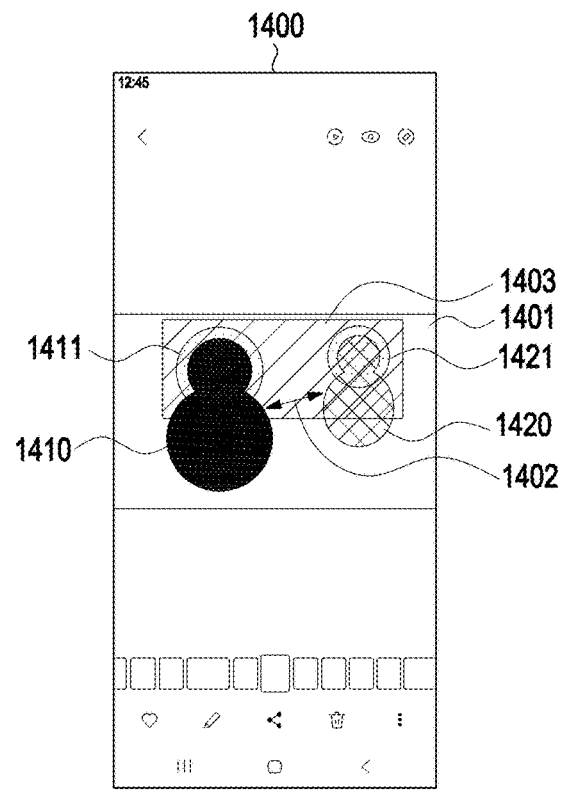
FIG. 14 is a view illustrating operations of an electronic device according to an embodiment of the disclosure.
Figure 15:
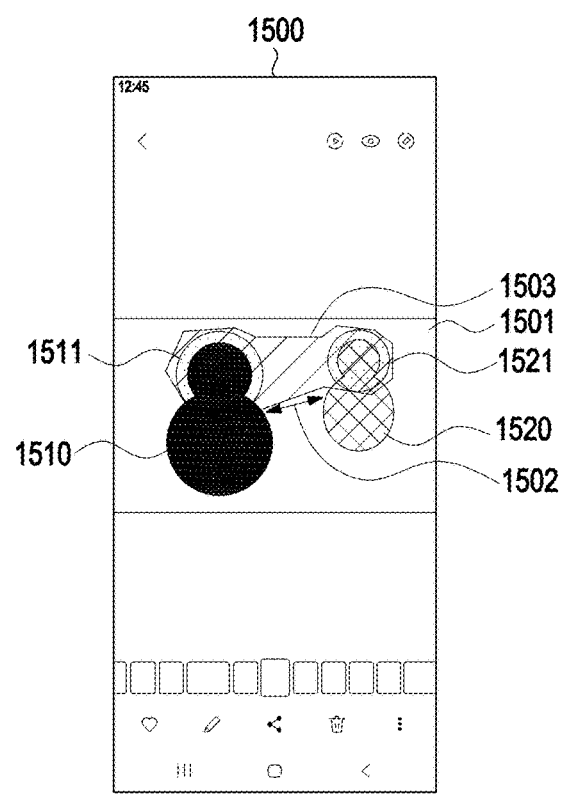
FIG. 15 is a view illustrating operations of an electronic device according to an embodiment of the disclosure.
Figure 16:
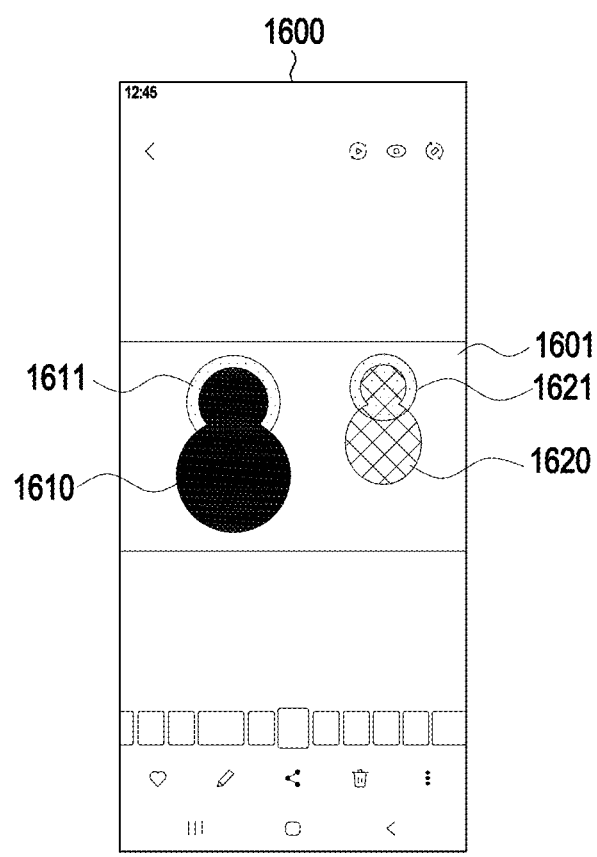
FIG. 16 is a view illustrating operations of an electronic device according to an embodiment of the disclosure.

FIG. 13 is a flowchart illustrating an operation method of an electronic device according to an embodiment of the disclosure. FIG. 13 may be described with reference to the previously described drawings and FIGS. 14, 15, and 16. FIG. 14 is a view illustrating operations of an electronic device according to an embodiment of the disclosure. FIG. 15 is a view illustrating operations of an electronic device according to an embodiment of the disclosure. FIG. 16 is a view illustrating operations of an electronic device according to an embodiment of the disclosure.

At least some of the operations of FIG. 13 may be omitted. The operation order of the operations of FIG. 13 may be changed. Operations other than the operations of FIG. 13 may be performed before, during, or after the operations of FIG. 13. The operations of FIG. 13 may be performed organically with the operations of FIGS. 4, 6, 9, and/or 11.

Referring to FIG. 13, in operation 1301, according to an embodiment, the electronic device 101 (e.g., the processor 120) may display a first screen (e.g., 1400 of FIG. 14, 1500 of FIG. 15, or 1600 of FIG. 16).

In operation 1303, according to an embodiment, the electronic device 101 (e.g., the processor 120) may identify a plurality of target objects (e.g., 1410 and 1420 of FIGS. 14, 1510 and 1520 of FIG. 15, or 1610 and 1620 of FIG. 16) included in an image (e.g., 1401 of FIG. 14, 1501 of FIG. 15, or 1601 of FIG. 16) displayed on a first screen (e.g., 1400 of FIG. 14, 1500 of FIG. 15, or 1600 of FIG. 16).

At least one of operation 1305, operation 1307, operation 1309, or operation 1311 may be omitted.

In operation 1305, according to an embodiment, the electronic device 101 (e.g., the processor 120) may identify the gap between the plurality of target objects in operation 1303. The "gap of the plurality of target objects" may be a gap between nearest boundary lines of the plurality of target objects (e.g., 1410 and 1420 of FIG. 14), or a gap between nearest boundary lines of the plurality of target regions (e.g., 1411 and 1421 of FIG. 14) corresponding to the plurality of target objects (e.g., 1410 and 1420 of FIG. 14). According to an embodiment, in operation 1313, the electronic device 101 may identify the group area corresponding to the plurality of target objects as the target region, based on the gap between the plurality of target objects in operation 1303 being equal to or less than a reference value (e.g., a designated ratio to the size (width and/or height) of the image including the plurality of target objects). For example, the electronic device 101 may identify a plurality of target objects which are "persons" among the plurality of target objects in operation 1303, and may identify a group area corresponding to the plurality of target objects as the target region based on the gap between the plurality of target objects which are "persons" being less than or equal to a reference value (e.g., a designated ratio to the size (width and/or height) of an image including the plurality of target objects). For example, in FIG. 14, the electronic device 101 may identify a first group area 1403 including a first target region 1411 corresponding to the first target object 1410 and a second target region 1421 corresponding to the second target object 1420 as the target region, based on the gap 1402 between the first target object 1410 and the second target object 1420 being less than or equal to the reference value. As shown in FIG. 14, the group area (e.g., the first group area 1403) may be a rectangular area including a plurality of target regions (e.g., the first target region 1411 and the second target region 1421), but is not limited thereto. For example, in FIG. 15, based on the gap 1502 between the third target object 1510 and the fourth target object 1520 being less than or equal to the reference value, the electronic device 101 may identify a second group area 1503 including a third target region 1511 corresponding to the third target object 1510 and a fourth target region 1521 corresponding to the fourth target object 1520 as the target region. As shown in FIG. 15, the group area (e.g., the second group area 1503) may be any area including a plurality of target regions (e.g., the third target region 1511 and the fourth target region 1521), but is not limited thereto. For example, in FIG. 16, the electronic device 101 may not consider the group area based on the gap between a fifth target object 1610 and a sixth target object 1620 exceeding the reference value.

In operation 1307, according to an embodiment, the electronic device 101 (e.g., the processor 120) may identify the area of each of the plurality of target objects in operation 1303. For example, in FIG. 16, the electronic device 101 may identify the area of the first target object 1610 (e.g., the ratio of the area of the target object to the size of the image 1601) and the area of the second target object 1620 (e.g., the ratio of the area of the target object to the size of the image 1601). According to an embodiment, in operation 1313, the electronic device 101 may identify the area 1611 corresponding to the target object (e.g., the first target object 1610) having an area greater than or equal to the reference value as the target region, based on only the area of one target object (e.g., the first target object 1610) among the plurality of target objects (e.g., the first target object 1610 and the second target object 1620) in operation 1303 being greater than or equal to the reference value. According to an embodiment, in operation 1313, based on the area of a plurality of target objects (e.g., the first target object 1610 and the second target object 1620) among the plurality of target objects (e.g., the first target object 1610 and the second target object 1620) in operation 1303 being greater than or equal to the reference value, the electronic device 101 may identify the target region based on the result of operation 1309 and/or operation 1311.

In operation 1309, according to an embodiment, the electronic device 101 (e.g., the processor 120) may identify whether each of the plurality of target objects in operation 1303 is registered. For example, when the target object is a person, whether each target object is registered indicates whether information (e.g., name) corresponding to the corresponding target object is stored in an application (e.g., a gallery application) or the electronic device 101. For example, the electronic device 101 may match the name of a specific person with the image of the specific person and store the same. According to an embodiment, in operation 1313, the electronic device 101 may identify an area 1611 corresponding to the first target object 1610 as a target region, based on registration of only the first target object 1610 among the plurality of target objects 1610 and 1620 of FIG. 16. According to an embodiment, in operation 1313, the electronic device 101 may identify the target region (e.g., target regions 1611 and 1621) based on the result of operation 1307 and/or operation 1311, based on registration of a plurality of target objects 1610 and 1620 among the plurality of target objects 1610 and 1620 of FIG. 16.

In operation 1311, according to an embodiment, the electronic device 101 (e.g., the processor 120) may identify the number of images respectively corresponding to the plurality of target objects in operation 1303. The "number of images corresponding to the target object" may be the number of images including an object having information corresponding to information (e.g., person information) about the target object among at least one image stored in the electronic device 101 or an application (e.g., gallery application). According to an embodiment, in operation 1313, the electronic device 101 may identify the area 1611 corresponding to the first target object 1610 as the target region, based on the number of images corresponding to the first target object 1610 among the plurality of target objects 1610 and 1620 of FIG. 16 being greater than the number of images corresponding to the second target object 1620. According to an embodiment, in operation 1313, the electronic device 101 may identify the target region based on the result of operation 1307 and/or 1319, based on the number of images corresponding to the first target object 1610 and the number of images corresponding to the second target object 1620 among the plurality of target objects 1610 and 1620 of FIG. 16 are being the same. According to an embodiment, in operation 1313, the electronic device 101 may identify the area 1611 corresponding to the first target object 1610 as the target region, based on the number of images corresponding to the first target object 1610 among the plurality of target objects 1610 and 1620 of FIG. 16 being greater than a designated number. According to an embodiment, in operation 1313, the electronic device 101 may identify the target region based on the result of comparing the number of images corresponding to the first target object 1610 and the number of images corresponding to the second target object 1620 and/or the result of operation 1307 and/or 1309, based on the number of images corresponding to the first target object 1610 and the number of images corresponding to the second target object 1620 among the plurality of target objects 1610 and 1620 of FIG. 16 being all greater than the designated number.

According to an embodiment, the electronic device 101 may identify each of the plurality of group areas in operation 1305. For example, the electronic device 101 may identify the first group area corresponding to the first target object and the second target object and the second group area corresponding to the third target object and the fourth target object, based on the gap between the target objects. As the electronic device 101 identifies the plurality of group areas, the electronic device 101 may perform operation 1307, operation 1309, and/or operation 1311 on the plurality of group areas. For example, the electronic device 101 may identify one of the first group area or the second group area as the target region by comparing the area of the first group area with the area of the second group area. For example, the electronic device 101 may identify one of the first group area or the second group area as the target region according to whether the plurality of target objects corresponding to the first group area are registered and whether the plurality of target objects corresponding to the second group area are registered. For example, the electronic device 101 may identify one of the first group area or the second group area as the target region by comparing the number of images corresponding to the plurality of target objects corresponding to the first group area with the number of images corresponding to the plurality of target objects corresponding to the second group area.

According to an embodiment, the electronic device 101 may identify a plurality of target objects in operation 1303, and may identify the target region according to the priority of the plurality of target objects in operation 1313. For example, the type of the target object may include a person (or face), a pet, a document (or character), food, or other objects (e.g., tourist attractions, artworks). The electronic device 101 may determine the priority between the plurality of target objects according to the type of the target object. For example, when the first target object is a person and the second target object is a pet among the plurality of target objects identified in operation 1303, the electronic device 101 may identify an area corresponding to the first target object that is the person as the target region. There is no limit to the criteria for determining priority. According to an embodiment, the electronic device 101 may determine the priority between the plurality of target objects based on the area and type of the target object. For example, when the first target object is a person and the second target object is a pet among the plurality of target objects identified in operation 1303, the electronic device 101 may identify the area corresponding to the second target object as the target region based on the area of the second target object being a reference area or more, and the area of the first target object being less than the reference area. According to an embodiment, the electronic device 101 may determine the priority between the plurality of target objects based on the area in operation 1307, whether registered in operation 1309, the number of images corresponding to operation 1311, and/or the type of the target object.

As described with reference to FIG. 13, operations 1305, 1307, 1309, 1311, and 1313 may be organically performed. At least one of operation 1305, operation 1307, operation 1309, or operation 1311 may not be performed. The order of operations 1305, 1307, 1309, 1311, and 1313 is not limited.

Figures 17, 18:
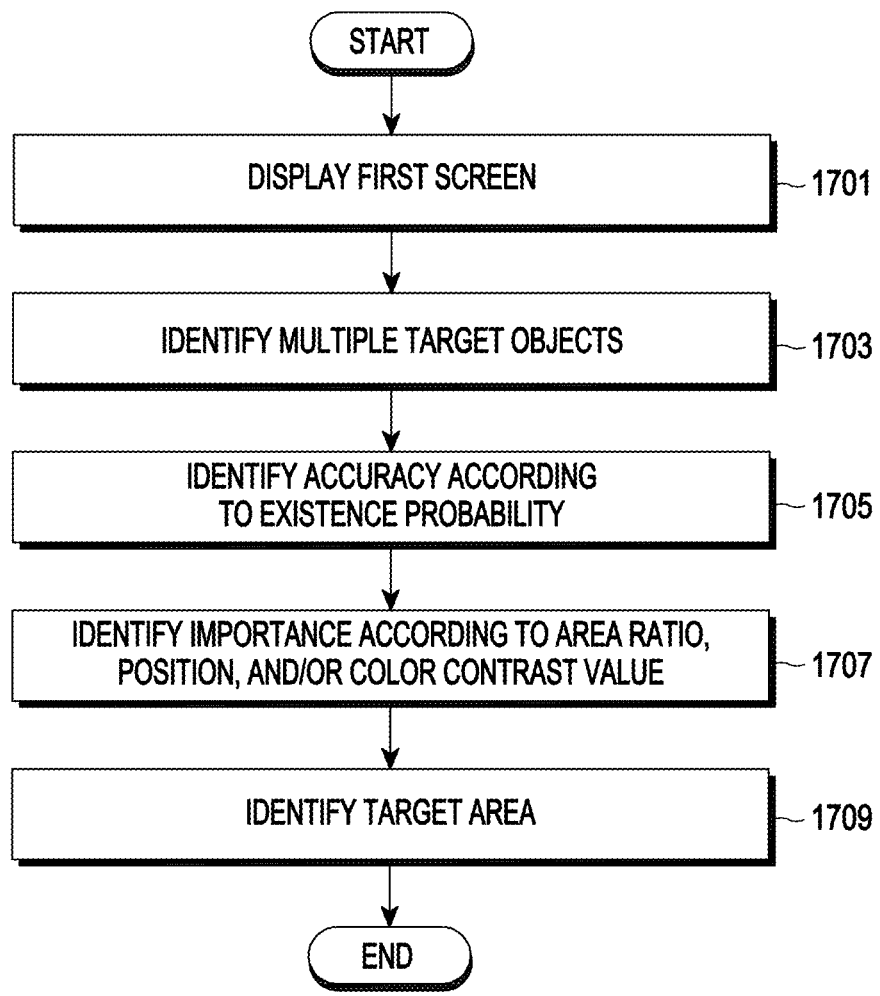
FIG. 17 is a flowchart illustrating an operation method of an electronic device according to an embodiment of the disclosure.
FIG. 18 is a view illustrating operations of an electronic device according to an embodiment of the disclosure.

FIG. 17 is a flowchart illustrating an operation method of an electronic device according to an embodiment of the disclosure. FIG. 17 may be described with reference to the previously described drawings and FIG. 18. FIG. 18 is a view illustrating operations of an electronic device according to an embodiment of the disclosure.

At least some of the operations of FIG. 17 may be omitted. The operation order of the operations of FIG. 17 may be changed. Operations other than the operations of FIG. 17 may be performed before, during, or after the operations of FIG. 17. The operations of FIG. 17 may be performed organically with the operations of FIGS. 4, 6, 9, 11, and/or 13.

Referring to FIG. 17, in operation 1701, according to an embodiment, the electronic device 101 (e.g., the processor 120) may display a first screen (e.g., 1600 of FIG. 16).

In operation 1703, according to an embodiment, the electronic device 101 (e.g., the processor 120) may identify a plurality of target objects (e.g., 1610 and 1620 of FIG. 16) included in the first image (e.g., 1601 of FIG. 16) displayed on the first screen (e.g., 1600 of FIG. 16).

In operation 1705, according to an embodiment, the electronic device 101 (e.g., the processor 120) may identify the accuracy according to the existence probability corresponding to each of the plurality of target objects in operation 1703. The "existence probability" may be the probability that the target object actually exists in the image. The electronic device 101 may identify the existence probability corresponding to each of the plurality of target objects in operation 1703, and may identify that the "accuracy" of the target object having a high existence probability is high. For example, the electronic device 101 may identify at least one target object of which accuracy according to the existence probability is equal to or greater than a reference value, among the plurality of target objects (e.g., 1610 and 1620 of FIG. 16). When there is one target object whose accuracy according to the existence probability is equal to or greater than the reference value, the electronic device 101 may identify the area corresponding to the target object as the target region. When there are a plurality of target objects whose accuracy according to the existence probability is equal to or greater than a reference value, the electronic device 101 may perform operation 1707.

In operation 1707, according to an embodiment, the electronic device 101 (e.g., the processor 120) may identify the importance of each of the plurality of target objects (e.g., 1610 and 1620 of FIG. 16) of which the accuracy in operation 1705 is equal to or greater than the reference value. The "importance" may be identified according to the area, position, and/or color contrast value of the target object. For example, the electronic device 101 may identify the importance of the target object based on the score according to the area of the target object, the score according to the position, and/or the score according to the color contrast value (or the sum of the scores). For example, the electronic device 101 may identify, as the target region, the area corresponding to the target object having a larger sum of a score reflecting a weight according to the area of the target object, a score reflecting a weight according to the position, and a score reflecting a weight according to the color contrast value, among the plurality of target objects (e.g., 1610 and 1620 of FIG. 16). For example, referring to FIG. 16, according to the areas of the plurality of target objects 1610 and 1620, the score corresponding to the area of the first target object 1610 may be greater than the score corresponding to the area of the second target object 1620. For example, referring to FIG. 18, the position score of the target object may be different depending on the position in the image. For example, in part 18*a* of FIG. 18, the electronic device 101 may divide the image into nine designated images, may divide grades A, B, and C according to positions where target objects included in the image are present, and may consider the score according to each grade. For example, in part 18*b* of FIG. 18, the electronic device 101 may consider the score according to the distance from the center of the image to each target object. For example, as the contrast between the color of each target object and the background color increases, the electronic device 101 may consider that the importance is higher.

In operation 1709, according to an embodiment, the electronic device 101 (e.g., the processor 120) may identify the area corresponding to one target object as the target region according to the accuracy in operation 1705 and the importance in operation 1707 among the plurality of target objects in operation 1703.

Figure 19:
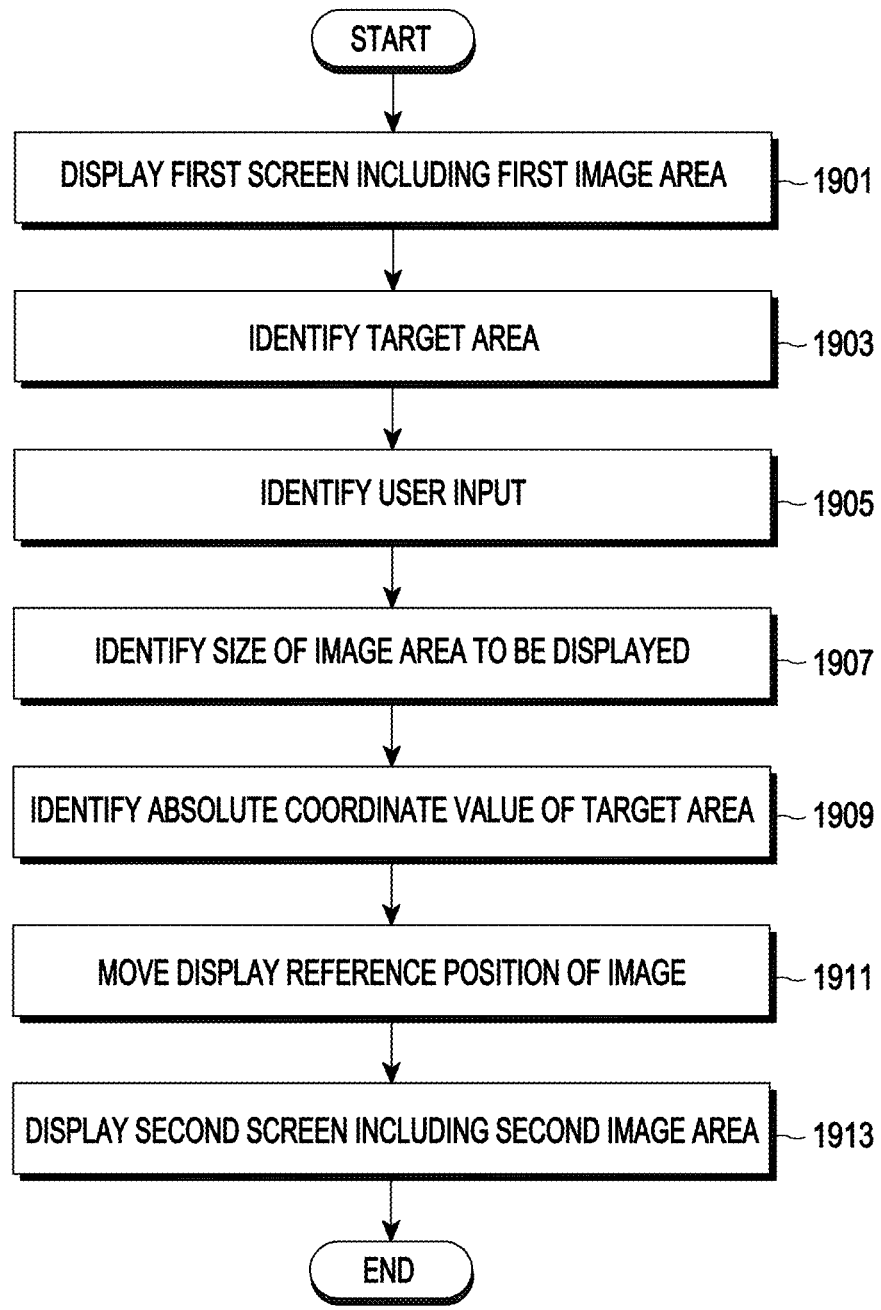
FIG. 19 is a flowchart illustrating an operation method of an electronic device according to an embodiment of the disclosure.
Figure 20:
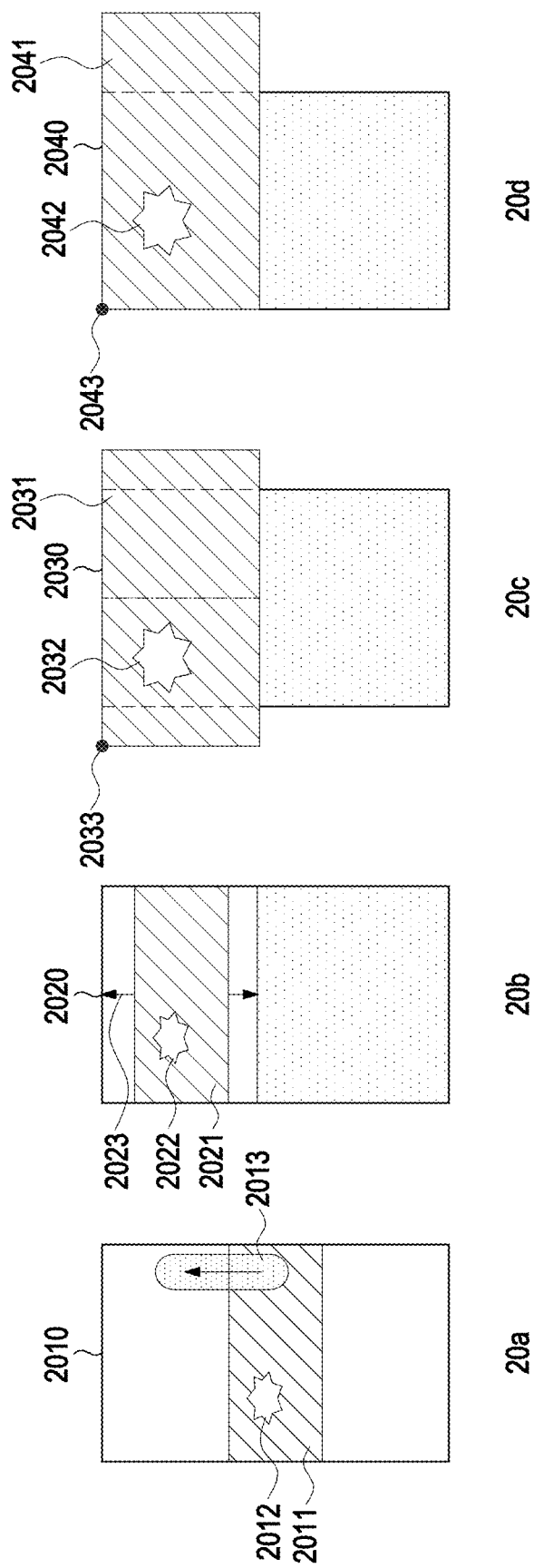
FIG. 20 is a view illustrating operations of an electronic device according to an embodiment of the disclosure.
Figure 21:
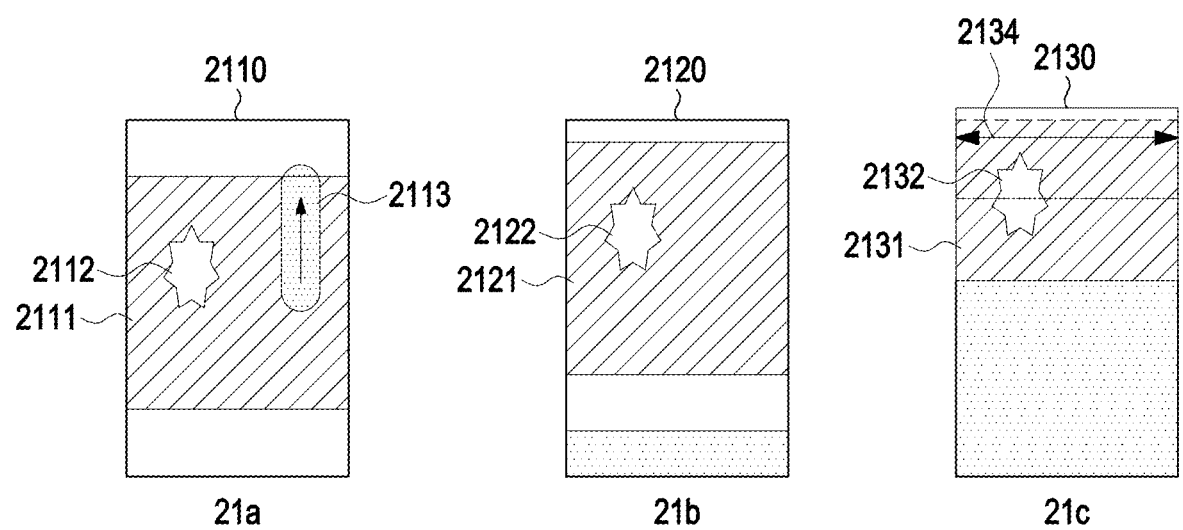
FIG. 21 is a view illustrating operations of an electronic device according to an embodiment of the disclosure.

FIG. 19 is a flowchart illustrating an operation method of an electronic device according to an embodiment of the disclosure. FIG. 19 may be described with reference to the previously described drawings and FIGS. 20 and 21. FIG. 20 is a view illustrating operations of an electronic device according to an embodiment of the disclosure. FIG. 21 is a view illustrating operations of an electronic device according to an embodiment of the disclosure.

Referring to FIGS. 19, 20, and 21, an embodiment of identifying a location of an image to be displayed on a screen based on a size of the image and a size of the image area may be understood.

At least some of the operations of FIG. 19 may be omitted. The operation order of the operations of FIG. 19 may be changed. Operations other than the operations of FIG. 19 may be performed before, during, or after the operations of FIG. 19. The operations of FIG. 19 may be performed organically with the operations of FIGS. 4, 6, 9, 11, 13, and/or 17.

Referring to FIG. 19, in operation 1901, according to an embodiment, the electronic device 101 (e.g., the processor 120) may display a first screen (e.g., 2010 of part 20a of FIG. 20 or 2110 of part 21a of FIG. 21) including a first image area. For example, in FIG. 20, the electronic device 101 may display an image 2011 having the width longer than the height in the first image area of the first screen 2010. For example, in FIG. 21, the electronic device 101 may display an image 2111 having the length longer than the width in the first image area of the first screen 2110.

In operation 1903, according to an embodiment, the electronic device 101 (e.g., the processor 120) may identify the target region (e.g., 2012 of FIG. 20 or 2112 of FIG. 21) of the image (e.g., 2011 of FIG. 20 or 2111 of FIG. 21) displayed in the first image area of the first screen (e.g., 2010 of FIG. 20 or 2110 of FIG. 21). For example, in FIG. 20, the electronic device 101 may identify the target region 2012 of the image 2011 displayed in the first image area of the first screen 2010. For example, in FIG. 21, the electronic device 101 may identify the target region 2112 of the image 2111 displayed in the first image area of the first screen 2110.

In operation 1905, according to an embodiment, the electronic device 101 (e.g., the processor 120) may identify a user input (e.g., 2013 of FIG. 20 or 2113 of FIG. 21), in a state in which an image (e.g., 2011 of FIG. 20 or 2111 of FIG. 21) is displayed in the first image area of the first screen (e.g., 2010 of FIG. 20 or 2110 of FIG. 21). For example, in FIG. 20, the electronic device 101 may identify a user input 2013 (e.g., a swipe input) in a state in which the image 2011 is displayed in the first image area of the first screen 2010. For example, in FIG. 21, the electronic device 101 may identify a user input 2113 (e.g., a swipe input) in a state in which the image 2111 is displayed in the first image area of the first screen 2110.

In operation 1907, according to an embodiment, the electronic device 101 (e.g., the processor 120) may identify the size (e.g., height and/or width) of the image area of the screen (e.g., 2040 of FIG. 20 or 2130 of FIG. 21) to be displayed in response to a user input (e.g., 2013 of FIG. 20 or 2113 of FIG. 21).

For example, in FIG. 20, the electronic device 101 may identify the size (e.g., height and/or width) of the image area of the screen 2040 to be displayed in response to the user input 2013. As described above, in FIG. 20, the image 2011 displayed in the first image area of the first screen 2010 may be an image 2011 having the width longer than the length. Referring to screen 2020 in part 20b in FIG. 20, the electronic device 101 may identify that the height 2023 of the image area of the screen 2040 to be displayed in response to the user input 2013 is greater than the height of the image 2011 displayed in the first image area of the first screen 2010. Referring to FIG. 20, the electronic device 101 may identify that the width of the image area of the screen 2040 to be displayed in response to the user input 2013 is the same as the width of the image 2011 displayed in the first image area of the first screen 2010.

For example, in FIG. 21, the electronic device 101 may identify the size (e.g., height and/or width) of the image area of the screen 2130 to be displayed in response to the user input 2113. As described above, in FIG. 21, the image 2111 displayed in the first image area of the first screen 2110 may be an image 2111 having the length longer than the width. Referring to FIG. 21, the electronic device 101 may identify that the width 2134 of the image area of the screen 2130 to be displayed in response to the user input 2113 is the same as the width of the image 2111 displayed in the first image area of the first screen 2110. Referring to FIG. 21, the electronic device 101 may identify that the height of the image area of the screen 2130 to be displayed in response to the user input 2113 is smaller than the height of the image displayed in the first image area of the first screen 2110.

In operation 1909, according to an embodiment, the electronic device 101 (e.g., the processor 120) may identify the absolute coordinate value of the target region based on the relative coordinate value and the scaling value of the target region.

According to an embodiment, the electronic device 101 may identify the relative coordinate value of the target region (e.g., 2012 of FIG. 20 or 2112 of FIG. 12) in the image (e.g., 2011 of FIG. 20 or 2111 of FIG. 21) displayed in the first image area of the first screen (e.g., 2010 of FIG. 20 or 2110 of FIG. 21). The "relative coordinate value" may include a relative coordinate value in a horizontal direction and a relative coordinate value in a vertical direction. The relative coordinate value in the horizontal direction may be a coordinate value (e.g., a real number of 0 or more and 1 or less) in the horizontal direction of the target region (e.g., the center point of the target region) when the start point (e.g., the upper left point of the image) in the horizontal direction of the image is set to 0 and the end point (e.g., the upper right point of the image) in the horizontal direction of the image is set to 1. The relative coordinate value in the vertical direction may be a coordinate value (e.g., a real number of 0 or more and 1 or less) in the vertical direction of the target region (e.g., the center point of the target region) when the start point (e.g., the upper left point of the image) in the vertical direction of the image is set to 0 and the end point (e.g., the lower left point of the image) in the vertical direction of the image is set to 1.

According to an embodiment, the electronic device 101 may identify the scaling value based on the size (e.g., height and/or width) of the image area of the screen (e.g., 2040 of FIG. 20 or 2130 of FIG. 21) to be displayed in response to a user input (e.g., 2013 of FIG. 20 or 2113 of FIG. 21) and the size (e.g., height and/or width) of the image (e.g., 2011 of FIG. 20 or 2111 of FIG. 21) displayed in the first image area of the first screen (e.g., 2010 of FIG. 20 or 2110 of FIG. 21). For example, in FIG. 20, based on the height 2023 of the image area of the screen 2040 to be displayed in response to the user input 2013 being greater than the height of the image 2011 displayed in the first image area of the first screen 2010, the electronic device 101 may identify the ratio of the height 2023 of the image area of the screen 2040 to be displayed in response to the user input 2013 to the height of the image 2011 displayed in the first image area of the first screen 2010 as the scaling value. For example, in FIG. 21, the electronic device 101 may identify 1 as the scaling value, based on the height of the image area of the screen 2130 to be displayed in response to the user input 2113 being smaller than the height of the image 2111 displayed in the first image area of the first screen 2110.

According to an embodiment, the electronic device 101 may identify the absolute coordinate value of the target region (e.g., 2022 of 2032 of FIG. 20 or 2122 of FIG. 21), based on the relative coordinate value and the scaling value of the target region (e.g., 2012 of FIG. 20 or 2112 of FIG. 21). For example, the electronic device 101 may calculate the absolute coordinate value by multiplying the relative coordinate value by the scaling value. The "absolute coordinate value" may be the coordinate value of the target region (e.g., 2032 or 2042 of FIG. 20) with respect to the display reference position (e.g., 2033 or 2043 of FIG. 20) of the image displayed in the image area when the partial area of the image is displayed in the image area of the screen.

In operation 1911, according to an embodiment, the electronic device 101 (e.g., the processor 120) may move the display reference position of the image to be displayed (e.g., the upper left position of the image).

For example, in screen 2030 in part 20c of FIG. 20, the electronic device 101 may identify that the display reference position 2033 of the image 2031 is positioned outside the image area as the scaling value exceeds 1 so that the height of the image 2031 to be displayed in the image area is increased. The electronic device 101 may control the display module 160 to display the target object 2042 at a position close to the center of the image area to be displayed by moving the display reference position 2033 of the image 2031 to be displayed to the reference point 2043 of the image area to be displayed. If the display reference position 2033 is moved to the inside of the image area to be displayed in FIG. 20, the target object (e.g., 2042) may be closer to the center of the image area to be displayed, but in this case, since the area in which the image is not displayed occurs in the image area, the electronic device 101 may not move the display reference position 2033 to the inside of the image area to be displayed. In other words, in FIG. 20, moving the display reference position 2033 to the reference point 2043 may be the maximum movement of the display reference position 2033. Accordingly, in part 20d of FIG. 20, the target region 2042 may be positioned at a point as close to the center of the image area to be displayed as possible. In this case, as shown in part 20d of FIG. 20, a partial area (e.g., a right area) of the image 2041 may not be displayed in the image area.

For example, in FIG. 21, as the scaling value is 1, the size of the image 2031 to be displayed in the image area may remain constant, and a partial area of the image 2031 may be displayed in the image area. The electronic device 101 may move the display reference position of the image 2131 such that the target region 2132 is positioned in the center of the image area in the vertical direction. In this case, as shown in part 21c of FIG. 21, a partial area (e.g., an upper area and a lower area) of the image 2131 may not be displayed in the image area.

In operation 1913, according to an embodiment, the electronic device 101 (e.g., the processor 120) may display a second screen (e.g., 2040 of FIG. 20 or 2130 of FIG. 21) including the second image area in operation 1905, operation 1907, operation 1909, and operation 1911.

For example, referring to FIG. 21, the electronic device 101 may display an image 2111 in the image area of the screen 2110 in part 21a of FIG. 21, may display an image 2121 moving upward from the screen 2120 in part 21b of FIG. 21 according to a first user input 2113, and may finally display the image 2131 such that the target region 2132 is positioned at a point as close to the center of the image area on the third screen 2130 in part 21c of FIG. 21 as possible.

Figure 22:
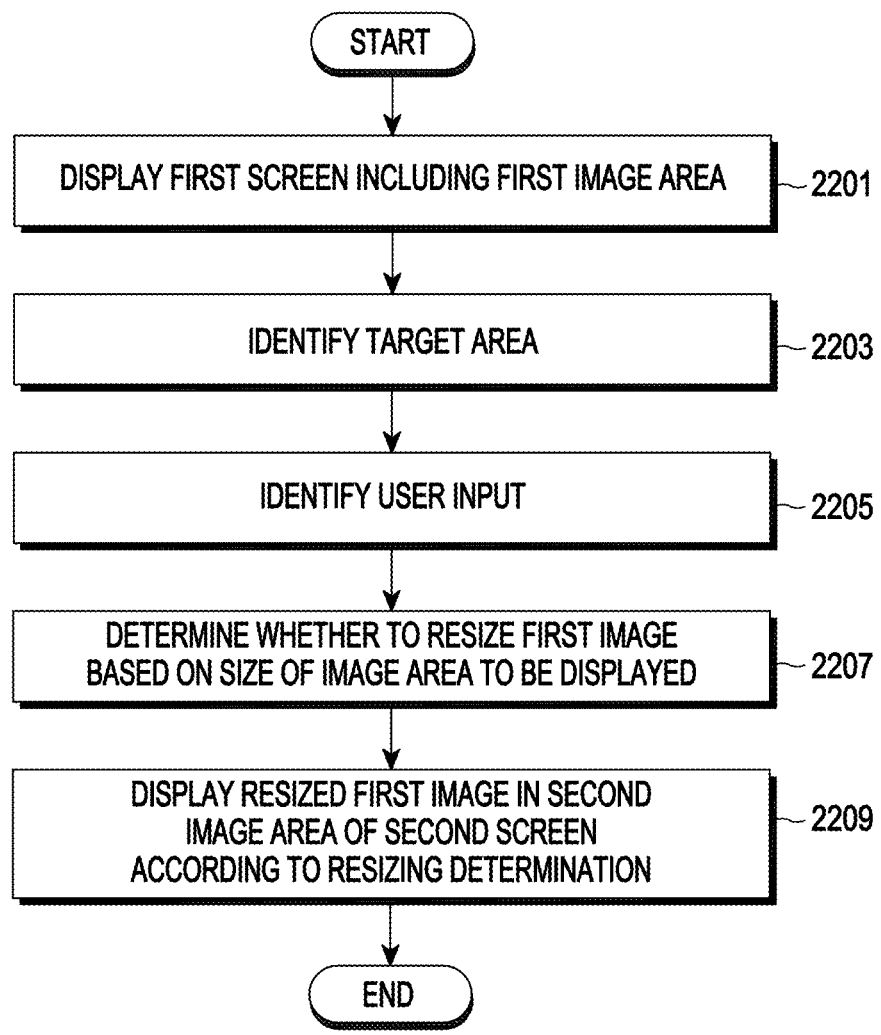
FIG. 22 is a flowchart illustrating an operation method of an electronic device according to an embodiment of the disclosure.
Figure 23:
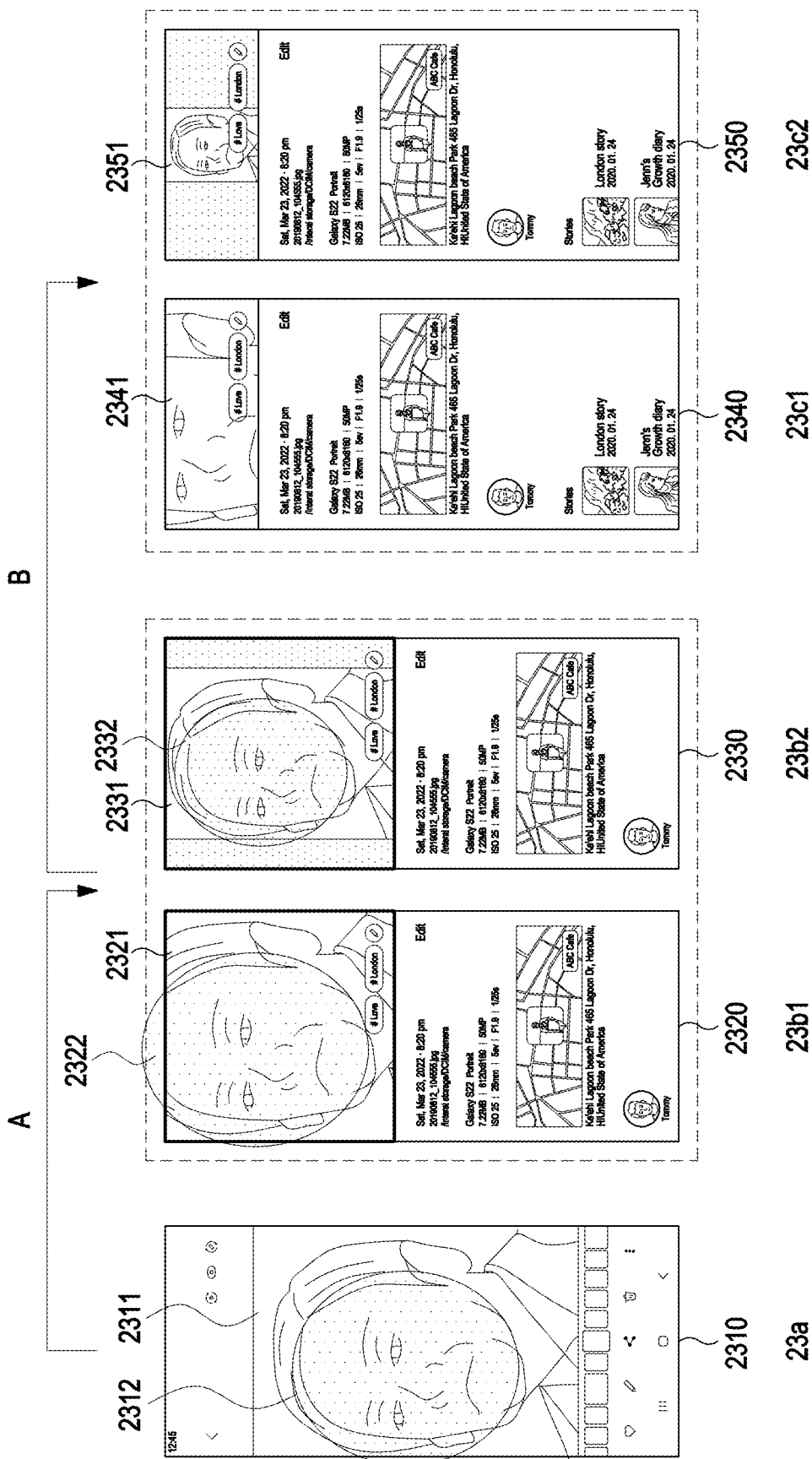
FIG. 23 is a view illustrating operations of an electronic device according to an embodiment of the disclosure.

FIG. 22 is a flowchart illustrating an operation method of an electronic device according to an embodiment of the disclosure. FIG. 22 may be described with reference to the previously described drawings and FIG. 23. FIG. 23 is a view illustrating operations of an electronic device according to an embodiment of the disclosure.

At least some of the operations of FIG. 22 may be omitted. The operation order of the operations of FIG. 22 may be changed. Operations other than the operations of FIG. 22 may be performed before, during, or after the operations of FIG. 22. The operations of FIG. 22 may be performed organically with the operations of FIGS. 4, 6, 9, 11, 13, 17, and/or 19.

Referring to FIG. 23, the screen 2310 of part 23a may be displayed, the screen 2320 in part 23b1 or the screen 2330 in part 23b2 may be displayed according to a first user input A, and then the screen 2340 of 23c1 or the screen 2350 of part 23c2 may be displayed according to a second user input B. Part 23b1 and part 23c1 may be screens displaying the non-resized images 2321 and 2341 of the image 2311 of part 23a, and part 23b and (part 23c2 may be screens displaying the resized images 2331 and 2351 of the image 2311 of part 23a. "Resizing" may be changing the display size of the object included in the image displayed on the screen by changing the display size of the image to display the image. For example, in FIG. 23, only a partial area of the first image 2311 displayed on the first screen 2310 is displayed on the second screen 2320, but the size of the image is not changed and, in this case, the image may be a non-resized one. The entire area of the first image 2311 displayed on the first screen 2310 is displayed on the third screen 2330, but the size of the image is changed, and in this case, the image may be a resized one. In FIG. 23, only a partial area of the first image 2311 displayed on the first screen 2310 is displayed on the fourth screen 2340, but the size of the image is not changed and, in this case, the image may be a non-resized one. The entire area of the first image 2311 displayed on the first screen 2310 is displayed on the fifth screen 2350, but the size of the image is changed, and in this case, the image may be a resized one. For example, in FIG. 23, according to settings, the electronic device 101 (e.g., the processor 120) may display a first screen 2310, may display a second screen 2320 according to user input A, and may then display a fourth screen 2340 according to user input B. In FIG. 23, according to settings, the electronic device 101 (e.g., the processor 120) may display the first screen 2310, may display the second screen 2320 according to user input A, and may then display the fifth screen 2350 according to user input B. In FIG. 23, according to settings, the electronic device 101 (e.g., the processor 120) may display the first screen 2310, may display the third screen 2330 according to user input A, and may then display the fourth screen 2340 according to user input B. In FIG. 23, according to settings, the electronic device 101 (e.g., the processor 120) may display the first screen 2310, may display the third screen 2330 according to user input A, and may then display the fifth screen 2350 according to user input B.

This is described below with reference to FIG. 22.

Referring to FIG. 22, in operation 2201, according to an embodiment, the electronic device 101 (e.g., the processor 120) may display a first screen (e.g., 2310 of FIG. 23) including an image area (e.g., the first image). For example, in FIG. 23, the electronic device 101 may display an image 2311 (e.g., the first image) having the length longer than the width in the first image area of the first screen 2310. In FIG.

23, an image having the length longer than the width is described as an example, but an image having the width longer than the length may be similarly understood.

In operation 2203, according to an embodiment, the electronic device 101 (e.g., the processor 120) may identify the target region of the image (e.g., 2311 of FIG. 23) displayed in the first image area of the first screen (e.g., 2310 of FIG. 23). For example, in FIG. 23, the electronic device 101 may identify the target region 2312 of the image 2311 displayed in the first image area of the first screen 2310.

In operation 2205, according to an embodiment, the electronic device 101 (e.g., the processor 120) may identify a user input (e.g., A of FIG. 23) in a state in which an image (e.g., 2311 of FIG. 23) is displayed in the first image area of the first screen (e.g., 2310 of FIG. 23). For example, in FIG. 23, the electronic device 101 may identify a user input A (e.g., a swipe input such as 2013 of FIG. 20) in a state in which the image 2311 is displayed in the first image area of the first screen 2310.

In operation 2207, according to an embodiment, the electronic device 101 (e.g., the processor 120) may determine whether to resize the image (e.g., 2311 of FIG. 23) (e.g., the first image) based on the size (e.g., height and/or width) of the image area of the screen (e.g., 2320 or 2330 of FIG. 23) to be displayed in response to the user input of operation 2205. For example, the electronic device 101 may determine whether to resize the image (e.g., 2311 of FIG. 23) (e.g., the first image) based on the size of the target region of the displayed image (e.g., 2311 of FIG. 23) and the size (e.g., height and/or width) of the image area of the screen to be displayed (e.g., 2320 or 2330 of FIG. 23). For example, the electronic device 101 may identify the size (e.g., height and/or width) of the image area of the screen (e.g., 2320 or 2330 of FIG. 23) to be displayed in response to the user input in operation 2205. For example, in FIG. 23, the electronic device 101 may identify the size (e.g., height and/or width) of the image area of the screen (e.g., 2320 or 2330) to be displayed in response to the first user input A. The electronic device 101 may identify that the size (e.g., height and/or width) of the image area of the screen 2320 or 2330 to be displayed in response to the first user input A identified in a state in which the first screen 2310 is displayed is smaller than the size (e.g., height and/or width) of the first image 2311 displayed on the first screen 2310 (or the size of the target region 2312 of the first image 2311). For example, in FIG. 23, the electronic device 101 may identify that the height of the image area of the screen (e.g., 2320 or 2330) to be displayed in response to the first user input A is smaller than the height of the first image 2311 displayed on the first screen 2310 (or the height of the target region 2312 of the first image 2311). According to an embodiment, the electronic device 101 may determine to resize the same image or not to resize the same image. For example, in part 23b1 of FIG. 23, the electronic device 101 may determine not to resize the image. In an embodiment in which resizing is not performed, as shown in part 23b1 of FIG. 23, the electronic device 101 may display a partial area of the image 2321 having the same size as the first image 2311 of part 23a in the image area of the second screen 2320. For example, in part 23b2 of FIG. 23, as the electronic device 101 identifies that the height of the image area of the screen 2330 to be displayed in response to the first user input A is smaller than the height of the first image 2311 displayed on the first screen 2310 (or the height of the target region 2312 of the first image 2311), the electronic device 101 may determine to resize the image.

In operation 2209, according to an embodiment, the electronic device 101 (e.g., the processor 120) may display a resized image (e.g., the resized image 2331 of the first image 2311 of FIG. 23) in the image area (e.g., the second image area) of the second screen (e.g., 2330 of part 23b2 of FIG. 23) according to determining to resize the image. For example, in an embodiment of resizing, as shown in part 23b2 of FIG. 23, as the electronic device 101 identifies that the height of the image area of the screen 2330 to be displayed in response to the first user input A is smaller than the height of the first image 2311 displayed on the first screen 2310 (or the height of the target region 2312 of the first image 2311), the electronic device 101 may display the entire area of the resized image 2331 of the first image 2311 of part 23a in the image area of the third screen 2330. In this case, the electronic device 101 may not display an image in the area other than the area in which the image 2331 is displayed in the image area of the third screen 2330, or may display an image-processed (e.g., blurred) image (e.g., the first image 2311). Like the embodiments described above, in parts 23b1 or 23b2 of FIG. 23, the description of the image 2321 or 2331 displayed in the image area of the screen 2320 or 2330 may be displayed in the description area of the screen 2320 or 2330.

An additional operation is described below with reference to FIG. 23.

According to an embodiment, in FIG. 23, in a state in which the screen 2320 of part 23b1 or the screen 2330 of part 23b2 is displayed, the electronic device 101 may identify the second user input B (e.g., a swipe input such as 2013 of FIG. 20), thereby displaying the screen 2340 of part 23c1 or the screen 2350 of part 23c2. For example, after displaying the screen 2320 of part 23b1, the electronic device 101 may display the screen 2340 of part 23c1 or the screen 2350 of part 23c2 according to user input B. For example, after displaying the screen 2330 of part 23b2, the electronic device 101 may display the screen 2340 of part 24c1 or the screen 2350 of part 23c2 according to user input B.

According to an embodiment, the electronic device 101 may determine whether to resize the image (e.g., 2321 or 2331 of FIG. 23), based on the size (e.g., height and/or width) of the image area of the screen (e.g., 2340 or 2350 of FIG. 23) to be displayed in response to the second user input B. For example, the electronic device 101 may determine whether to resize the image (e.g., 2321 or 2331 of FIG. 23), based on the size of the target region (e.g., 2322 or 2332 of FIG. 23) of the displayed image (e.g., 2321 or 2331 of FIG. 23) and the size (e.g., height and/or width) of the image area of the screen (e.g., 2340 or 2350 of FIG. 23) to be displayed. For example, in FIG. 23, the electronic device 101 may identify the size (e.g., height and/or width) of the image area of the screen (e.g., 2340 or 2350) to be displayed in response to the second user input B. For example, in FIG. 23, the electronic device 101 may identify that the height of the image area of the screen 2340 or 2350, which is to be displayed in response to the second user input B identified in a state in which the screen 2320 or 2330 is displayed is smaller than the height of the image 2321 or 2331 displayed on the screen 2320 of part 23b1 or the screen 2330 of part 23b2 (or the height of the target region (e.g., 2322 or 2332 of FIG. 23) of the image 2321 or 2331). For example, in part 23c1 of FIG. 23, the electronic device 101 may determine not to resize the image. In an embodiment in which resizing is not performed, as shown in part 23c1 of FIG. 23, the electronic device 101 may display a partial area of the image 2341 having the same size as the image 2321 of part 23b1 in the image area of the screen 2340 of part 23c1. For example, in part 23c2 of FIG. 23, as the electronic device 101 identifies that the height of the image area of the screen 2350, which is to be displayed in response to the second user input B is smaller than the height of the image 2321 or 2331 displayed on the screen 2320 of part 23b1 or the screen 2330 of part 23b2 (or the height of the target region (e.g., 2322 or 2332 of FIG. 23) of the image 2321 or 2331).

According to an embodiment, the electronic device 101 (e.g., the processor 120) may display a resized image in the image area (e.g., the second image area) of the third screen (e.g., 2350 of part 23c2 FIG. 23) according to determining to resize the image. For example, in an embodiment of resizing, as shown in part 23c2 of FIG. 23, as the electronic device 101 identifies that the height of the image area of the screen 2350 to be displayed in response to the second user input B is smaller than the height of the image 2321 or 2331 displayed on the screen 2320 of part 23b1 or the screen 2330 of part 23b2 (or the height of the target region (e.g., 2322 or 2332 of FIG. 23) of the image 2321 or 2331), the electronic device 101 may display the entire area of the resized image 2351 of the image in the image area of the screen 2350 of part 23c2. In this case, the electronic device 101 may not display an image in the area other than the area in which the image 2351 is displayed in the image area of the screen 2350 of part 23c2, or may display an image-processed (e.g., blurred) image (e.g., the first image 2311). Like the embodiments described above, in parts 23c1 or 23c2 of FIG. 23, the description of the image 2341 or 2351 displayed in the image area of the screen 2340 or 2350 may be displayed in the description area of the screen 2340 or 2350.

Figure 24:
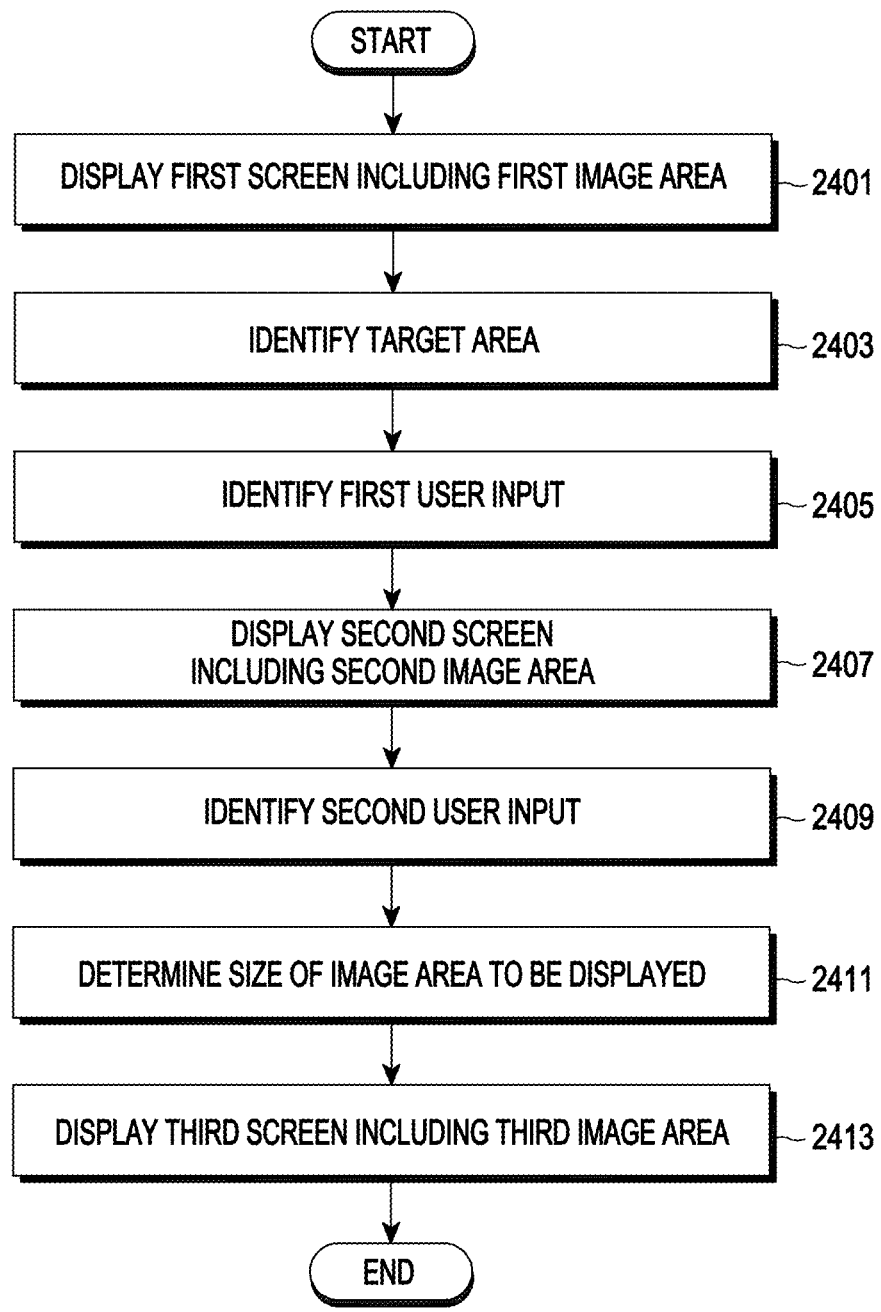
FIG. 24 is a flowchart illustrating an operation method of an electronic device according to an embodiment of the disclosure.
Figure 25:
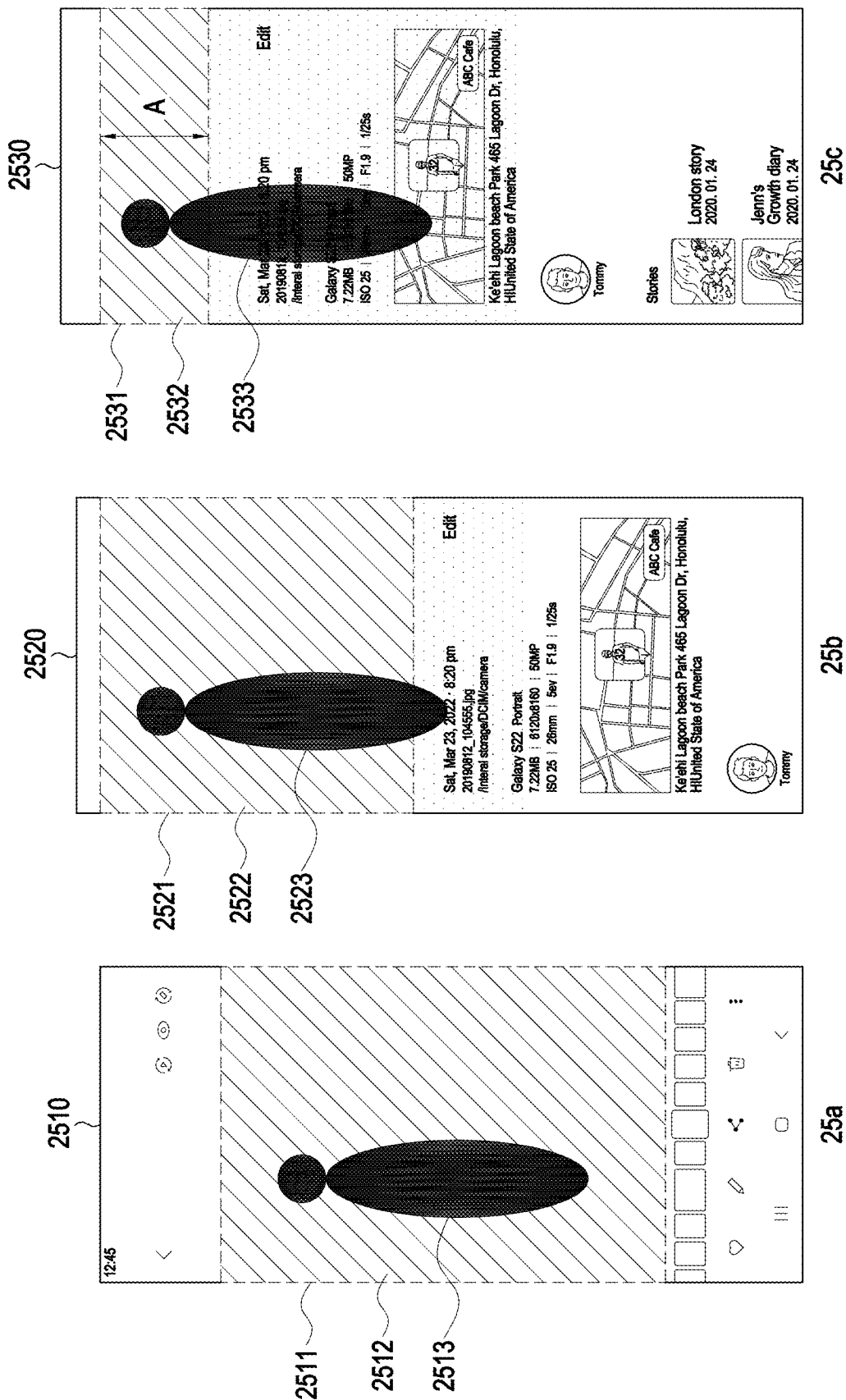
FIG. 25 is a view illustrating operation of the disclosure s of an electronic device according to an embodiment of the disclosure.
Figure 26:
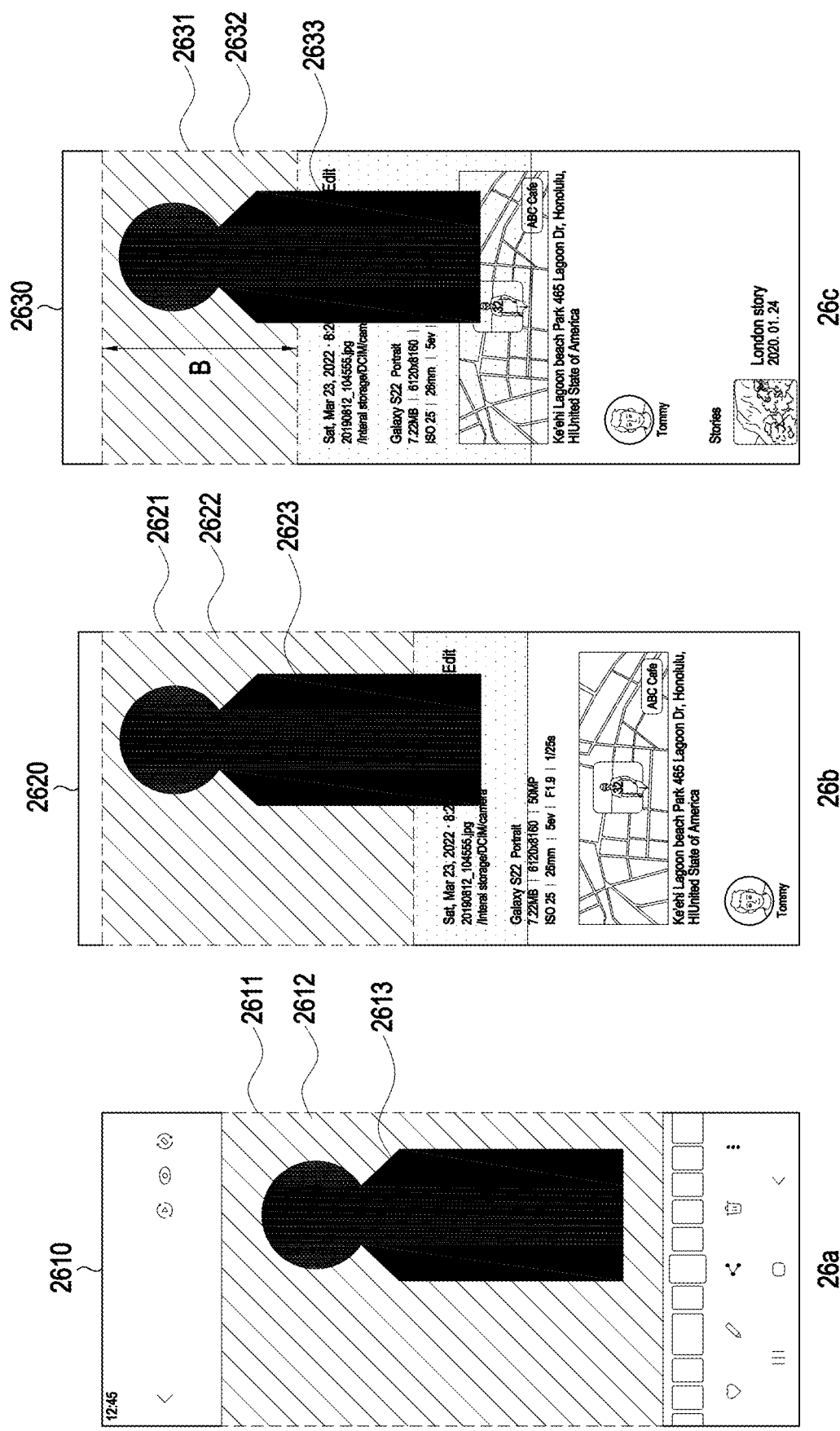
FIG. 26 is a view illustrating operations of an electronic device according to an embodiment of the disclosure.
Figure 27:
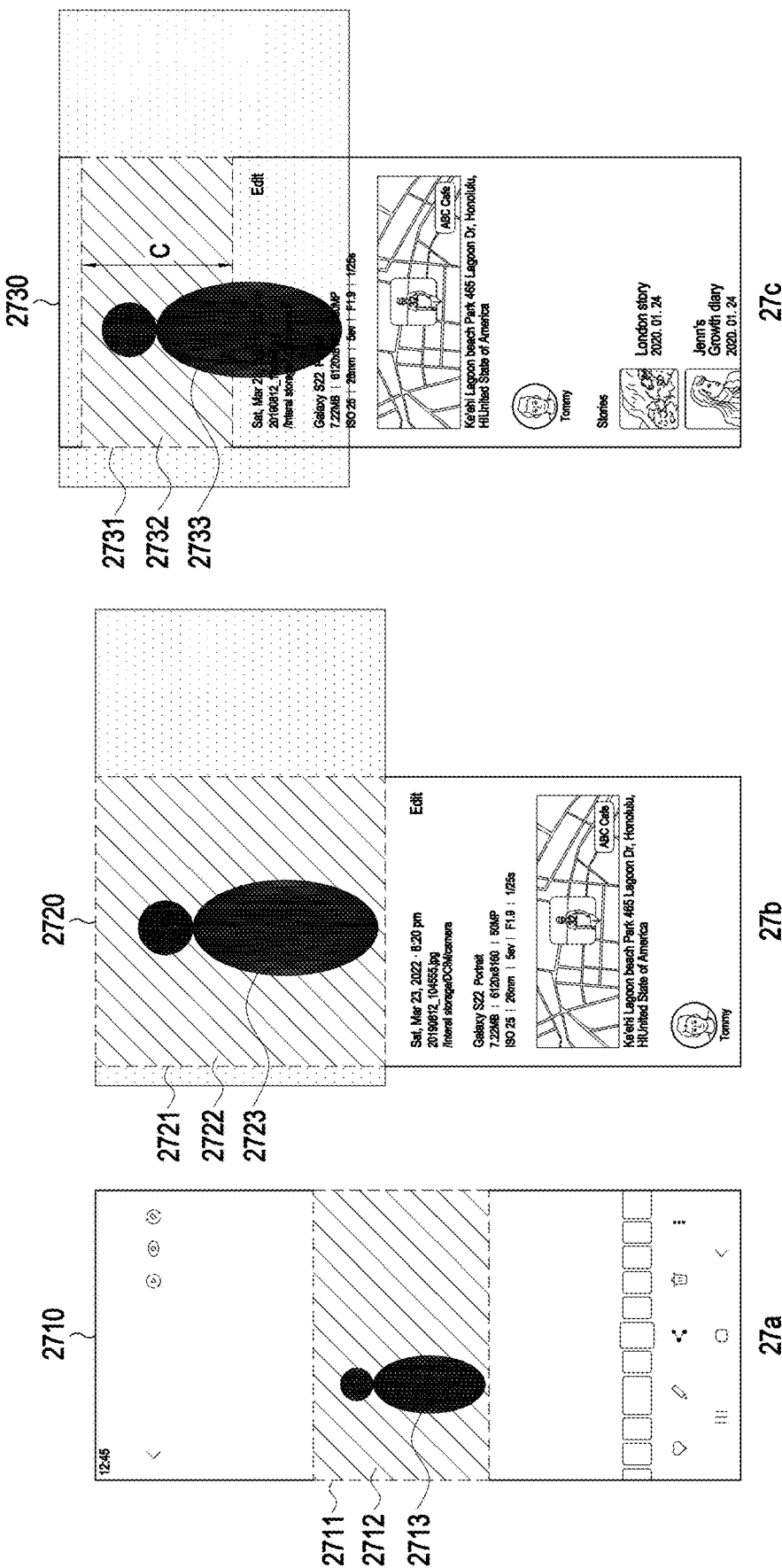
FIG. 27 is a view illustrating operations of an electronic device according to an embodiment of the disclosure.

FIG. 24 is a flowchart illustrating an operation method of an electronic device according to an embodiment of the disclosure. FIG. 24 may be described with reference to the previously described drawings and FIGS. 25, 26, and 27. FIG. 25 is a view illustrating operations of an electronic device according to an embodiment of the disclosure. FIG. 26 is a view illustrating operations of an electronic device according to an embodiment of the disclosure. FIG. 27 is a view illustrating operations of an electronic device according to an embodiment of the disclosure.

At least some of the operations of FIG. 24 may be omitted. The operation order of the operations of FIG. 24 may be changed. Operations other than the operations of FIG. 24 may be performed before, during, or after the operations of FIG. 24. The operations of FIG. 24 may be performed organically with the operations of FIGS. 4, 6, 9, 11, 13, 17, 19, and/or 22.

An embodiment in which the size of the image area to be displayed is determined based on the size of the image, the ratio of the image, and/or the size of the target object (or target region) may be understood through FIGS. 24, 25, 26, and 27. For example, the electronic device 101 may display a second screen including an image area of a designated size in response to a first user input identified in a state in which the first screen is displayed, and may display a third screen including an image area of a size determined according to the size of the target region of the image in response to a second user input identified in a state in which the second screen is displayed. This is described below with reference to FIG. 24.

Referring to FIG. 24, in operation 2401, according to an embodiment, the electronic device 101 (e.g., the processor 120) may display a first screen (e.g., 2510 of FIG. 25, 2610 of FIG. 26, or 2710 of FIG. 27) including a first image area (e.g., 2511 of FIG. 25, 2611 of FIG. 26, or 2711 of FIG. 27). For example, in FIG. 27, the electronic device 101 may display an image 2712 having the width longer than the height in the image area of the screen 2710. For example, in FIG. 25, the electronic device 101 may display an image 2512 having the length longer than the width in the image area of the screen 2510. For example, in FIG. 26, the electronic device 101 may display an image 2612 having the length longer than the width in the image area of the screen 2610. When the size of the image 2612 of FIG. 26 is the same as the size of the image 2512 of FIG. 25, the size of the target object (or target region) 2613 included in the image 2612 of FIG. 26 may be larger than the size of the target object (or target region) 2513 included in the image 2512 of FIG. 25.

In operation 2403, according to an embodiment, the electronic device 101 (e.g., the processor 120) may identify the target region of the image (e.g., 2512 of FIG. 25, 2612 of FIG. 26, or 2712 of FIG. 27) displayed in the first image area (e.g., 2511 of FIG. 25, 2611 of FIG. 26, or 2711 of FIG. 27) of the first screen (e.g., 2510 of FIG. 25, 2610 of FIG. 26, or 2710 of FIG. 27). For example, in part 25a of FIG. 25, the electronic device 101 may identify the target region (e.g., the area corresponding to the face of the person in 2513) corresponding to the target object 2513 (e.g., the person) included in the image 2512 displayed in the image area 2511 of the screen 2510. For example, in part 26a of FIG. 26, the electronic device 101 may identify the target region (e.g., the area corresponding to the face of the person in 2613) corresponding to the target object 2613 (e.g., the person) included in the image 2612 displayed in the image area 2611 of the screen 2610. For example, in part 27a of FIG. 27, the electronic device 101 may identify the target region (e.g., the area corresponding to the face of the person in 2713) corresponding to the target object 2713 (e.g., the person) included in the image 2712 displayed in the image area 2711 of the screen 2710.

In operation 2405, according to an embodiment, the electronic device 101 (e.g., the processor 120) may identify a first user input in a state in which the image (e.g., 2512 of FIG. 25, 2612 of FIG. 26, or 2712 of FIG. 27) is displayed in the first image area (e.g., 2511 of FIG. 25, 2611 of FIG. 26, or 2711 of FIG. 27) of the first screen (e.g., 2510 of FIG. 25, 2610 of FIG. 26, or 2710 of FIG. 27). For example, in part 25a FIG. 25, the electronic device 101 may identify a user input (e.g., a swipe input such as 2013 of FIG. 20) in a state in which the image 2512 is displayed in the image area 2512 of the screen 2510. For example, in part 26a of FIG. 26, the electronic device 101 may identify a user input (e.g., a swipe input such as 2013 of FIG. 20) in a state in which the image 2612 is displayed in the image area 2612 of the screen 2610. For example, in part 27a of FIG. 27, the electronic device 101 may identify a user input (e.g., a swipe input such as 2013 of FIG. 20) in a state in which the image 2712 is displayed in the image area 2711 of the screen 2710.

In operation 2407, according to an embodiment, the electronic device 101 (e.g., the processor 120) may display a second screen (e.g., 2520 of FIG. 25, 2620 of FIG. 26, or 2720 of FIG. 27) including a second image area (e.g., 2521 of FIG. 25, 2621 of FIG. 26, or 2721 of FIG. 27) in response to the first user input in operation 2405. For example, the size of the second image area (e.g., 2521 of FIG. 25, 2621 of FIG. 26, or 2721 of FIG. 27) in operation 2407 may be a designated size. For example, the sizes of 2521 of FIG. 25, 2621 of FIG. 26, and 2721 of FIG. 27 may be the same or different. In part 25b of FIG. 25, part 26b of FIG. 26, and part 27b of FIG. 27, it is illustrated that part (e.g., a target object or a background) of the images 2522, 2622, and 2722 is displayed in the area other than the image areas 2521, 2621, and 2721, but this is for convenience of description, and the images 2522, 2622, and 2722 to be displayed in the image areas 2521, 2621, and 2721 maynot be displayed in the area other than the image areas 2521, 2621, and 2721. For example, referring to FIG. 27, the electronic device 101 may change the display size of the image 2722 displayed in the image area 2721 according to the size of the image area 2721 of the second screen 2720. Accordingly, the size of the target object 2723 (or the target region) displayed on the second screen 2720 may be larger than the size of the target object 2713 (or the target region) displayed on the first screen 2710.

In operation 2409, according to an embodiment, the electronic device 101 (e.g., the processor 120) may identify a second user input in a state in which the image (e.g., 2522 of FIG. 25, 2622 of FIG. 26, or 2722 of FIG. 27) is displayed in the second image area (e.g., 2521 of FIG. 25, 2621 of FIG. 26, or 2721 of FIG. 27) of the second screen (e.g., 2520 of FIG. 25, 2620 of FIG. 26, or 2720 of FIG. 27). For example, in part 25b FIG. 25, the electronic device 101 may identify a user input (e.g., a swipe input such as 2013 of FIG. 20) in a state in which the image 2522 is displayed in the image area 2521 of the screen 2520. For example, in part 26b of FIG. 26, the electronic device 101 may identify a user input (e.g., a swipe input such as 2013 of FIG. 20) in a state in which the image 2622 is displayed in the image area 2621 of the screen 2620. For example, in part 27b of FIG. 27, the electronic device 101 may identify a user input (e.g., a swipe input such as 2013 of FIG. 20) in a state in which the image 2722 is displayed in the image area 2721 of the screen 2720.

In operation 2411, according to an embodiment, the electronic device 101 (e.g., the processor 120) may determine the size (e.g., A of FIG. 25, B of FIG. 26, or C of FIG. 27) of the image area (e.g., 2531 of part 25c of FIG. 25, 2631 of part 26c of FIG. 26, or 2731 of part 27c of FIG. 27) to be displayed in response to the second user input in operation 2409. For example, the electronic device 101 may set the size of the image area included in the next screen to be larger as the size of the target region displayed on the previous screen increases. For example, in FIG. 25, the electronic device 101 may determine the size (e.g., height A) of the image area to be displayed (e.g., the image area 2531 of the third screen 2530) based on the size of the target region (e.g., the area corresponding to the face) corresponding to the target object 2523 included in the image 2522 displayed on the second screen 2520. For example, in FIG. 26, the electronic device 101 may determine the size (e.g., height B) of the image area to be displayed (e.g., the image area 2631 of the third screen 2630) based on the size of the target region (e.g., the area corresponding to the face) corresponding to the target object 2623 included in the image 2622 displayed on the second screen 2620. For example, based on the size of the target region of FIG. 26 being greater than the size of the target region of FIG. 25, the electronic device 101 may set the size (e.g., height B) of the image area 2631 included in the third screen 2630 of FIG. 26 to be greater than the size (e.g., height A) of the image area 2531 included in the third screen 2530 of FIG. 25. For example, in FIG. 27, the electronic device 101 may determine the size (e.g., height C) of the image area to be displayed (e.g., the image area 2731 of the third screen 2730) based on the size of the target region (e.g., the area corresponding to the face) corresponding to the target object 2723 included in the image 2722 displayed on the second screen 2720.

In operation 2413, according to an embodiment, the electronic device 101 (e.g., the processor 120) may display a third screen (e.g., 2530 of FIG. 25, 2630 of FIG. 26, or 2730 of FIG. 27) including a third image area (e.g., 2531 of FIG. 25, 2631 of FIG. 26, or 2731 of FIG. 27) in response to the second user input in operation 2409. For example, the size of the third image area (e.g., 2531 of FIG. 25, 2631 of FIG. 26, or 2731 of FIG. 27) in operation 2413 may be the size determined in operation 2411. In part 25c of FIG. 25, part 26c of FIG. 26, and part 27c of FIG. 27, it is illustrated that part (e.g., a target object 2533 of FIG. 25, 2633 of FIG. 26, or 2733 of FIG. 27, or a background) of the images 2532, 2632, and 2732 is displayed in the area other than the image areas 2531, 2631, and 2731, but this is for convenience of description, and the images 2532, 2632, and 2732 to be displayed in the image areas 2531, 2631, and 2731 may not be displayed in the area other than the image areas 2531, 2631, and 2731.

Figure 28:
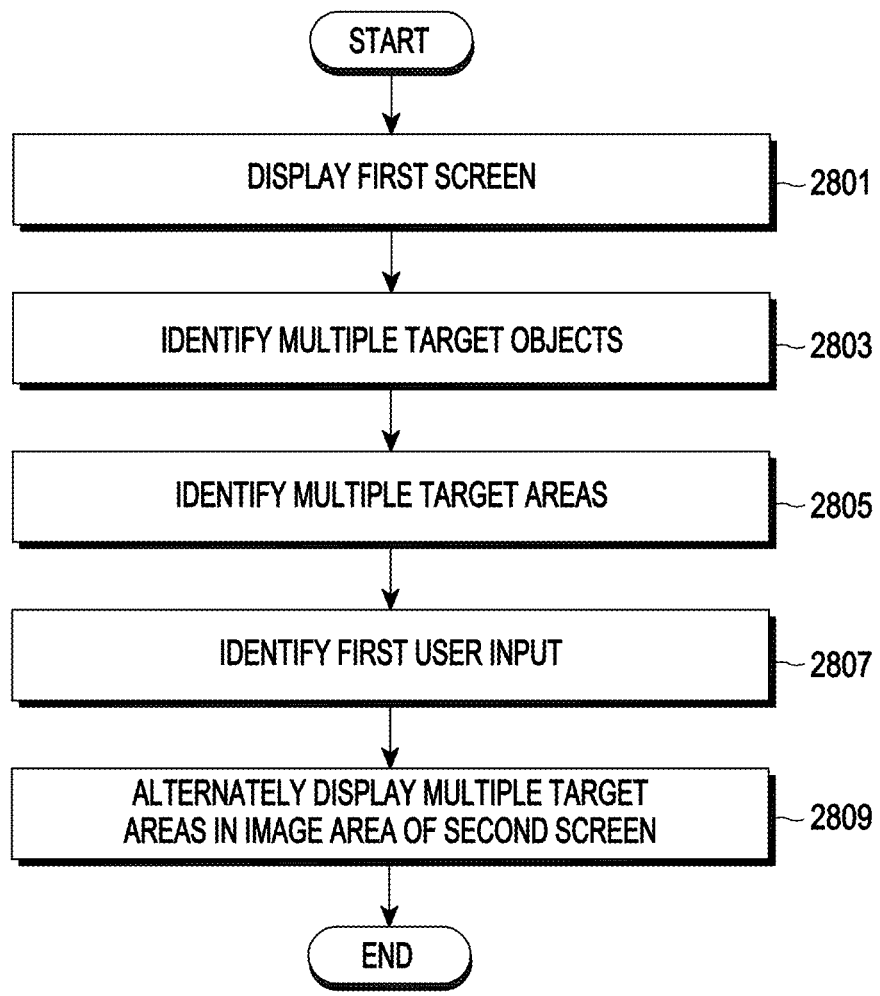
FIG. 28 is a flowchart illustrating an operation method of an electronic device according to an embodiment of the disclosure.
Figure 29:
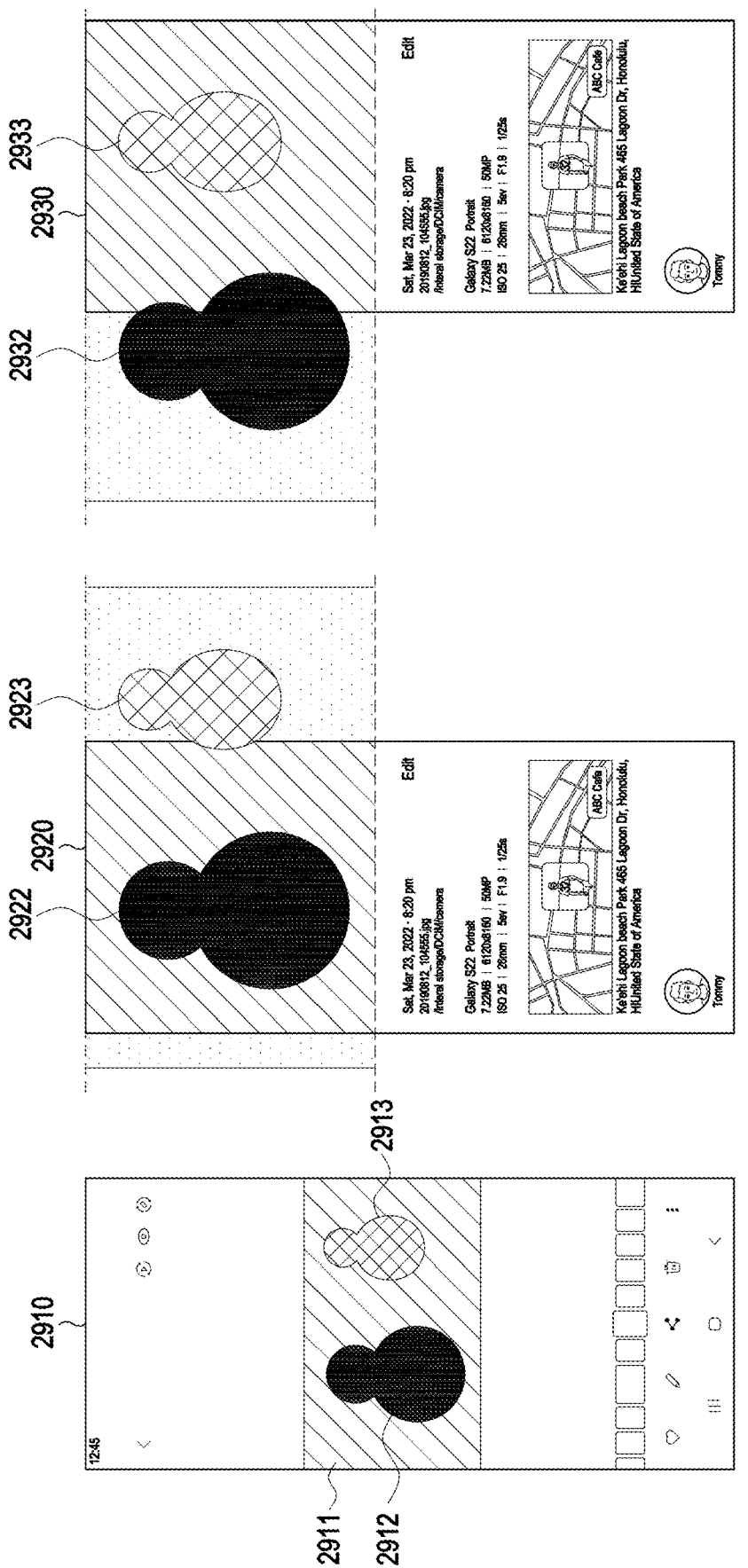
FIG. 29 is a view illustrating operations of an electronic device according to an embodiment of the disclosure.

FIG. 28 is a flowchart illustrating an operation method of an electronic device according to an embodiment of the disclosure. FIG. 28 may be described with reference to the previously described drawings and FIG. 29. FIG. 29 is a view illustrating operations of an electronic device according to an embodiment of the disclosure At least some of the operations of FIG. 28 may be omitted. The operation order of the operations of FIG. 28 may be changed. Operations other than the operations of FIG. 28 may be performed before, during, or after the operations of FIG. 28. The operations of FIG. 28 may be performed organically with the operations of FIGS. 4, 6, 9, 11, 13, 17, 19, 22, and/or 24.

An embodiment in which a plurality of target regions of an image are alternately displayed on a screen may be understood through FIGS. 28 and 29.

Referring to FIG. 28, in operation 2801, according to an embodiment, the electronic device 101 (e.g., the processor 120) may display a first screen (e.g., 2910 of FIG. 29). For example, in FIG. 29, the electronic device 101 may display an image 2911 in the image area of the first screen 2910.

In operation 2803, according to an embodiment, the electronic device 101 (e.g., the processor 120) may identify a plurality of target objects included in the first image (e.g., 2911 of FIG. 29). For example, in FIG. 29, the electronic device 101 may identify the first target object 2912 and the second target object 2913 included in the image 2911 displayed in the image area of the first screen 2910.

In operation 2805, according to an embodiment, the electronic device 101 (e.g., the processor 120) may identify a plurality of target regions corresponding to the plurality of target objects included in the first image (e.g., 2911 of FIG. 29). Referring to FIG. 29, it is assumed that the entire area of the target object is the target region, and it may be understood similarly even when a partial area of the target object is the target region. For example, in FIG. 29, the electronic device 101 may identify the first target region 2912 corresponding to the first target object 2912. The electronic device 101 may identify the second target region 2913 corresponding to the second target object 2913. For example, in FIG. 29, the electronic device 101 may set the area corresponding to the first target object 2912 and the area corresponding to the second target object 2913 as one group area as in the embodiment of FIG. 14 or 15, and may identify the set group area as one target region. For example, in FIG. 29, the electronic device 101 may identify each of the first target region 2912 and the second target region 2913 as the target region. For example, in FIG. 29, the electronic device 101 may identify the first target region 2912 and the second target region 2913 as respective target regions, based on the gap between the first target object 2912 and the second target object 2913 being greater than or equal to a reference value. For example, in FIG. 29, the electronic device 101 may identify the first target region 2912 and the second target region 2913 as respective target regions regardless of the gap between the first target object 2912 and the second target object 2913.

In operation 2807, according to an embodiment, the electronic device 101 (e.g., the processor 120) may identify a first user input (e.g., a swipe input such as 2013 of FIG. 20) in the state in which the first screen (e.g., 2910 of FIG. 29) is displayed.

In operation 2809, according to an embodiment, the electronic device 101 (e.g., the processor 120) may alternately display the plurality of target regions in the image area of the second screen (e.g., 2920 and 2930 of FIG. 29) in response to the first user input in operation 2807. For example, referring to FIG. 29, the electronic device 101 may alternately display the screen 2920 of part 29b of FIG. 29 and the screen 2930 of part 29c of FIG. 29. For example, in FIG. 29, in response to the first user input in operation 2807, the electronic device 101 may display the screen 2920 of part 29b of FIG. 29 for a designated period, may display the screen 2930 of part 29c FIG. 29 for a designated period, and may display the screen 2920 of part 29b of FIG. 29 again for a designated period. For example, referring to part 29b of FIG. 29, in order to display the screen 2920, the electronic device 101 may control the display module 160 such that the first target region 2922 is displayed at a position close to the center of the image area of the screen 2920. In this case, a partial area of the second target region 2923 may 2923 may not be displayed in the image area of the screen 2920. For example, referring to part 29c of FIG. 29, the electronic device 101 may control the display module 160 such that the second target region 2933 is displayed at a position close to the center of the image area of the screen 2930 in order to display the screen 2930. In this case, a partial area of the first target region 2932 may not be displayed in the image area of the screen 2930. The size of the first target region 2922 displayed on the screen 2920 of part 29b of FIG. 29 may be larger than the size of the first target region 2912 displayed on the screen 2910 of part 29a of FIG. 29. The size of the second target region 2933 displayed on the screen 2930 of part 29c of FIG. 29 may be larger than the size of the second target region 2913 displayed on the screen 2910 of part 29a of FIG. 29.

Figure 30:
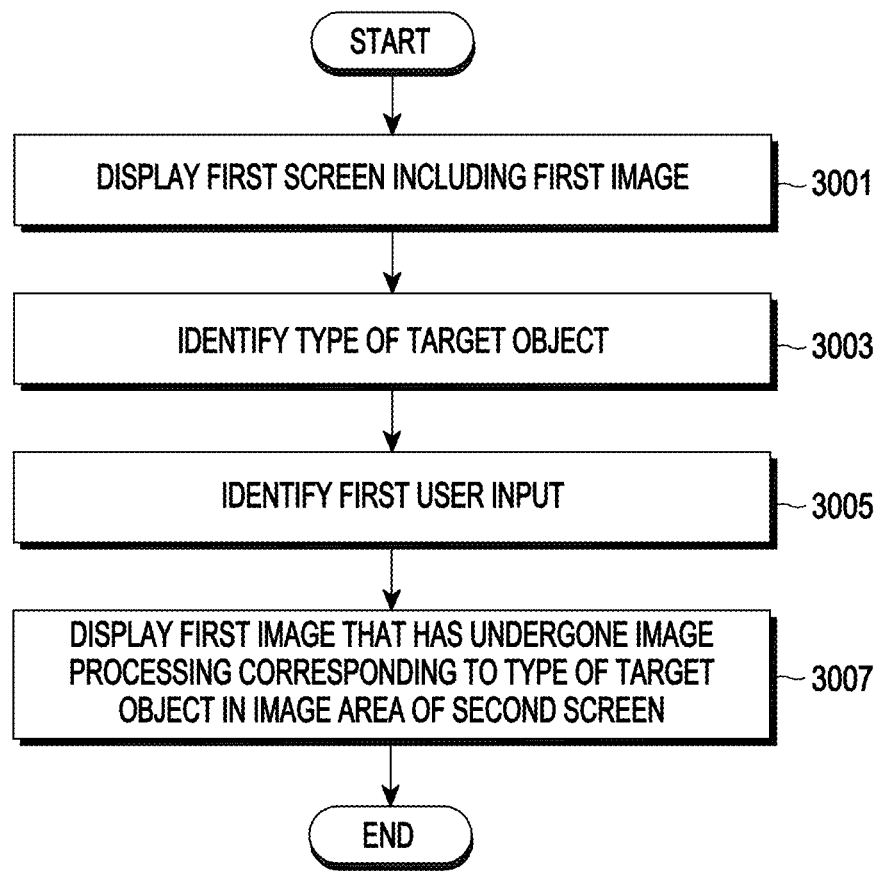
FIG. 30 is a flowchart illustrating an operation method of an electronic device according to an embodiment of the disclosure.
Figure 31:
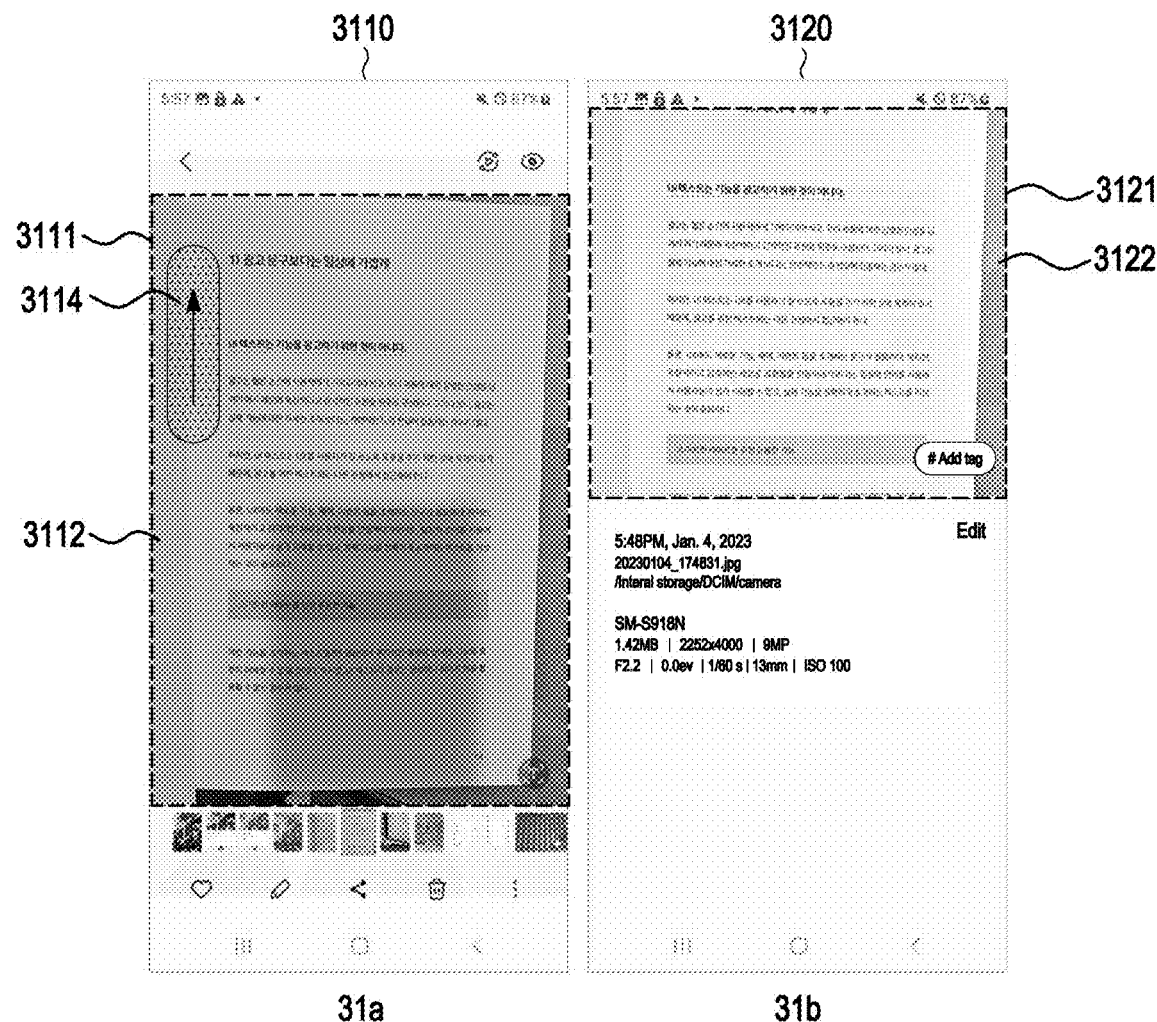
FIG. 31 is a view illustrating operations of an electronic device according to an embodiment of the disclosure.
Figure 32:
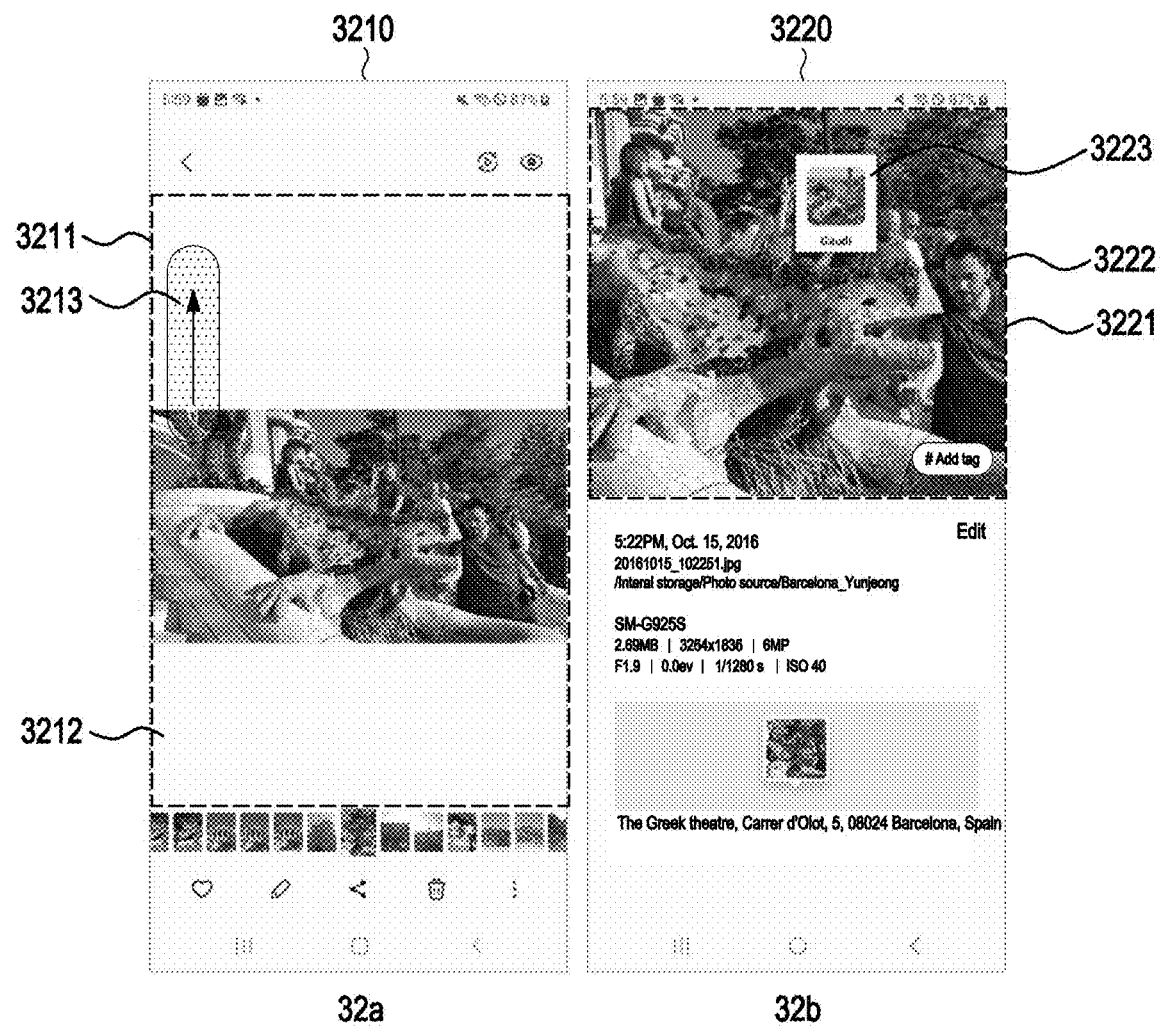
FIG. 32 is a view illustrating operations of an electronic device according to an embodiment of the disclosure.
Figure 33:
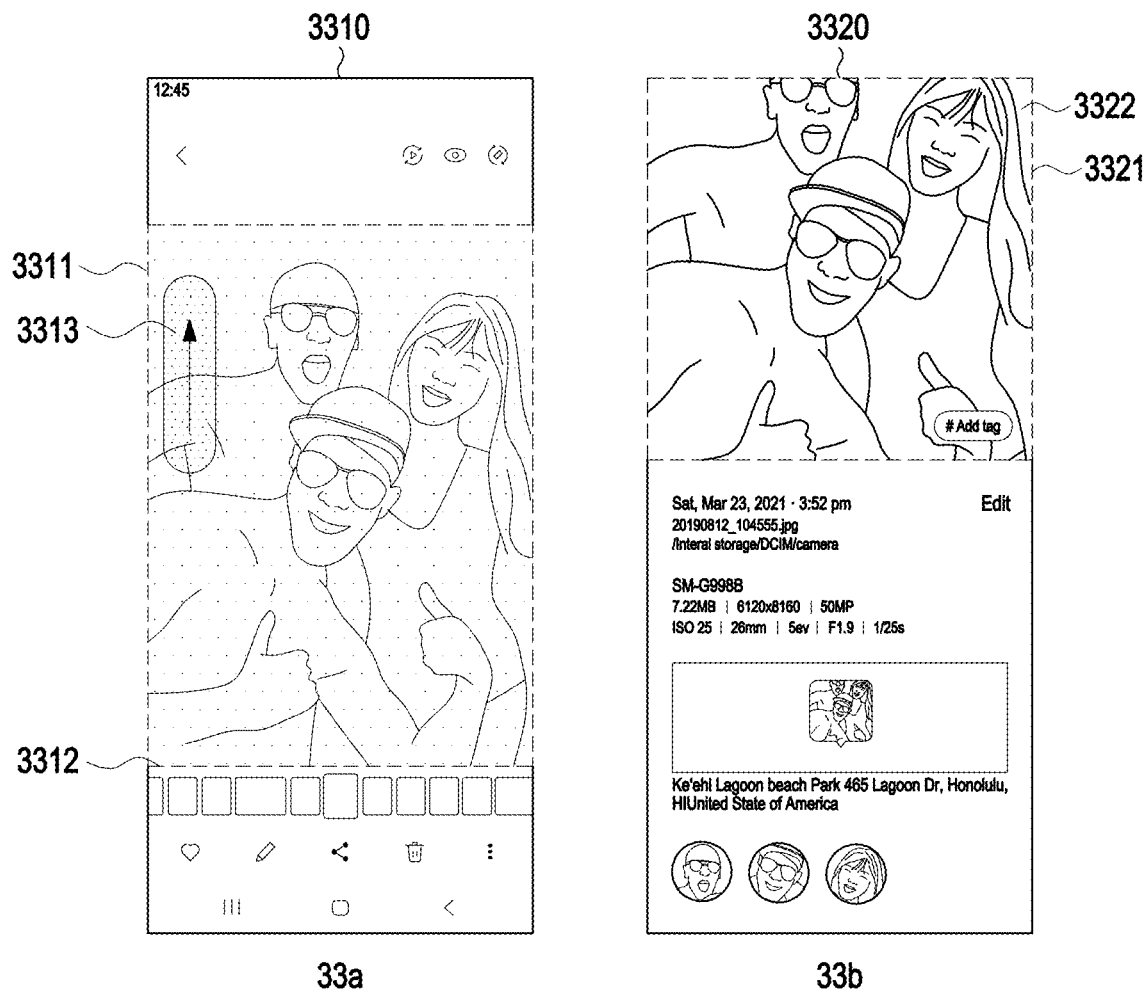
FIG. 33 is a view illustrating operations of an electronic device according to an embodiment of the disclosure.
Figure 34:
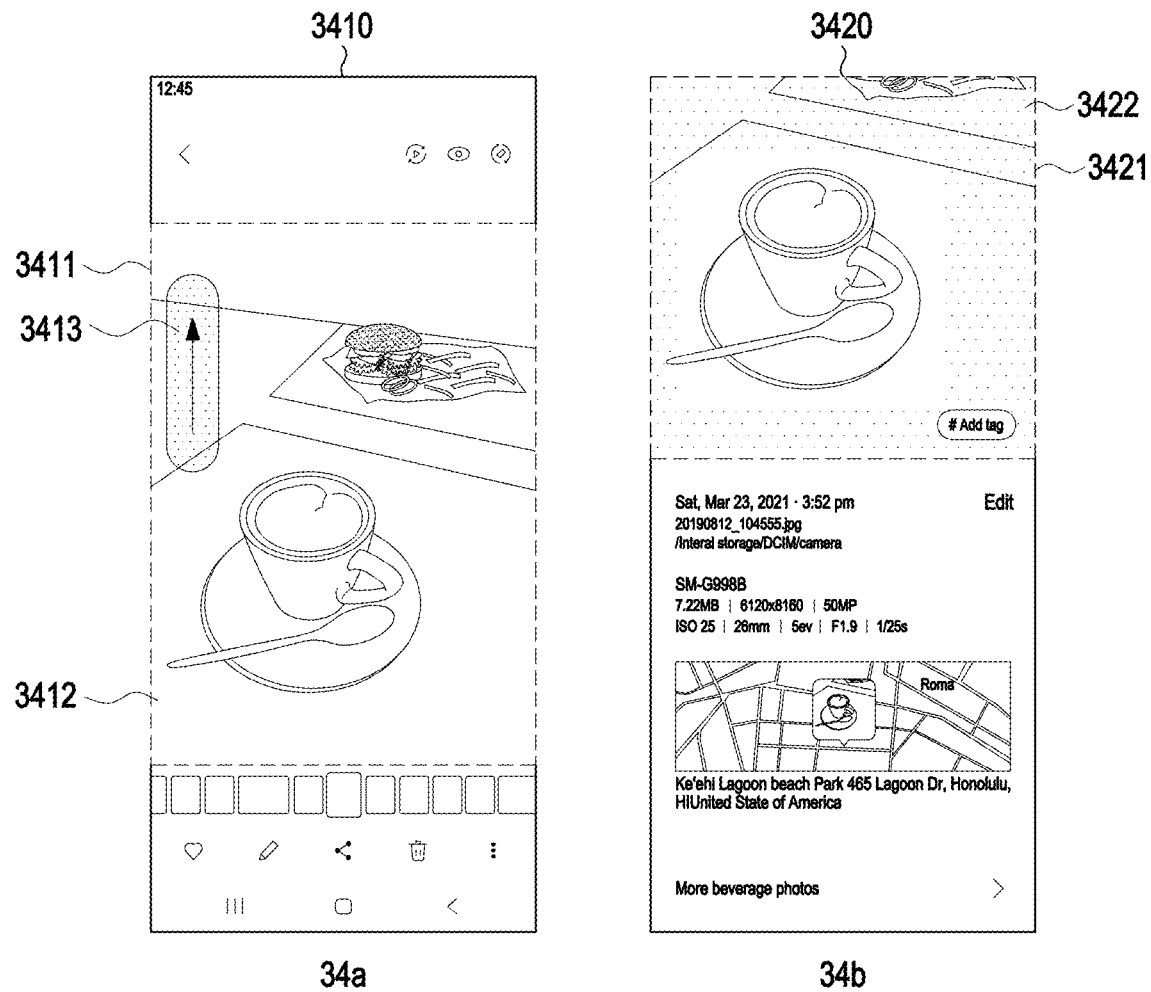
FIG. 34 is a view illustrating operations of an electronic device according to an embodiment of the disclosure.

FIG. 30 is a flowchart illustrating an operation method of an electronic device according to an embodiment of the disclosure. FIG. 30 may be described with reference to the previously described drawings and FIGS. 31, 32, 33, and 34. FIG. 31 is a view illustrating operations of an electronic device according to an embodiment of the disclosure. FIG. 32 is a view illustrating operations of an electronic device according to an embodiment of the disclosure. FIG. 33 is a view illustrating operations of an electronic device according to an embodiment of the disclosure. FIG. 34 is a view illustrating operations of an electronic device according to an embodiment of the disclosure.

At least some of the operations of FIG. 30 may be omitted. The operation order of the operations of FIG. 30 may be changed. Operations other than the operations of FIG. 30 may be performed before, during, or after the operations of FIG. 30. The operations of FIG. 30 may be performed organically with the operations of FIGS. 4, 6, 9, 11, 13, 17, 19, 22, 24, and/or 28.

An embodiment of displaying an image-processed image according to a user input and information regarding the image may be understood through FIGS. 30, 31, 32, 33, and 34.

Referring to FIG. 30, in operation 3001, according to an embodiment, the electronic device 101 (e.g., the processor 120) may display a first screen (e.g., 3110 of part 31a of FIG. 31, 3210 of part 32a of FIG. 32, 3310 of part 33a of FIG. 33, or 3410 of part 34a of FIG. 34) including a first image (e.g., 3112 of FIG. 31, 3212 of FIG. 32, 3312 of FIG. 33, or 3412 of FIG. 34).

In operation 3003, according to an embodiment, the electronic device 101 (e.g., the processor 120) may identify the type of the target object included in the first image (e.g., 3112 of FIG. 31, 3212 of FIG. 32, 3312 of FIG. 33, or 3412 of FIG. 34). Operation 3003 may be performed before operation 3001 is performed, may be performed after operation 3005 is performed, and the time when operation 3003 is performed is not limited.

In operation 3005, according to an embodiment, the electronic device 101 (e.g., the processor 120) may identify a first user input (e.g., a swipe input such as 2013 of FIG. 20) in a state in which the first image (e.g., 3112 of FIG. 31, 3212 of FIG. 32, 3312 of FIG. 33, or 3412 of FIG. 34) is displayed.

In operation 3007, according to an embodiment, the electronic device 101 (e.g., the processor 120) may display an image (e.g., 3122 of FIG. 31, 3222 of FIG. 32, 3322 of FIG. 33, or 3422 of FIG. 34) that has undergone image processing corresponding to the type of the target object identified in operation 3003 in the image area (e.g., 3121 of FIG. 31, 3221 of FIG. 32, 3321 of FIG. 33, or 3421 of FIG. 34) of the second screen (e.g., 3120 of part 31b of FIG. 31, 3220 of part 32b of FIG. 32, 3320 of part 33b of FIG. 33, or 3420 of part 34b of FIG. 34). For example, the type of the target object may include a person (or face), a pet, a document (or character), food, or other objects (e.g., tourist attractions, artworks). For example, the image processing corresponding to the type of the target object may include a method of clearly correcting the area corresponding to a person or a pet as shown in FIG. 33, a method of removing the shadow from the image including a document (or a characters) or clearly correcting the area corresponding to the document (or characters) or leveling the document (or characters) as shown in FIG. 31, a method for clearly correcting the area corresponding to the food or blurring the area other than the food as shown in FIG. 34, or a method for providing a link for searching for information corresponding to other objects (e.g., tourist attractions or artworks) as shown in FIG. 32. The above-described image processing methods are exemplary, and the method of image processing is not limited.

According to an embodiment, referring to FIG. 31, the electronic device 101 may display an image 3112 including a document (or characters) in the image area 3111 of the first screen 3110. The electronic device 101 may identify the target object (or target region) (e.g., an object or area including the document (or characters)) included in the image 3112 displayed on the first screen 3110. The electronic device 101 may identify the type of the target object (or target region) (e.g., an object or area including the document (or characters)) included in the image 3112 displayed on the first screen 3110. The electronic device 101 may identify a user input 3114 in a state in which the first screen 3110 is displayed. The electronic device 101 may switch the screen in response to the user input 3114, and may control the display module 160 such that the target object (or target region) is displayed at a position close to the center of the image area 3121 of the switched second screen 3120, as described in previous embodiments. When displaying the second screen 3120, the electronic device 101 may display, in the image area 3121 of the second screen 3120, an image 3122 that has undergone image processing corresponding to the type of the target object (or target region) (e.g., the object or area including the document (or characters) (e.g., a method for removing the shadow from the image including the document (or characters), clearly correcting the area corresponding to the document (or characters), or leveling the document (or characters)). The electronic device 101 may display information regarding the image 3122 displayed in the image area 3121 of the second screen 3120 in the description area of the second screen 3120.

According to an embodiment, referring to FIG. 32, the electronic device 101 may display an image 3212 including other objects (e.g., tourist attractions, artworks) in the image area 3211 of the first screen 3210. The electronic device 101 may identify the target object (or target region) (e.g., the area corresponding to other objects (e.g., tourist attractions, artworks) or other objects (e.g., tourist attractions, artworks)) included in the image 3212 displayed on the first screen 3210. The electronic device 101 may identify the type of the target object (or target region) (e.g., the area corresponding to other objects (e.g., tourist attractions, artworks) or other objects (e.g., tourist attractions, artworks)) included in the image 3212 displayed on the first screen 3210. The electronic device 101 may identify a user input 3213 in a state in which the first screen 3210 is displayed. The electronic device 101 may switch the screen in response to the user input 3213, and may control the display module 160 such that the target object (or target region) is displayed at a position close to the center of the image area 3221 of the switched second screen 3220, as described in previous embodiments. When displaying the second screen 3220, the electronic device 101 may display, in the image area 3221 of the second screen 3220, the image 3222 that has undergone image processing (e.g., a method for providing a link 3223 for searching for information corresponding to other objects (e.g., tourist attractions, artworks)) corresponding to the type of the target object (or target region) (e.g., other objects (e.g., tourist attractions, artworks) or the area corresponding to other objects (e.g., tourist attractions, artworks)). For example, referring to part 32*b* of FIG. 32, the electronic device 101 may display a link 3223 for searching for information corresponding to the target object 3222 (e.g., tourist attraction, artwork) near the target object 3222 (e.g., tourist attraction, artwork) displayed on the screen 3220. The electronic device 101 may display information regarding the image 3222 displayed in the image area 3221 of the second screen 3220 in the description area of the second screen 3220.

According to an embodiment, referring to FIG. 33, the electronic device 101 may display an image 3312 including a person (or face) or a pet in the image area 3311 of the first screen 3310. The electronic device 101 may identify a target object (or target region) (e.g., person (or face) or pet) included in the image 3312 displayed on the first screen 3310. The electronic device 101 may identify the type of the target object (or target region) (e.g., person (or face) or pet) included in the image 3312 displayed on the first screen 3310. The electronic device 101 may identify a user input 3313 in a state in which the first screen 3310 is displayed. The electronic device 101 may switch the screen in response to the user input 3313, and may control the display module 160 such that the target object (or target region) is displayed at a position close to the center of the image area 3321 of the switched second screen 3320, as described in previous embodiments. When displaying the second screen 3320, the electronic device 101 may display, in the image area 3321 of the second screen 3320, an image 3322 that has undergone image processing corresponding to the type of the target object (or target region) (e.g., person (or face) or pet) (e.g., a method for clearly correcting the area corresponding to the person or pet). The electronic device 101 may display information regarding the image 3322 displayed in the image area 3321 of the second screen 3320 in the description area of the second screen 3320.

According to an embodiment, referring to FIG. 34, the electronic device 101 may display an image 3412 including food in the image area 3411 of the first screen 3410. The electronic device 101 may identify a target object (or target region) (e.g., food) included in the image 3412 displayed on the first screen 3410. The electronic device 101 may identify the type of the target object (or target region) (e.g., food) included in the image 3412 displayed on the first screen 3410. The electronic device 101 may identify a user input 3413 in a state in which the first screen 3410 is displayed. The electronic device 101 may switch the screen in response to the user input 3413, and may control the display module 160 such that the target object (or target region) is displayed at a position close to the center of the image area 3421 of the switched second screen 3420, as described in previous embodiments. When displaying the second screen 3420, the electronic device 101 may display, in the image area 3421 of the second screen 3420, an image 3422 that has undergone image processing corresponding to the type of the target object (or target region) (e.g., food) (e.g., a method for clearly correcting the area corresponding to the food or blurring the area other than the food). The electronic device 101 may display information regarding the image 3422 displayed in the image area 3421 of the second screen 3420 in the description area of the second screen 3420.

Figure 35:
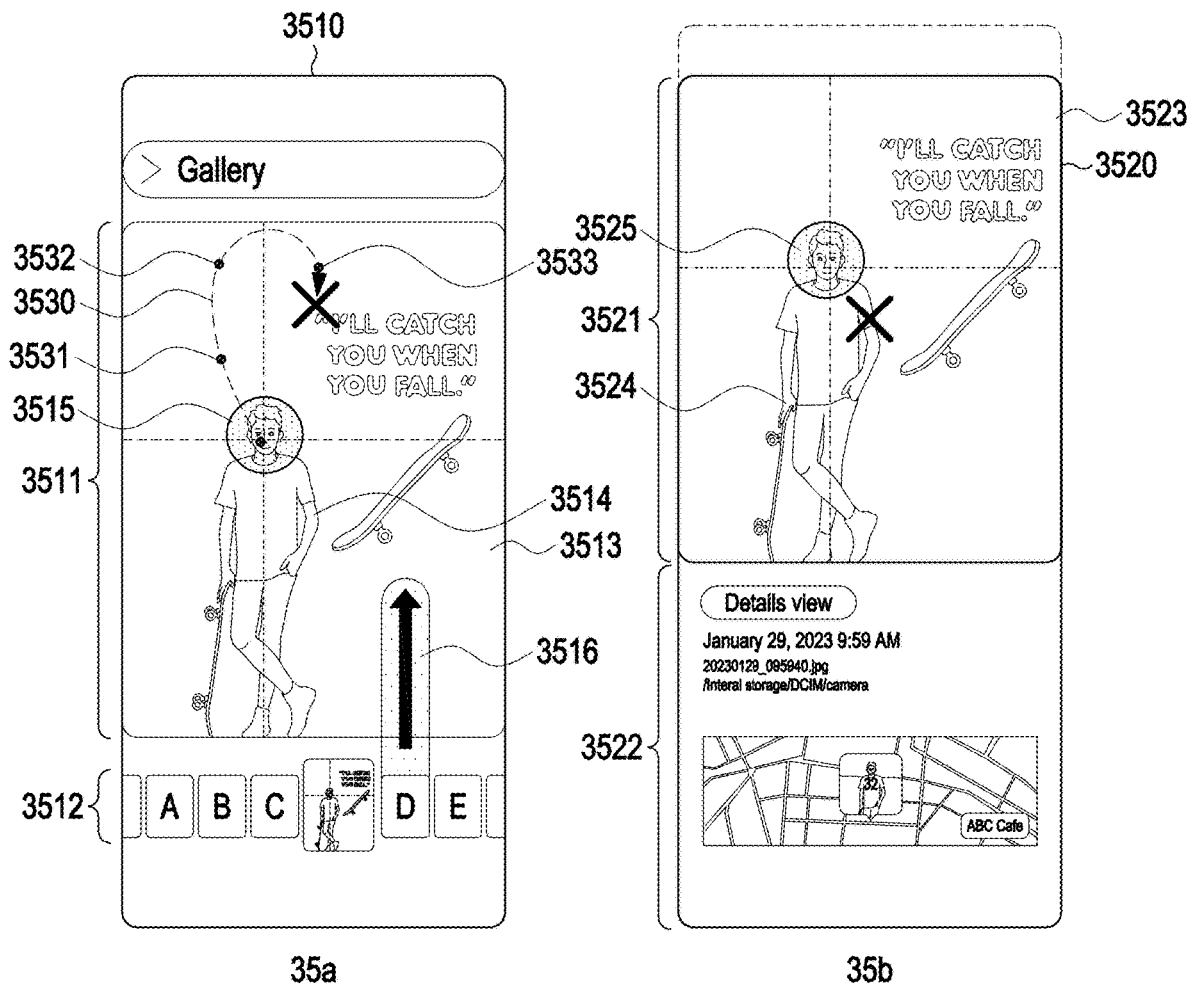
FIG. 35 is a view illustrating operations of an electronic device according to an embodiment of the disclosure.

FIG. 35 is a view illustrating operations of an electronic device according to an embodiment of the disclosure.

Referring to FIG. 35 and the previously described drawings, a process in which the image moves, the image is enlarged, the image is cropped, and the target region of the image is displayed close to the center of the image area according to a user input (e.g., a swipe input) in a state in which the image is displayed on the screen may be understood. According to an embodiment, an operation of enlarging an image may be omitted.

Referring to FIG. 35, according to an embodiment, the electronic device 101 (e.g., the processor 120) may display a first screen 3510. Referring to part 35*a* of FIG. 35, the electronic device 101 may display the entire area of the image 3513 in the first image area 3511 of the first screen 3510. The electronic device 101 may display a thumbnail of at least one image in the thumbnail area 3512 of the first screen 3510.

According to an embodiment, the electronic device 101 (e.g., the processor 120) may identify the target region 3515 of the image 3513 displayed on the first screen 3510. For example, the electronic device 101 may identify the target object 3514 (e.g., a person) included in the image 3513. The electronic device 101 may identify a target region 3515 (e.g., an area corresponding to a face) corresponding to the target object 3514 (e.g., a person).

According to an embodiment, the electronic device 101 (e.g., the processor 120) may identify a first user input 3516 (e.g., a swipe input on the first screen 3510) in a state in which the first screen 3510 is displayed.

According to an embodiment, the electronic device 101 (e.g., the processor 120) may display a second screen 3520 according to the first user input 3516. Referring to part 35*b* of FIG. 35, the electronic device 101 may display a partial area (e.g., a designated image) of the image 3523 (e.g., the image 3513 displayed on the first screen 3510) in the second image area 3521 of the second screen 3520. The designated image of the image 3523 displayed on the second screen 3520 mayinclude the entire area of the target region 3525 (e.g., the target region 3515 on the first screen 3510) of the image 3523. For example, the size of the target region 3525 displayed on the second screen 3520 may be different from the size of the target region 3515 displayed on the first screen 3510. The electronic device 101 may display the second screen 3520 such that the size of the target region 3525 displayed on the second screen 3520 is larger than the size of the target region 3515 displayed on the first screen 3510. For example, the size of the target region 3525 displayed on the second screen 3520 may be the same as the size of the target region 3515 displayed on the first screen 3510. The electronic device 101 may display the second screen 3520 such that the size of the target region 3515 displayed on the first screen 3510 is the same as the size of the target region 3525 displayed on the second screen 3520. For example, the electronic device 101 may move the position where the image (e.g., the image 3513) is displayed on the screen while switching from the first screen 3510 to the second screen 3520 according to the first user input 3516. As described above, moving the position where the image is displayed may be expressed as moving the image. The movement trajectory 3530 of part 35a of FIG. 35 indicates the movement trajectory of the image (e.g., the image 3513) displayed on the screen, but the movement trajectory may be implemented as a parabola, a straight line, a zigzag, or another movement trajectory. For example, the electronic device 101 may scroll (3531) the image 3513 according to the first user input 3516. Scrolling may be moving the position where the image is displayed. Thereafter, the electronic device 101 may enlarge (3532) the image 3513. Referring to FIG. 20, for example, the enlargement of the image may be enlargement of the image displayed on the screen as the size of the image 2031 in part 20c is larger than the size of the image 2011 displayed in part 20a. According to an embodiment, enlargement 3532 of the image 3513 may be omitted. For example, the enlargement 3532 of the image 3513 may be omitted depending on the size and ratio of the image 3513 and/or the settings of the electronic device 101. For example, in the case of a vertically long image, the electronic device 101 may omit enlargement of the image. For example, in FIG. 35, e.g., even in the case of a vertically long image, the electronic device 101 may enlarge the image such that the target region is displayed in the center of the screen according to settings. Referring to FIG. 20, the electronic device 101 may display the image 2011 of part 20a and, according to a user input 2013, immediately display the image 2041 of part 20d or may display the image 2011 of part 20a according to settings, and may sequentially display the image 2021 of part 20b, the image 2031 of part 20c, and the image 2041 of part 20d according to a user input 2013. It will be understood by one of ordinary skill in the art that sequentially displaying the images is not only displaying the four images of FIG. 20 in order, but also displaying other images between the four images so that the user may naturally recognize the movement of the images according to the frame rate. Referring to FIG. 20, part 20a may be display of an image, part 20b may be scrolling of the image, part 20c may be enlargement of the image, and part 20d may be center framing of the image. According to an embodiment, referring to FIG. 35, the electronic device 101 may scroll (3531) the image 3513, enlarge (3532) the image 3513, and then center-frame (3533) the image 3513. As described above, center framing may be an operation of displaying the target region included in an image close to the center of the image area of the screen. The electronic device 101 may display the image 3523 of the second screen 3520 by center-framing 3533 the image 3513. According to an embodiment, referring to FIG. 35, the electronic device 101 may center-frame (3533) the image 3513 without enlarging the image 3513 after scrolling (3531) the image 3513. The electronic device 101 may display the image 3523 of the second screen 3520 by center-framing 3533 the image 3513. The scrolling 3531, the enlargement 3532, and/or the center framing 3533 of FIG. 35 may be understood with reference to FIGS. 2 to 34 described above. The electronic device 101 may display a portion of the target object 3524 in the image area 3521 of the second screen 3520. The electronic device 101 may display the entire area of the target region 3525 in the image area 3521 of the second screen 3520. The electronic device 101 may display information related to the image 3523 displayed in the image area 3521, in the description area 3522 of the second screen 3520.

Figure 36A:
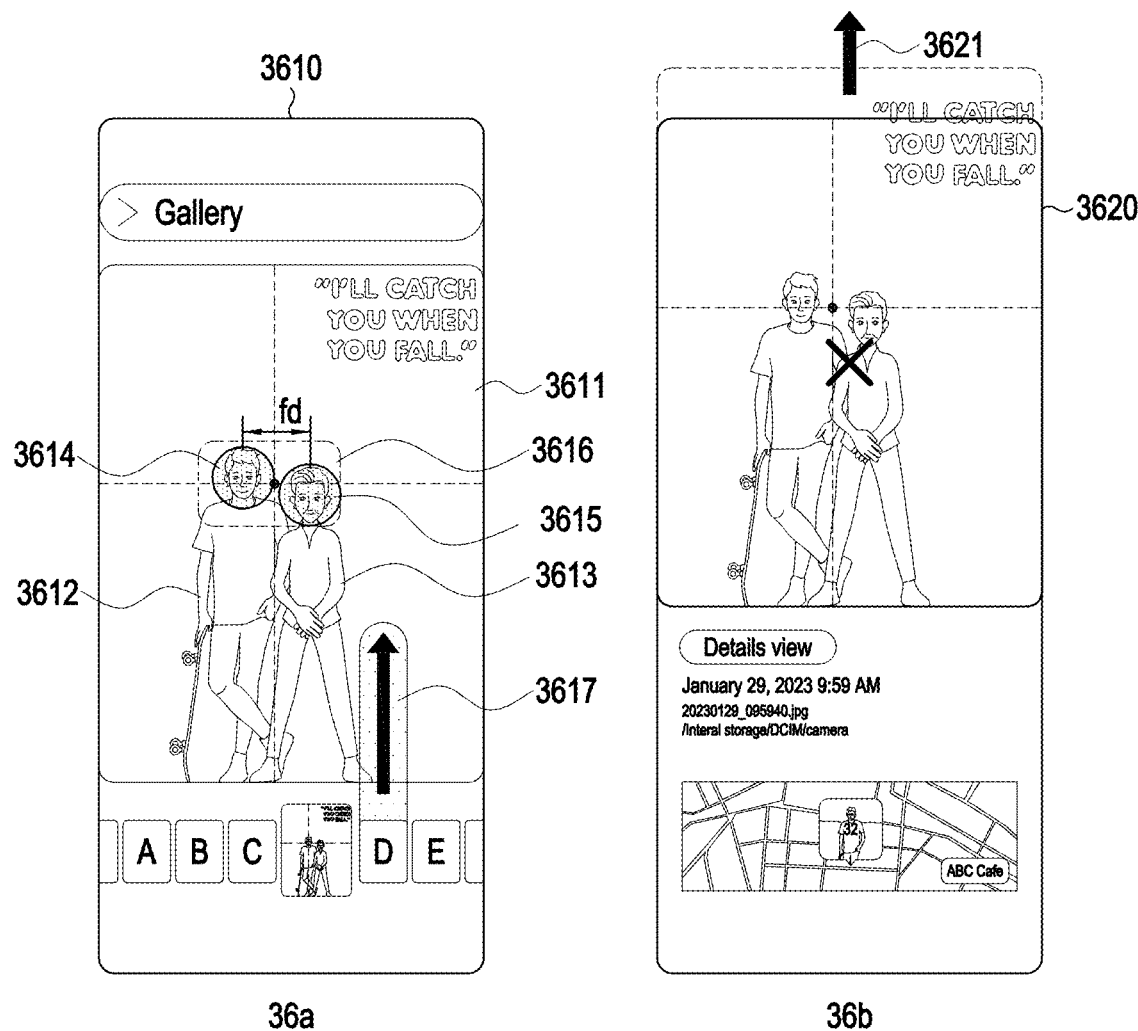
FIG. 36A is a view illustrating operations of an electronic device according to an embodiment of the disclosure.
Figure 36B:
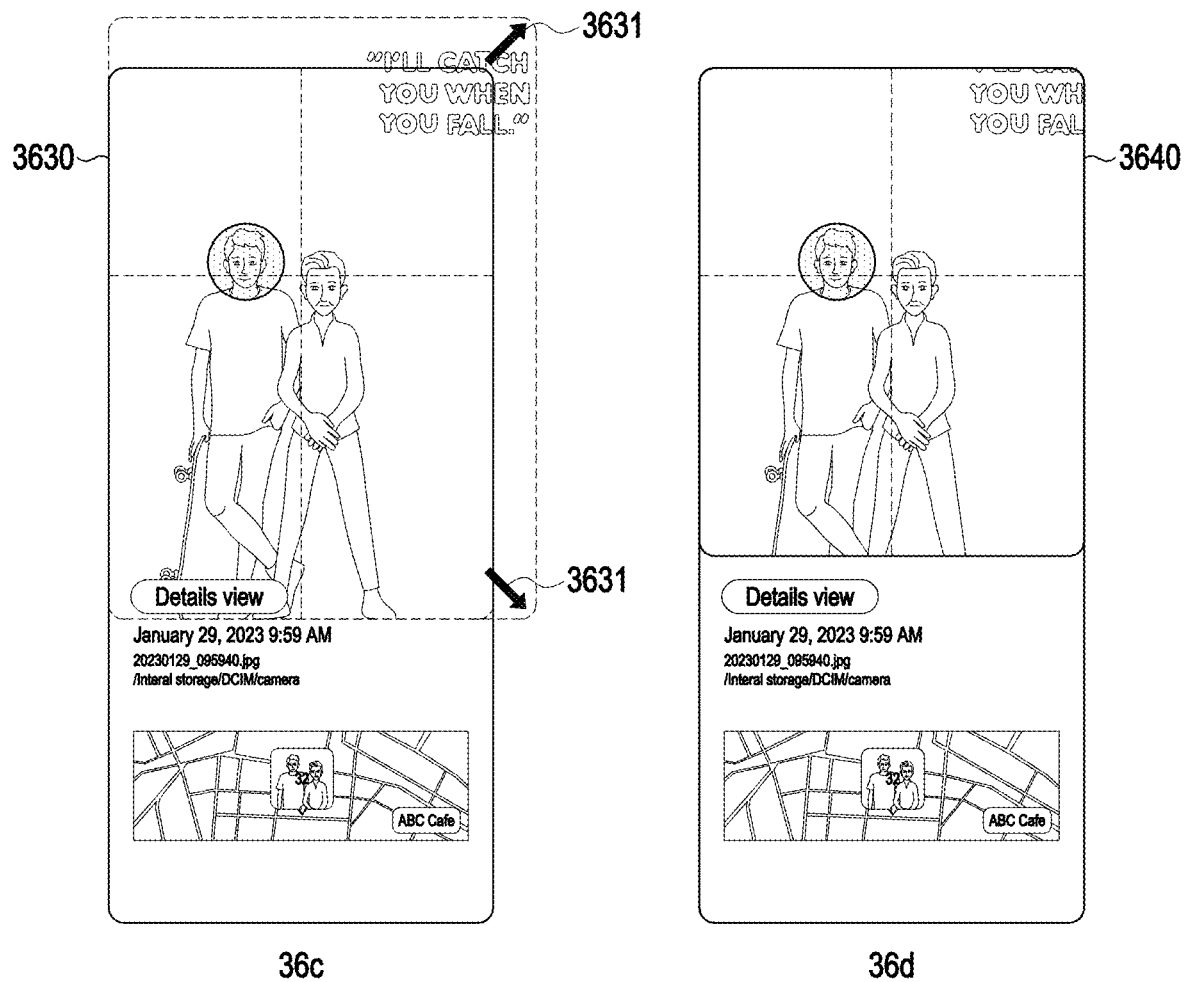
FIG. 36B is a view illustrating operations of an electronic device according to an embodiment of the disclosure.

FIG. 36A is a view illustrating operations of an electronic device according to an embodiment of the disclosure. FIG. 36B is a view illustrating operations of an electronic device according to an embodiment of the disclosure.

Referring to the embodiments of the drawings described above, scrolling, enlarging, or center framing after cropping described in detail with reference to FIG. 35 may be applied to an embodiment of identifying a group area corresponding to a plurality of target objects as a target region. Scrolling, enlarging, and/or center framing in an embodiment of identifying a group area corresponding to a plurality of target objects as a target region is described in more detail with reference to FIGS. 36A and 36B.

Referring to FIGS. 36A and 36B, according to an embodiment, the electronic device 101 (e.g., the processor 120) may display a first screen 3610. The electronic device 101 may identify a plurality of target objects 3612 and 3613 included in the image 3611 displayed on the first screen 3610. The electronic device 101 may identify a first target region 3614 corresponding to the first target object 3612. The electronic device 101 may identify a second target region 3615 corresponding to the second target object 3613. The electronic device 101 may identify a gap (e.g., fd of FIG. 36A) between the plurality of target objects 3612 and 3613. For example, the electronic device 101 may identify a gap (e.g., a gap between nearest boundary lines) between the first target object 3612 and the second target object 3613. For example, the electronic device 101 may identify a gap (e.g., a gap between nearest boundary lines) between the first target region 3614 corresponding to the first target object 3612 and the second target region 3615 corresponding to the second target object 3613. The electronic device 101 may identify the group area 3616 corresponding to the plurality of target objects 3612 and 3613 (or the plurality of target regions 3614 and 3615 corresponding to the plurality of target objects 3612 and 3613) as the target region, based on the gap between the plurality of target objects 3612 and 3613 being less than or equal to a reference value (e.g., a designated ratio to the size (width and/or height) of the image 3611 including the plurality of target objects 3612 and 3613). The operation of identifying the group area corresponding to the plurality of target objects as the target region may be described with reference to FIGS. 13, 14, and 15.

According to an embodiment, the electronic device 101 (e.g., the processor 120) may identify the area of each of the plurality of target objects 3612 and 3613 (or the plurality of target regions 3614 and 3615 corresponding to the plurality of target objects 3612 and 3613). The electronic device 101 may identify the group area 3616 corresponding to the plurality of target objects 3612 and 3613 (or the plurality of target regions 3614 and 3615 corresponding to the plurality of target objects 3612 and 3613) as the target region, based on the gap between the plurality of target objects 3612 and 3613 (or the plurality of target regions 3614 and 3615 corresponding to the plurality of target objects 3612 and 3613) having an area equal to or larger than a reference value among the plurality of target objects 3612 and 3613 (or the plurality of target regions 3614 and 3615 corresponding to the plurality of target objects 3612 and 3613) being equal to or smaller than a reference value (e.g., a designated ratio to the size (width and/or height) of the image 3611 including the plurality of target objects 3614 and 3615).

According to an embodiment, the electronic device 101 (e.g., the processor 120) may identify the group area corresponding to the plurality of target objects as the target region, and may perform scrolling, enlarging, and/or center framing described with reference to FIG. 35 according to the user input with respect to the identified center of the target region. For example, in part 36a of FIG. 36A, the electronic device 101 may identify a first user input 3617 (e.g., a swipe input on the first screen 3610) in a state in which the first screen 3610 is displayed. In part 36b of FIG. 36A, the electronic device 101 may display a second screen 3620 by scrolling (3621) the image 3611 according to the first user input 3617. Thereafter, in part 36c of FIG. 36B, the electronic device 101 may display a third screen 3630 by enlarging (3631) the image 3611. Thereafter, in part 36d of FIG. 36B, the electronic device 101 may display a fourth screen 3640 by center-framing the image 3611. For example, an embodiment in which enlargement of an image is omitted may be described with reference to FIG. 35.

It may be understood by one of ordinary skill in the art that embodiments described herein may be applied mutually organically within the applicable scope. For example, one of ordinary skill in the art may understand that at least some operations of an embodiment of the disclosure may be omitted and applied and that at least some operations of an embodiment and at least some operations of another embodiment may be organically combined and applied.

According to an embodiment, an electronic device 101 may comprise a display 160, a processor 120, and memory 130 storing instructions. The instructions, when executed by the processor 120, may cause the electronic device 101 to display a first image in a first image area of an execution screen of a first application on the display 160. The instructions, when executed by the processor 120, may cause the electronic device 101 to identify a target region in the first image. The target region includes a target object in the first image. The instructions, when executed by the processor 120, may cause the electronic device 101 to identify a first user input while the first image is displayed in the first image area. The instructions, when executed by the processor 120, may cause the electronic device 101 to change, based on the first user input, an image area for displaying an image, from the first image area in which the first image is displayed to a second image area which is smaller than the first image area. The instructions, when executed by the processor 120, may cause the electronic device 101 to, in response to the image area changing from the first image area to the second image area, control display of the first image in the second image area based on a position of the target region in the first image.

According to an embodiment, the position of the target region in the first image corresponds to a position of a human face included in the first image. The instructions, when executed by the processor 120, may cause the electronic device 101 to, in response to the first user input, control display of the first image in the second image area by adjusting a position of a portion of the first image in relation to the second image area to maintain an entirety of the human face to be contained within the second image area as a size of display area for displaying the first image is reduced from first display area to second display area.

According to an embodiment, the first application corresponds to a gallery application for displaying photograph images via the execution screen. The first user input corresponds to a swipe touch gesture for moving the first image displayed in the execution screen of the gallery application in an upward direction such that additional information is provided in a blank space provided below the first image.

According to an embodiment, the instructions, when executed by the processor 120, may cause the electronic device 101 to, based on the size of the second image area being less that the size of the first image area, control display of the first image in the second image area to display the target region close to a center of the second image area or control display of the first image in the second image area to include the target region based on identifying that at least a partial area of the target region is not to be displayed in the second image area as the first image area is changed to the second image area.

According to an embodiment, the instructions, when executed by the processor 120, cause the electronic device 101 to, in response to the swipe touch gesture and based on recognizing that the human face is included in the first image, control display of the first image in the second image area by adjusting a size of the first image in relation to the second image area to maintain an entirety of the recognized human face to be contained within the second image area as the size of the display area for displaying the first image is reduced from the first display area to the second display area.

According to an embodiment, the instructions, when executed by the processor 120, may cause the electronic device 101 to identify a second user input while a portion of the first image is displayed in the second image area. The instructions, when executed by the processor 120, may cause the electronic device 101 to change the image area from the second image area to a third image area based on the second user input. A portion of the first image including the target region may be displayed in the third image area. A size of the third image area may be less than a size of the second image area.

According to an embodiment, the instructions, when executed by the processor 120, may cause the electronic device 101 to control the display 160 to separate and display the first image and the target region during at least a portion of a period during which the first image area is changed to the second image area based on the first user input. By displaying the first image and the target region separately, the user may identify the target region (or target object) within the first image.

According to an embodiment, the instructions, when executed by the processor 120, may cause the electronic device 101 to control the display 160 to display the first image so that a moving speed of the first image differs from a moving speed of the target region during at least a portion of a period during which the first image area is changed to the second image area.

According to an embodiment, the instructions, when executed by the processor 120, may cause the electronic device 101 to identify a plurality of target objects included in the first image. The instructions, when executed by the processor 120, may cause the electronic device 101 to identify the position of the target region based on the plurality of target objects.

According to an embodiment, the instructions, when executed by the processor 120, may cause the electronic device 101 to identify at least one of an area of each of the plurality of target objects, that is registered, or a number of corresponding images. The instructions, when executed by the processor 120, may cause the electronic device 101 to identify a position of a first target object among the plurality of target objects as the position of the target region, based on the at least one of the area, that is registered, or the number of the corresponding images.

According to an embodiment, the instructions, when executed by the processor 120, may cause the electronic device 101 to identify a gap between the plurality of target objects. The instructions, when executed by the processor 120, may cause the electronic device 101 to identify a position of a first group area corresponding to the plurality of target objects as the position of the target region based on the gap being a reference value or less.

According to an embodiment, the instructions, when executed by the processor 120, may cause the electronic device 101 to identify an accuracy and/or importance of each of the plurality of target objects. The instructions, when executed by the processor 120, may cause the electronic device 101 to identify the position of the target region based on the accuracy and/or the importance.

According to an embodiment, the instructions, when executed by the processor 120, may cause the electronic device 101 to identify a size of the second image area. The instructions, when executed by the processor 120, may cause the electronic device 101 to identify an absolute coordinate value of the target region based on the size of the second image area and a size of the first image displayed in the first image area. The instructions, when executed by the processor 120, may cause the electronic device 101 to set a display reference position of the first image based on the absolute coordinate value of the target region. The instructions, when executed by the processor 120, may cause the electronic device 101 to control display of the first image in the second image area, based on the set display reference position.

According to an embodiment, the instructions, when executed by the processor 120, may cause the electronic device 101 to determine whether to resize the first image based on a size of an image area to be displayed. The instructions, when executed by the processor 120, may cause the electronic device 101 to display the resized image in the second image area based on the resizing determination.

According to an embodiment, the instructions, when executed by the processor 120, may cause the electronic device 101 to determine a size of an image area to be displayed based on the second user input. The instructions, when executed by the processor 120, may cause the electronic device 101 to display a portion of the first image in the third image area of the determined size.

The instructions, when executed by the processor 120, may cause the electronic device 101 to identify a plurality of target regions corresponding to the plurality of target objects respectively. The instructions, when executed by the processor 120, may cause the electronic device 101 to alternately display the plurality of target regions in the second image area based on the first user input.

According to an embodiment, the instructions, when executed by the processor 120, may cause the electronic device 101 to identify a type of the target object included in the first image. The instructions, when executed by the processor 120, may cause the electronic device 101 to display a portion of the first image that has undergone image processing corresponding to the type of the target object in the second image area based on the first user input.

According to an embodiment, the instructions, when executed by the processor 120, may cause the electronic device 101 to control the display 160 to display the first image on a first layer and the target region on a second layer.

According to an embodiment, the instructions, when executed by the processor 120, may cause the electronic device 101 to control the display 160 to display information related to the first image in a description area of the execution screen.

According to embodiments, a method for operating an electronic device 101 may comprise displaying a first image in a first image area of an execution screen of a first application on a display 160 of the electronic device 101. The method may comprise identifying a target region in the first image. The target region includes a target object in the first image. The method may comprise identifying a first user input while the first image is displayed in the first image area. The method may comprise changing, based on the first user input, an image area for displaying an image, from the first image area in which the first image is displayed to a second image area which is smaller than the first image area. The method may include, in response to the image area changing from the first image area to the second image area, controlling display of the first image in the second image area based on a position of the target region in the first image.

According to an embodiment, the position of the target region in the first image corresponds to a position of a human face included in the first image. Controlling display of the first image in the second image area may include, in response to the first user input, controlling display of the first image in the second image area by adjusting a position of a portion of the first image in relation to the second image area to maintain an entirety of the human face to be contained within the second image area as a size of display area for displaying the first image is reduced from first display area to second display area.

According to an embodiment, controlling display of the first image in the second image area may include, based on the size of the second image area being less that the size of the first image area, controlling display of the first image in the second image area may include to display the target region close to a center of the second image area or controlling display of the first image in the second image area may include to include the target region based on identifying that at least a partial area of the target region is not to be displayed in the second image area as the first image area is changed to the second image area.

According to an embodiment, the first application corresponds to a gallery application for displaying photograph images via the execution screen. The first user input corresponds to a swipe touch gesture for moving the first image displayed in the execution screen of the gallery application in an upward direction such that additional information is provided in a blank space provided below the first image According to an embodiment, controlling display of the first image in the second image area may include, in response to the swipe touch gesture and based on recognizing that the human face is included in the first image, controlling display of the first image in the second image area by adjusting a size of the first image in relation to the second image area to maintain an entirety of the recognized human face to be contained within the second image area as the size of the display area for displaying the first image is reduced from the first display area to the second display area The method may comprise identifying a second user input while a portion of the first image is displayed in the second image area. The method may comprise changing the image area from the second image area to a third image area based on the second user input. A portion of the first image including the target region may be displayed in the third image area. A size of the third image area may be less than a size of the second image area.

According to an embodiment, the method may comprise separating and displaying the first image and the target region during at least a portion of a period during which the first image area is changed to the second image area based on the first user input.

According to an embodiment, separating and displaying the first image and the target region may include displaying the first image so that a moving speed of the first image differs from a moving speed of the target region during at least a portion of a period during which the first image area is changed to the second image area.

According to an embodiment, the method may include identifying a plurality of target objects included in the first image. The method may include identifying the position of the target region based on the plurality of target objects.

According to an embodiment, the method may include identifying at least one of an area of each of the plurality of target objects, that is registered, or a number of corresponding images. The method may include identifying a position of a first target object among the plurality of target objects as the position of the target region, based on the at least one of the area, that is registered, or the number of the corresponding images.

According to an embodiment, the method may include identifying a gap between the plurality of target objects. The method may include identifying a position of a first group area corresponding to the plurality of target objects as the position of the target region based on the gap being a reference value or less.

According to an embodiment, the method may include identifying an accuracy and/or importance of each of the plurality of target objects. The method may include identifying the position of the target region based on the accuracy and/or the importance.

According to an embodiment, controlling display of the first image in the second image area may include identifying a size of the second image area. Controlling display of the first image in the second image area may include identifying an absolute coordinate value of the target region based on the size of the second image area and a size of the first image displayed in the first image area. Controlling display of the first image in the second image area may include setting a display reference position of the first image based on the absolute coordinate value of the target region. Controlling display of the first image in the second image area may include controlling display of the first image in the second image area, based on the set display reference position.

According to an embodiment, controlling display of the first image in the second image area may include determining whether to resize the first image based on a size of an image area to be displayed. Controlling display of the first image in the second image area may include displaying the resized image in the second image area based on the resizing determination.

According to an embodiment, controlling display of the first image in the third image area may include determining a size of an image area to be displayed, based on the second user input. controlling display of the first image in the third image area may include displaying a portion of the first image in the third image area of the determined size.

According to an embodiment, controlling display of the first image in the second image area may include identifying a plurality of target regions corresponding to the plurality of target objects respectively. Controlling display of the first image in the second image area may include alternately displaying the plurality of target regions in the second image area based on the first user input.

According to an embodiment, controlling display of the first image in the second image area may include identifying a type of the target object included in the first image. Controlling display of the first image in the second image area may include displaying a portion of the first image that has undergone image processing corresponding to the type of the target object in the second image area based on the first user input.

According to an embodiment, the method may comprise displaying the first image on a first layer and the target region on a second layer.

According to embodiments, the method may comprise information related to the first image in a description area of the execution screen.

According to an embodiment, in a non-transitory computer-readable recording medium storing instructions configured to perform at least one operation by a processor 120 of an electronic device 101, the at least one operation may include displaying a first image in a first image area of an execution screen of a first application on a display 160 of the electronic device 101. The at least one operation may comprise identifying a target region in the first image. The target region includes a target object in the first image. The at least one operation may comprise identifying a first user input while the first image is displayed in the first image area. The at least one operation may comprise changing, based on the first user input, an image area for displaying an image, from the first image area in which the first image is displayed to a second image area which is smaller than the first image area. The at least one operation may include, in response to the image area changing from the first image area to the second image area, controlling display of the first image in the second image area based on a position of the target region in the first image.

According to an embodiment, the position of the target region in the first image corresponds to a position of a human face included in the first image. Controlling display of the first image in the second image area may include, in response to the first user input, controlling display of the first image in the second image area by adjusting a position of a portion of the first image in relation to the second image area to maintain an entirety of the human face to be contained within the second image area as a size of display area for displaying the first image is reduced from first display area to second display area.

According to an embodiment, controlling display of the first image in the second image area may include, based on the size of the second image area being less that the size of the first image area, controlling display of the first image in the second image area may include to display the target region close to a center of the second image area or controlling display of the first image in the second image area may include to include the target region based on identifying that at least a partial area of the target region is not to be displayed in the second image area as the first image area is changed to the second image area.

According to an embodiment, the first application corresponds to a gallery application for displaying photograph images via the execution screen. The first user input corresponds to a swipe touch gesture for moving the first image displayed in the execution screen of the gallery application in an upward direction such that additional information is provided in a blank space provided below the first image According to an embodiment, controlling display of the first image in the second image area may include, in response to the swipe touch gesture and based on recognizing that the human face is included in the first image, controlling display of the first image in the second image area by adjusting a size of the first image in relation to the second image area to maintain an entirety of the recognized human face to be contained within the second image area as the size of the display area for displaying the first image is reduced from the first display area to the second display area The at least one operation may comprise identifying a second user input while a portion of the first image is displayed in the second image area. The at least one operation may comprise changing the image area from the second image area to a third image area based on the second user input. A portion of the first image including the target region may be displayed in the third image area. A size of the third image area may be less than a size of the second image area.

According to an embodiment, the at least one operation may comprise separating and displaying the first image and the target region during at least a portion of a period during which the first image area is changed to the second image area based on the first user input.

According to an embodiment, separating and displaying the first image and the target region may include displaying the first image so that a moving speed of the first image differs from a moving speed of the target region during at least a portion of a period during which the first image area is changed to the second image area.

According to an embodiment, the at least one operation may include identifying a plurality of target objects included in the first image. The at least one operation may include identifying the position of the target region based on the plurality of target objects.

According to an embodiment, the at least one operation may include identifying at least one of an area of each of the plurality of target objects, that is registered, or a number of corresponding images. The at least one operation may include identifying a position of a first target object among the plurality of target objects as the position of the target region, based on the at least one of the area, that is registered, or the number of the corresponding images.

According to an embodiment, the at least one operation may include identifying a gap between the plurality of target objects. The at least one operation may include identifying a position of a first group area corresponding to the plurality of target objects as the position of the target region based on the gap being a reference value or less.

According to an embodiment, the at least one operation may include identifying an accuracy and/or importance of each of the plurality of target objects. The at least one operation may include identifying the position of the target region based on the accuracy and/or the importance.

According to an embodiment, controlling display of the first image in the second image area may include identifying a size of the second image area. Controlling display of the first image in the second image area may include identifying an absolute coordinate value of the target region based on the size of the second image area and a size of the first image displayed in the first image area. Controlling display of the first image in the second image area may include setting a display reference position of the first image based on the absolute coordinate value of the target region. Controlling display of the first image in the second image area may include controlling display of the first image in the second image area, based on the set display reference position.

According to an embodiment, controlling display of the first image in the second image area may include determining whether to resize the first image based on a size of an image area to be displayed. Controlling display of the first image in the second image area may include displaying the resized image in the second image area based on the resizing determination.

According to an embodiment, controlling display of the first image in the third image area may include determining a size of an image area to be displayed, based on the second user input. controlling display of the first image in the third image area may include displaying a portion of the first image in the third image area of the determined size.

According to an embodiment, controlling display of the first image in the second image area may include identifying a plurality of target regions corresponding to the plurality of target objects respectively. Controlling display of the first image in the second image area may include alternately displaying the plurality of target regions in the second image area based on the first user input.

According to an embodiment, controlling display of the first image in the second image area may include identifying a type of the target object included in the first image. Controlling display of the first image in the second image area may include displaying a portion of the first image that has undergone image processing corresponding to the type of the target object in the second image area based on the first user input.

According to an embodiment, the at least one operation may comprise displaying the first image on a first layer and the target region on a second layer.

According to embodiments, the at least one operation may comprise information related to the first image in a description area of the execution screen.

An embodiment of the disclosure and terms used therein are not intended to limit the technical features described in the disclosure to specific embodiments, and should be understood to include various modifications, equivalents, or substitutes of the embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to embodiments, each component of the above-described components may include a single entity or multiple entities. Some of the plurality of entities may be separately disposed in different components. According to embodiments, one or more of the above-described components may be omitted, or one or more other components may be added. Alternatively or additionally, a plurality of components may be integrated into a single component. In such a case, according to various embodiments, the integrated component may still perform one or more functions of each of the plurality of components in the same or similar manner as they are performed by a corresponding one of the plurality of components before the integration. According to embodiments, operations performed by components may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   one or more processors; and
   memory storing instructions that, when executed by the one or more processors individually or collectively, cause the electronic device to:
      display a first image in a first image area of an execution screen of a first application on the display,
      identify a target region in the first image, wherein the target region includes a target object in the first image,
      identify a first user input while the first image is displayed in the first image area,
      based on the first user input, change an image area for displaying an image, from the first image area in which the first image is displayed to a second image area which is smaller than the first image area, and
      in response to the image area changing from the first image area to the second image area, control display of the first image in the second image area based on a position of the target region in the first image,
   wherein the first user input corresponds to a swipe touch gesture for moving the first image in an upward direction such that additional information related to the first image is provided in a description area provided below the first image, the additional information including at least one of a location where the first image was taken.

2. The electronic device of claim 1,
   wherein the position of the target region in the first image corresponds to a position of a human face included in the first image, and
   wherein the instructions, when executed by the one or more processors individually or collectively, further cause the electronic device to:
      in response to the first user input, control display of the first image in the second image area by adjusting a position of a portion of the first image in relation to the second image area to maintain an entirety of the human face to be contained within the second image area as a size of display area for displaying the first image is reduced from a first display area to a second display area.

3. The electronic device of claim 2,
   wherein the first application corresponds to a gallery application for displaying photograph images via the execution screen, and
   wherein the first image is displayed in the execution screen of the gallery application.

4. The electronic device of claim 3, wherein the instructions, when executed by the one or more processors individually or collectively, further cause the electronic device to:
   in response to the swipe touch gesture and based on recognizing that the human face is included in the first image, control display of the first image in the second image area by adjusting a size of the first image in relation to the second image area to maintain an entirety of the recognized human face to be contained within the second image area as the size of the display area for displaying the first image is reduced from the first display area to the second display area.

5. The electronic device of claim 1, wherein the instructions, when executed by the one or more processors individually or collectively, further cause the electronic device to control the display to display the first image so that a moving speed of the first image differs from a moving speed of the target region during at least a portion of a period during which the image area is changed from the first image area to the second image area.

6. The electronic device of claim 1, wherein the instructions, when executed by the one or more processors individually or collectively, further cause the electronic device to:
   identify a plurality of target objects included in the first image, and
   identify the position of the target region based on the plurality of target objects.

7. The electronic device of claim 6, wherein the instructions, when executed by the one or more processors individually or collectively, further cause the electronic device to:
   identify at least one of an area that is registered, or a number of corresponding images of each of the plurality of target objects, and
   identify a position of a first target object among the plurality of target objects as the position of the target region, based on the at least one of the area that is registered, or the number of the corresponding images.

8. The electronic device of claim 6, wherein the instructions, when executed by the one or more processors individually or collectively, further cause the electronic device to:
   identify a gap between the plurality of target objects, and
   identify a position of a first group area corresponding to the plurality of target objects as the position of the target region, based on the gap being a reference value or less.

9. The electronic device of claim 6, wherein the instructions, when executed by the one or more processors individually or collectively, further cause the electronic device to:
   identify a plurality of target regions corresponding to the plurality of target objects respectively, and
   alternately display the plurality of target regions in the second image area based on the first user input.

10. The electronic device of claim 1, wherein the instructions, when executed by the one or more processors individually or collectively, further cause the electronic device to:

identify a size of the second image area,
identify an absolute coordinate value of the target region based on the size of the second image area and a size of the first image displayed in the first image area,
set a display reference position of the first image, based on the absolute coordinate value of the target region, and
control display of the first image in the second image area, based on the set display reference position.

11. The electronic device of claim 1, wherein the instructions, when executed by the one or more processors individually or collectively, further cause the electronic device to:
determine whether to resize the first image based on a size of the second image area, and
display the resized image in the second image area based on the resizing determination.

12. The electronic device of claim 1, wherein the instructions, when executed by the one or more processors individually or collectively, further cause the electronic device to:
identify a type of the target object included in the first image, and
display, in the second image area, based on the first user input, a portion of the first image on which image processing corresponding to the type of the target object has been performed.

13. The electronic device of claim 1, wherein the instructions, when executed by the one or more processors individually or collectively, further cause the electronic device to control the display to display the first image on a first layer and the target region on a second layer.

14. A method for operating an electronic device, the method comprising:
displaying a first image in a first image area of an execution screen of a first application on a display of the electronic device;
identifying a target region in the first image, wherein the target region includes a target object in the first image;
identifying a first user input while the first image is displayed in the first image area;
based on the first user input, changing an image area for displaying an image, from the first image area in which the first image is displayed to a second image area which is smaller than the first image area; and
in response to the image area changing from the first image area to the second image area, controlling display of the first image in the second image area based on a position of the target region in the first image,
wherein the first user input corresponds to a swipe touch gesture for moving the first image in an upward direction such that additional information related to the first image is provided in a description area provided below the first image, the additional information including at least one of a location where the first image was taken.

15. A non-transitory computer-readable recording medium storing instructions configured to perform at least one operation by a processor of an electronic device, wherein the at least one operation includes:
displaying a first image in a first image area of an execution screen of a first application on a display of the electronic device;
identifying a target region in the first image, wherein the target region includes a target object in the first image;
identifying a first user input while the first image is displayed in the first image area;
based on the first user input, changing an image area for displaying an image, from the first image area in which the first image is displayed to a second image area which is smaller than the first image area; and
in response to the image area changing from the first image area to the second image area, controlling display of the first image in the second image area based on a position of the target region in the first image,
wherein the first user input corresponds to a swipe touch gesture for moving the first image in an upward direction such that additional information related to the first image is provided in a description area provided below the first image, the additional information including at least one of a location where the first image was taken.

16. The non-transitory computer-readable recording medium of claim 15, wherein the operation further includes:
separating and displaying the first image and the target region so that a portion of the target region and a portion of the separated target region are displayed overlapping each other.

* * * * *